(12) United States Patent
Caelwaerts et al.

(10) Patent No.: US 12,523,470 B2
(45) Date of Patent: Jan. 13, 2026

(54) MOTORIZED MOUNTING DEVICES

(71) Applicant: Milwaukee Electric Tool Corporation, Brookfield, WI (US)

(72) Inventors: Michael John Caelwaerts, Milwaukee, WI (US); Samuel A. Gould, West Allis, WI (US); David W. Draeger, Sussex, WI (US); Adam J. Sargis, Mount Pleasant, WI (US); Austin Alexander Borkowski, Milwaukee, WI (US); Daniel L. Block, Milwaukee, WI (US); Danielle K. Quan, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 429 days.

(21) Appl. No.: 18/062,981

(22) Filed: Dec. 7, 2022

(65) Prior Publication Data

US 2023/0115417 A1 Apr. 13, 2023

Related U.S. Application Data

(63) Continuation of application No. PCT/US2022/077851, filed on Oct. 10, 2022.

(60) Provisional application No. 63/356,158, filed on Jun. 28, 2022, provisional application No. 63/348,788, (Continued)

(51) Int. Cl.
*G01C 15/00* (2006.01)
*H02K 7/116* (2006.01)
*H02K 37/24* (2006.01)

(52) U.S. Cl.
CPC ......... *G01C 15/004* (2013.01); *H02K 7/1166* (2013.01); *H02K 37/24* (2013.01)

(58) Field of Classification Search
CPC .. G01C 15/004; G01C 9/06; G01C 2009/066; H02K 7/116; H02K 7/1163; H02K 7/1166; H02K 37/00; H02K 37/24
See application file for complete search history.

(56) References Cited

U.S. PATENT DOCUMENTS

| 5,475,930 A | 12/1995 | Kimura |
| 6,606,798 B2 | 8/2003 | El-Katcha et al. |
| 6,762,830 B1 | 7/2004 | Connolly |

(Continued)

FOREIGN PATENT DOCUMENTS

| CN | 2578789 | 10/2003 |
| CN | 2839966 | 11/2006 |

(Continued)

OTHER PUBLICATIONS

English translation of JP-2002310654-A (Year: 2002).*

(Continued)

*Primary Examiner* — Tulsidas C Patel
*Assistant Examiner* — Joshua Kiel M Rodriguez
(74) *Attorney, Agent, or Firm* — Reinhart Boerner Van Deuren s.c.

(57) ABSTRACT

Various motorized device designs with backlash detection systems are shown. In a specific embodiment, a motorized laser level mount includes a rotatable laser platform, a housing cover, a housing, a gear train and a backlash detection system. The backlash detection system coupled to the motor and the laser platform and configured to determine when backlash has been removed from the gear train.

20 Claims, 40 Drawing Sheets

Related U.S. Application Data filed on Jun. 3, 2022, provisional application No. 63/254,234, filed on Oct. 11, 2021.

(56) References Cited

U.S. PATENT DOCUMENTS

| | | | |
|---|---|---|---|
| 6,915,583 | B2 | 7/2005 | El-Katcha et al. |
| 6,922,901 | B1 | 8/2005 | Chou et al. |
| 7,013,571 | B2 | 3/2006 | El-Katcha et al. |
| 7,065,890 | B1 | 6/2006 | Chang |
| 7,152,334 | B2 | 12/2006 | Gamal et al. |
| 7,266,898 | B2 | 9/2007 | El-Katcha et al. |
| 7,296,360 | B2 | 11/2007 | El-Katcha et al. |
| 7,373,724 | B2 | 5/2008 | Qi et al. |
| 7,454,842 | B2 | 11/2008 | Kodaira |
| 7,810,251 | B1 * | 10/2010 | Goeden ............ G01B 5/0004 33/537 |
| 8,171,649 | B2 | 5/2012 | Kallabis et al. |
| 10,591,296 | B2 | 3/2020 | Kwan et al. |
| 2006/0278776 | A1 | 12/2006 | Diana et al. |
| 2010/0053742 | A1 | 3/2010 | Hasegawa |
| 2015/0381858 | A1 | 12/2015 | Sterngren |
| 2019/0085938 | A1 * | 3/2019 | Yoshida ............ B62D 5/0424 |
| 2020/0240783 | A1 | 7/2020 | Eidinger et al. |
| 2020/0300626 | A1 | 9/2020 | Mizuno |

FOREIGN PATENT DOCUMENTS

| | | | | |
|---|---|---|---|---|
| CN | 201218731 | | 4/2009 | |
| CN | 201555588 | | 8/2010 | |
| CN | 101718553 | | 7/2012 | |
| CN | 203657807 | | 6/2014 | |
| CN | 203704931 | | 7/2014 | |
| CN | 106017437 | | 10/2016 | |
| CN | 106151484 A | * | 11/2016 | |
| CN | 106403914 | | 2/2017 | |
| CN | 206095222 | | 4/2017 | |
| CN | 206710897 | | 12/2017 | |
| CN | 106123877 | | 7/2018 | |
| CN | 208535480 | | 2/2019 | |
| DE | 4402347 | | 8/1995 | |
| JP | 2002310654 | | 10/2002 | |
| KR | 10-1918340 | | 11/2018 | |
| KR | 20210052183 A | * | 5/2021 | ............ H02K 7/116 |
| WO | WO8900676 | | 1/1989 | |
| WO | WO11098608 | | 8/2011 | |

OTHER PUBLICATIONS

English translation of CN-106151484-A (Year: 2016).*
English translation of KR-20210052183-A (Year: 2021).*
International Search Report and Written Opinion for International Application No. PCT/US2022/077851, dated Feb. 3, 2023, 9 pages.

* cited by examiner

MOTORIZED MOUNTING DEVICES

CROSS-REFERENCE TO RELATED PATENT APPLICATIONS

The present application is a continuation of International Application No. PCT/US2022/077851, filed on Oct. 10, 2022, which claims the benefit of and priority to U.S. Provisional Application No. 63/356,158, filed on Jun. 28, 2022, to U.S. Provisional Application No. 63/348,788, filed on Jun. 3, 2022, and to U.S. Provisional Application No. 63/254,234, filed on Oct. 11, 2021, which are incorporated herein by reference in their entireties.

BACKGROUND OF THE INVENTION

The present invention relates generally to the field of motorized devices. The present invention relates specifically to a motorized device, such as for a laser projection device (i.e., a cross-line laser level, a plane laser level, etc.), with a backlash detection and/or removal system.

SUMMARY OF THE INVENTION

One embodiment of the invention relates to a motorized device, such as a motorized mount for a laser level. The motorized mount includes a housing and a platform rotationally engaged with the housing. The platform includes a laser level engagement structure. The motorized mount further includes a platform adjustment mechanism coupled to the platform such that the platform adjustment mechanism drives rotation of the platform. The platform adjustment mechanism includes a stepper motor and a gear train. The stepper motor is positioned within the housing and moves in steps. The gear train is coupled to the stepper motor. The motorized mount further includes a backlash detection system coupled to the stepper motor and the platform. The backlash detection system includes a monitoring unit configured to detect when backlash has been removed from within the platform adjustment mechanism. When the backlash has been removed from the platform adjustment mechanism, the steps of the stepper motor are counted by the monitoring unit such that the platform will move a distance during clockwise rotation of the platform that is the same as a distance moved during counterclockwise rotation of the platform.

Another embodiment of the invention relates to a motorized device. The motorized device includes a housing and a platform rotationally engaged with the housing. The motorized device further includes a platform adjustment mechanism coupled to the platform such that the platform adjustment mechanism drives rotation of the platform. The platform adjustment mechanism includes a motor and a gear train. The motor is positioned within the housing. The gear train is coupled to the motor and includes a first gear having teeth and a second gear having teeth. The motorized device further includes a backlash detection system coupled to the gear train. The backlash detection system includes a monitoring unit configured to detect when the teeth of the first gear are directly contacting the teeth of the second gear. The backlash detection system further includes an output driver coupled to the gear train and an output slider engaged with the output driver and coupled to the platform.

Another embodiment of the invention relates to an adjustable motorized device. The motorized device includes a housing and a platform rotationally engaged with the housing by one or more ribs extending upward from the housing. The motorized device further includes a platform adjustment mechanism coupled to the platform. The platform adjustment mechanism includes a motor positioned within the housing, a gear train coupled to the motor and an output slider coupled to the platform. The motorized device further includes a backlash detection system coupled to the gear train. The backlash detection system includes a microcontroller configured to detect when backlash has been removed from within the gear train. The backlash detect system includes an output driver coupled to the gear train, the output driver includes a rotating post. The backlash detection system further includes a first pin coupled to the output slider and a second pin spaced a distance from the first pin and coupled to the output slider.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
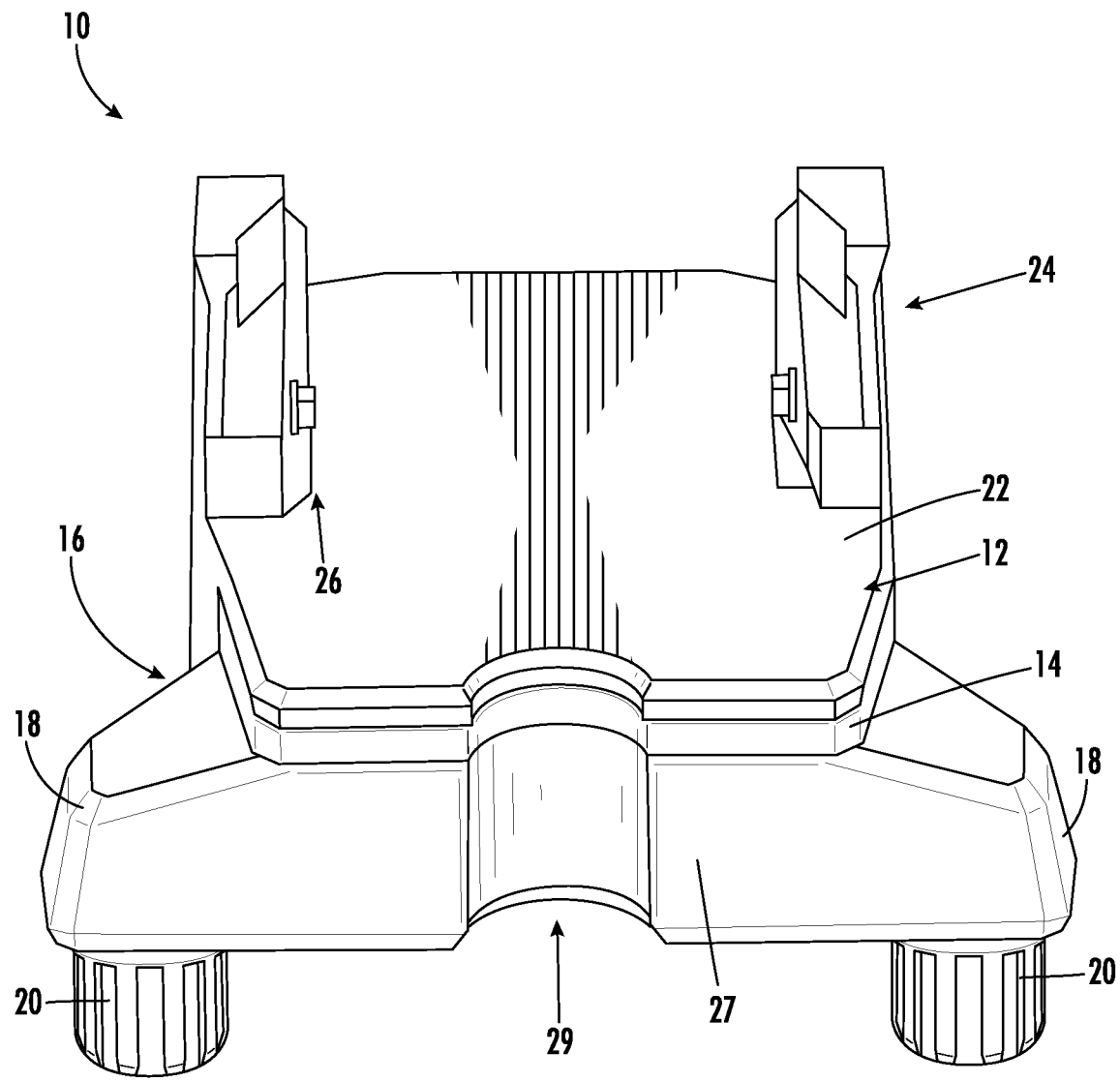
FIG. 1 is a is a front perspective view of a motorized laser level mount, according to an exemplary embodiment.

Referring generally to the figures, various embodiments of a motorized device, such as a laser projection mount are shown. In general, the motorized laser projection mount discussed herein is configured to support a laser level, such as a line laser level or a plane laser level and can be set on a variety of surfaces (e.g., floor, tables, tripods, etc.). As discussed herein Applicant has developed a number of improvements to the functionality of a laser level mount. Applicant believes the motorized mounting device and remote control device described allow a user to more quickly adjust the laser position from a distance providing a faster and easier alignment process. Therefore, a user can more efficiently complete a project where the projected laser beam requires alignment. Further, the designed rotational coupling of the laser platform allows for rotation of the platform without the platform being pulled away from the housing during use.

Additionally, Applicant has developed a motorized system with a number of components designed to reduce backlash such that the precision of alignment for the motorized mount is increased. For example, the drive train incorporates a scissor gear with compression springs that cause the teeth of the mating gear to be compressed, to reduce the backlash as the user changes the direction the platform is rotated. Another example of the improved design relates to the worm and worm wheel. The worm wheel is designed with a turbine gear design meaning the worm wheel is configured to be forced into the worm. Wave springs are positioned such that the spur gear and worm wheel are forced down onto the worm to reduce or eliminate backlash.

Further, in contrast to the motorized laser level mount discussed herein, other laser mounts frequently lack precise movements when the laser level mount and/or laser level are adjusted at longer distances (i.e., using a remote, etc.). Specifically, conventional laser level mounts include a gear train with backlash that is uncontrolled and/or undetected. In such a device, when a user changes direction of the laser level mount (e.g., clockwise to counterclockwise or counterclockwise to clockwise) the laser level line and/or projection does not move the same amount (distance travelled can differ) with each press of the remote button as the gear train takes up the backlash prior to beginning rotational movement. Applicant believes other precise rotational devices may also suffer from inaccurate movement because of uncontrolled backlash.

Applicant has developed a motorized system with a number of components designed to detect and mitigate the effects of system, and specifically gear train backlash within the laser level mount such that the movement is precise and the precision of alignment for the motorized mount is increased. For example, Applicant believes the backlash detection system can be used to determine when the backlash within the gear train has already been taken up or removed (i.e., no longer backlash within the system). In a specific embodiment, the backlash detection system determines backlash has been removed when an electrical connection has been made so that the system will accurately determine the amount of rotation of the laser level mount. Applicant believes this detection of the backlash provides a user with a more precise laser level mount because regardless of the direction of rotation, the laser line or projection will move the same distance due to the counted steps. Further, Applicant believes the systems described herein prevent the user frustration caused by no movement of the motorized mount when the user presses buttons on the remote.

For example, the backlash detection and mitigation system includes posts that act as switches with a microcontroller or MCU detecting and/or determining when there is backlash in the system (i.e., within the gear train) and also when the backlash has been removed. In another example, the backlash detection system measures the current of the motor to determine the presence of backlash within the laser level mount. In a final example, the backlash detection system includes one or more strain gauges coupled to a portion of the gear train (e.g., the output gear) to determine when the gear is moving and/or changing directions. In such a backlash detection system, Applicant believes including a biasing element to bias the system in one direction can be reduce and/or remove backlash, allowing the laser level mount and specifically the motor to perform in a similar manner regardless of the direction of rotation.

Finally, Applicant has designed a more intuitive remote control device. In contrast to the remote control device discussed herein, other remote control devices frequently use arrow buttons that do not match the direction of rotation if the user is facing in a different direction than the laser mount. Applicant believes the remote control device with the dial described allows a user to quickly and accurately adjust the motorized laser level mount because the rotation of the dial matches the rotation of the mount regardless of the direction the user is facing.

Figure 2:
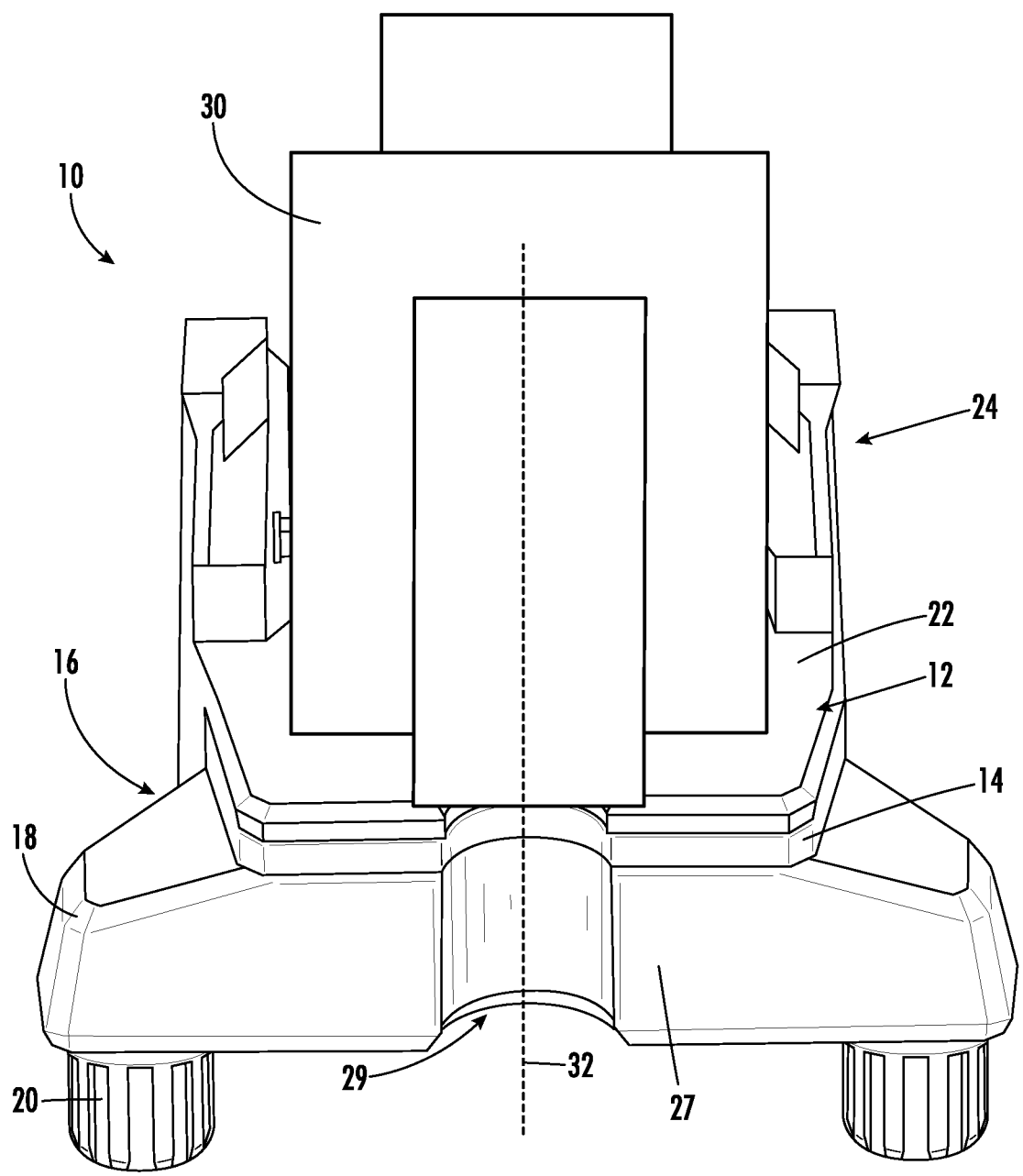
FIG. 2 is a front perspective view of the motorized laser level mount of FIG. 1 with the laser platform in a first, unrotated position, according to an exemplary embodiment.

Referring to FIGS. 1-2, various aspects of a motorized rotational device, such as a motorized laser projection mount, shown specifically as motorized laser level mount 10, are shown. Motorized laser level mount 10 includes a rotatable component, such as rotatable or pivotable laser platform 12, a housing cover 14, a housing 16, legs 18, adjustable feet 20 and a platform adjustment mechanism 130 (see e.g., FIG. 12). Housing cover 14 is coupled to the housing 16. Rotatable laser platform 12 includes an upper or outward facing surface 22 on which a bottom surface of a laser projection device or laser level 30, shown schematically rests. Rotatable laser platform 12 further includes an opposing pair of side plates 24. Side plates 24 include grooves 26 extending in a generally horizontal orientation, parallel to the major axis of outward facing surface 22 to help retain the laser projection device 30 on laser platform 12. In a specific embodiment, the grooves 26 act as a laser projection device 30 engagement structure. In other embodiments, laser platform 12 includes a connector, such as a threaded connector that engages a mounting hole located along a bottom surface of the laser projection device 30. Antenna 28 (see e.g., FIG. 12) is configured to receive a signal from a remote control device (e.g., a remote control, phone, etc.). Antenna 28 is in communication with platform adjustment mechanism 130.

Housing 16 includes a front surface 27 that is generally perpendicular (e.g., 90°±5°) to outward facing surface 22 of rotatable laser platform 12. Motorized laser level mount 10 includes a front channel 29 extending downward from rotatable laser platform 12 along front surface 27. Front channel 29 is centered on front surface 27 between the front legs 18. A vertical axis of rotation 32 about which laser platform 12 rotates extends through front channel 29.

Figure 3:
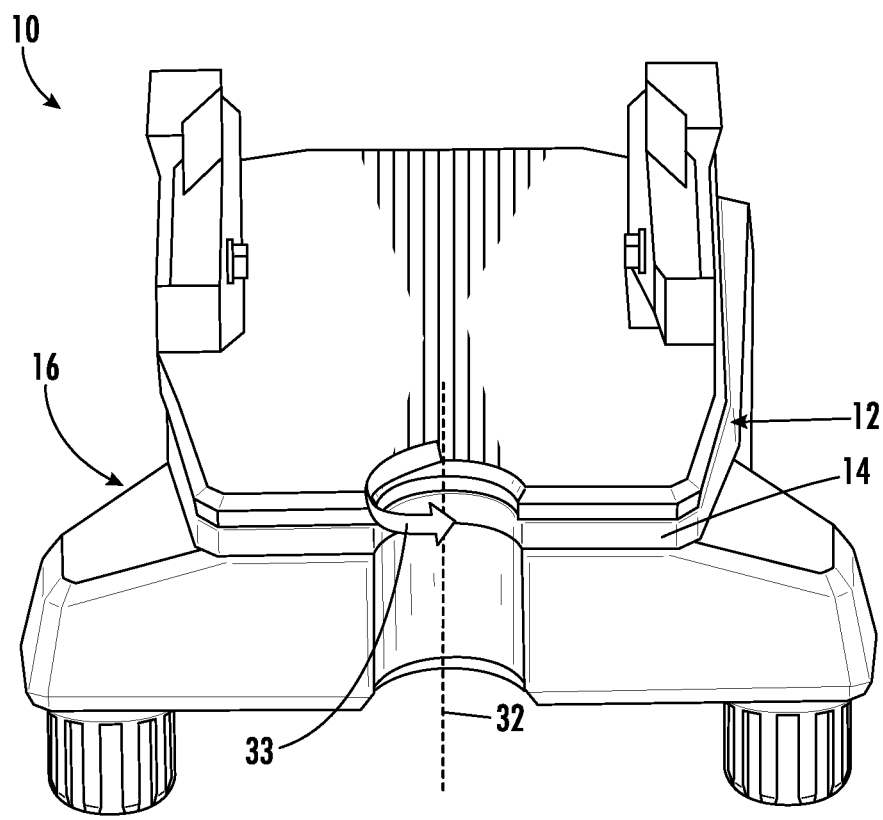
FIG. 3 is a front perspective view of the motorized laser level mount of FIG. 1 with the laser platform in a second, rotated position, according to an exemplary embodiment.
Figure 4:
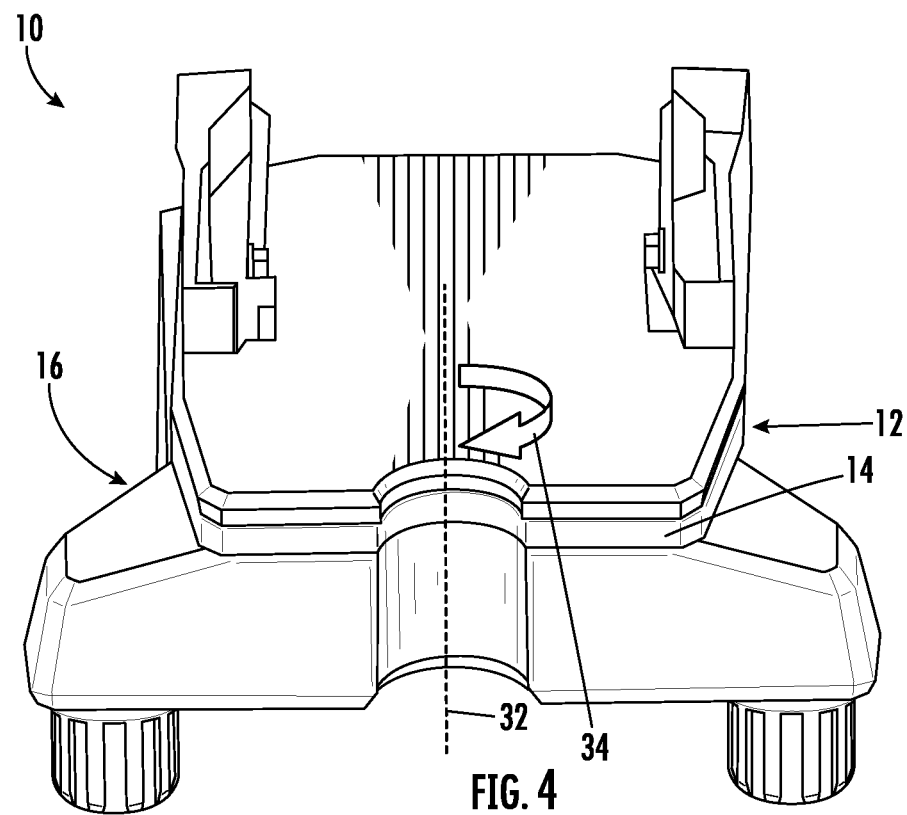
FIG. 4 is a front perspective view of the motorized laser level mount of FIG. 1 with the laser platform in a third, rotated position, according to an exemplary embodiment.

Referring to FIGS. 3-4, rotational movement of laser platform 12 about vertical axis 32 is shown. In other words, platform 12 is rotationally engaged with housing cover 14. The rotational movement in a counterclockwise direction shown by arrow 33 from FIG. 1 to FIG. 3 demonstrates laser platform 12 is not at a fixed position relative to housing cover 14 or housing 16, allowing the user to reposition laser level mount 10 and laser projection device 30 as needed (e.g., for alignment on a work surface/work piece). Similarly, FIG. 4 shows the rotational movement of laser platform 12 in a clockwise direction shown by arrow 34. As laser platform 12 rotates about vertical axis 32, the cutout portions of laser platform 12, housing cover 14, and housing 16 remain aligned.

Figure 5:
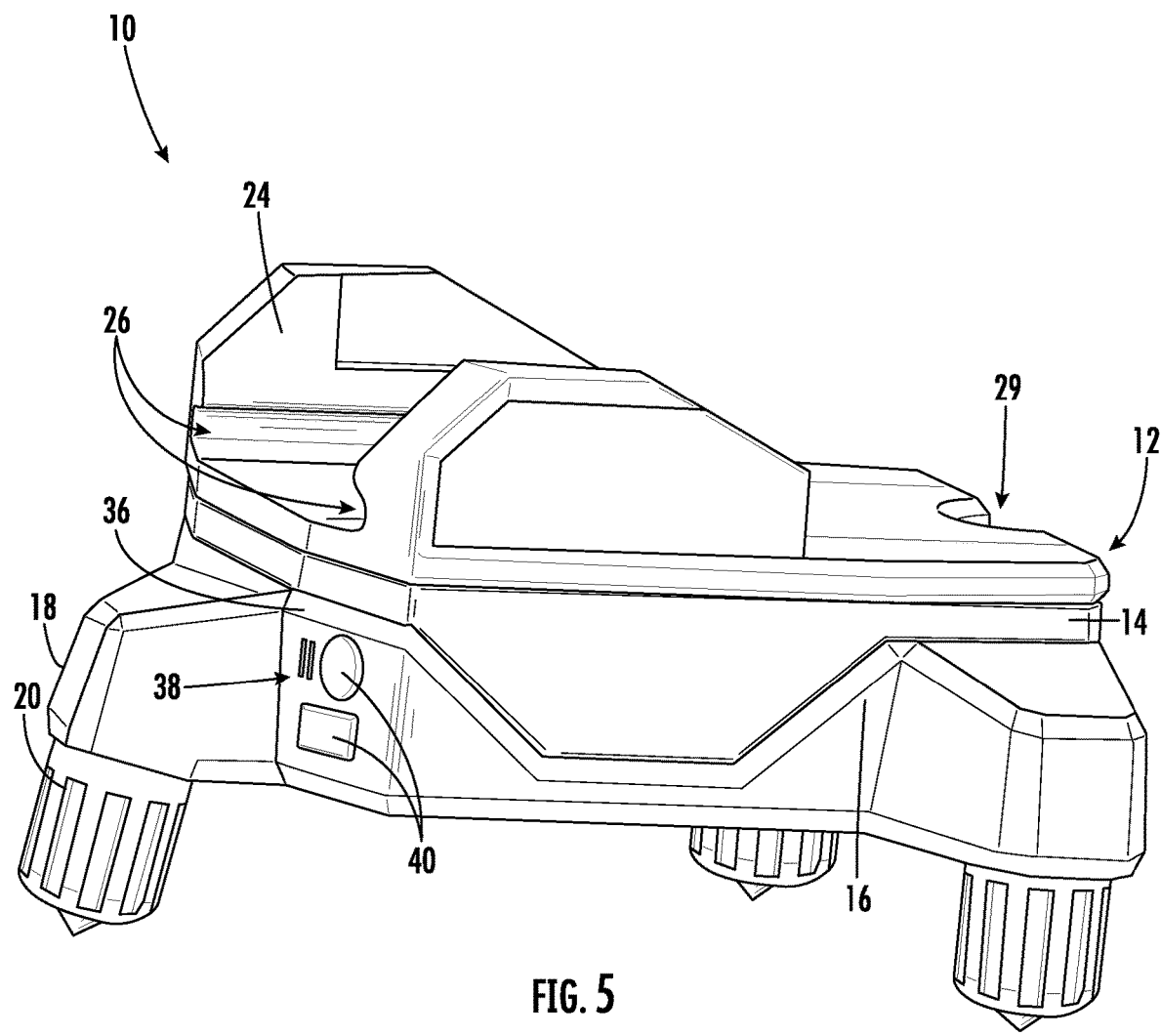
FIG. 5 is a right-side perspective view of the motorized laser level mount of FIG. 1, according to an exemplary embodiment.

Referring to FIG. 5, a right-side perspective view of motorized laser level mount 10 is shown. Laser level mount 10 includes a rear surface 36 of housing 16 opposing front surface 27. Another leg 18 is positioned centrally on rear surface 36. A portion of rear surface 36 includes an interface pad, shown as button pad 38 with a plurality of interface elements, shown as physical buttons 40. The physical buttons 40 may permit a user to turn on motorized laser level mount 10, pair or sync laser level mount 10 with remote control device 600 (see e.g., FIG. 33).

Figure 6:
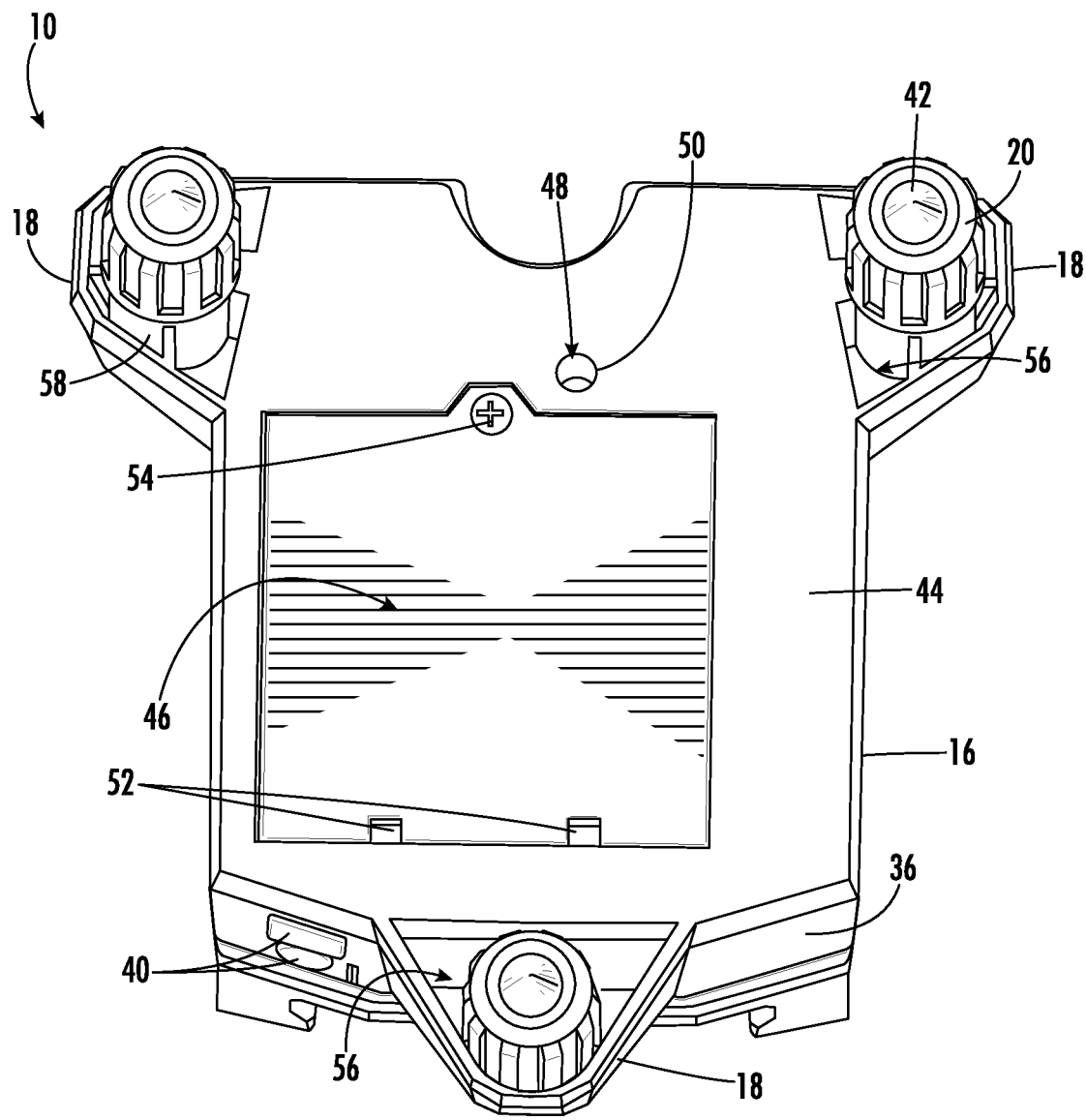
FIG. 6 is a bottom perspective view of the motorized laser level mount of FIG. 1, according to an exemplary embodiment.
Figure 7:
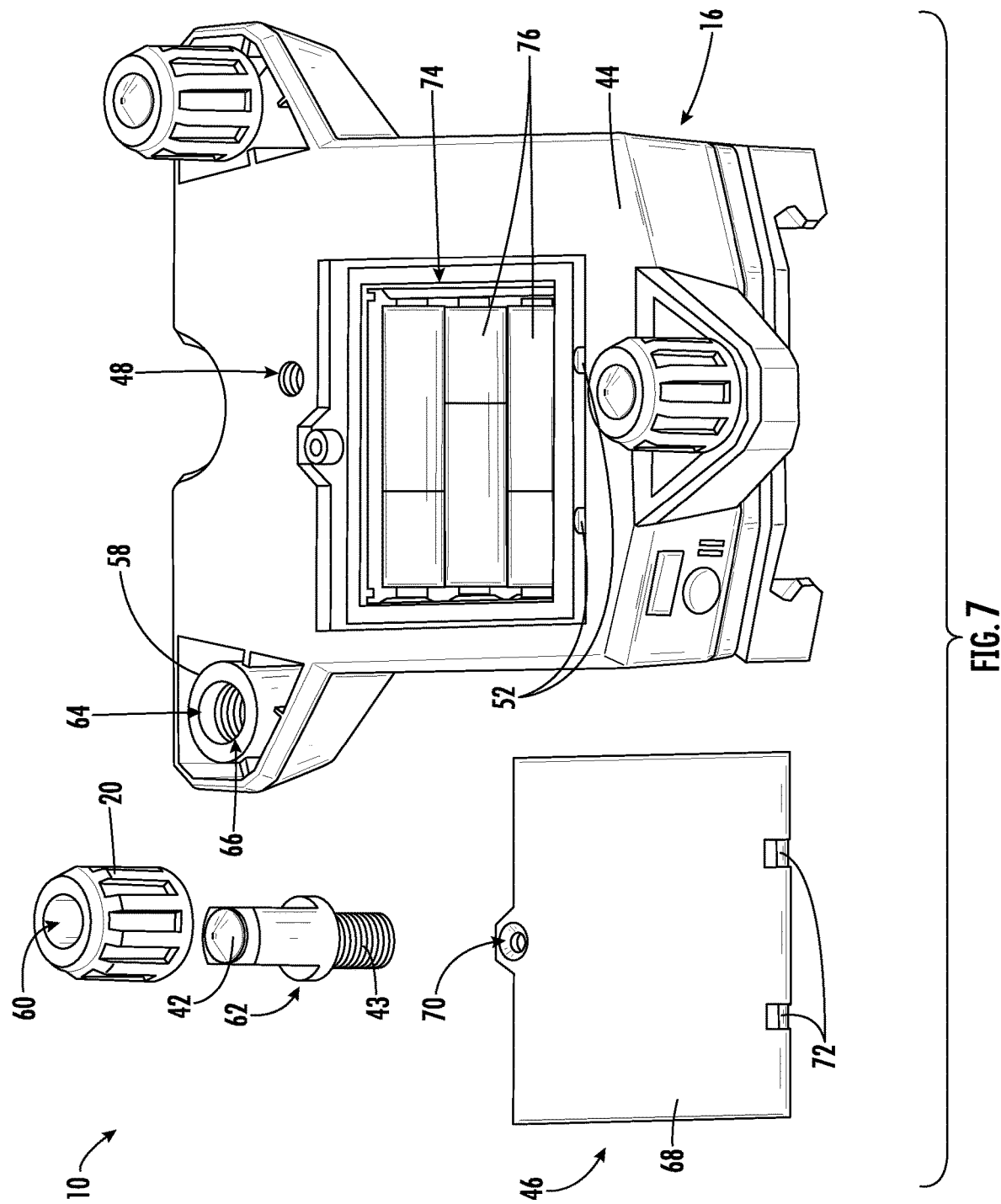
FIG. 7 is a partially exploded bottom perspective view of the motorized laser level mount of FIG. 1, according to an exemplary embodiment.
Figure 8:
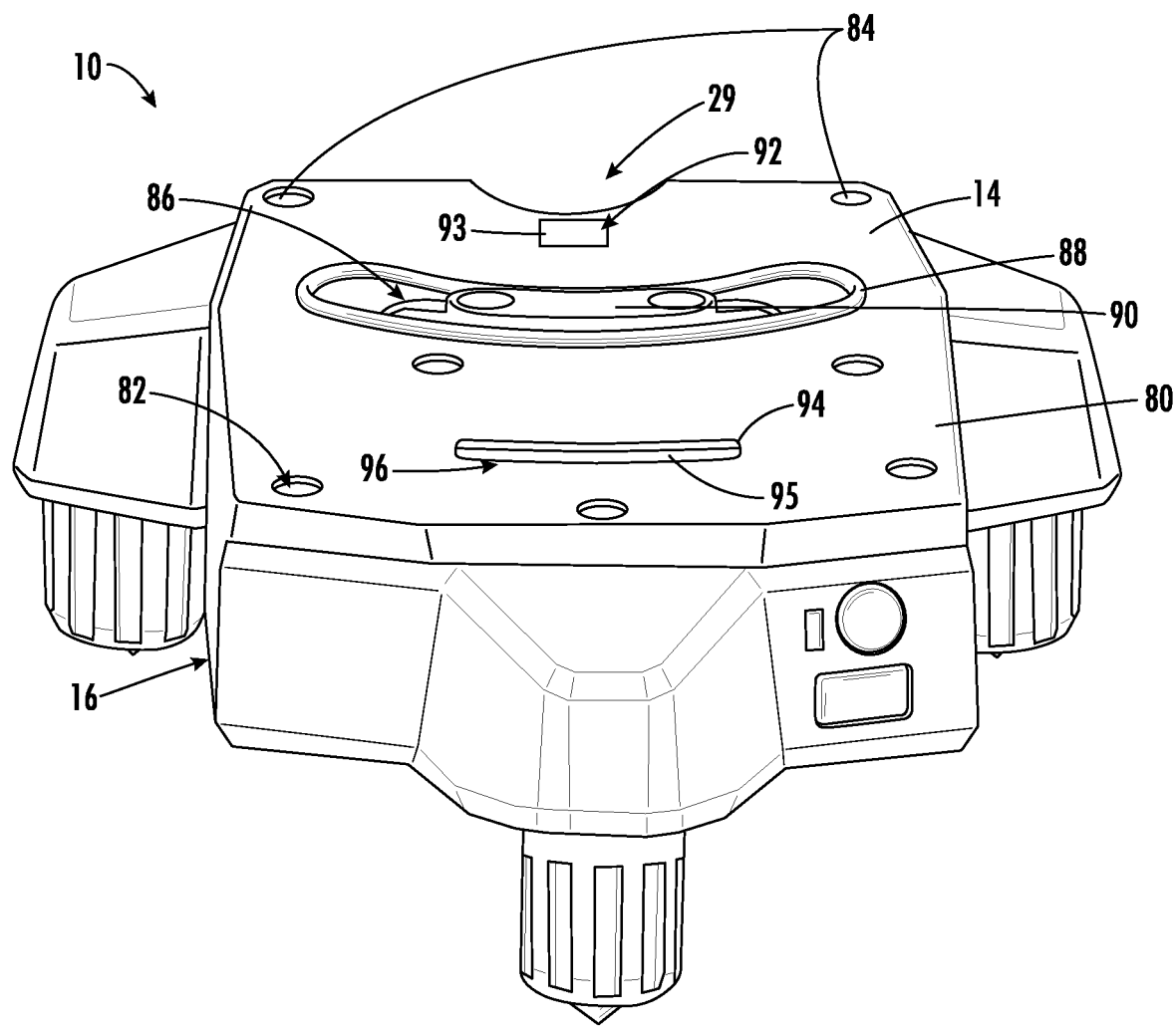
FIG. 8 is a rear perspective view of the motorized laser level mount of FIG. 1 with the laser platform removed, according to an exemplary embodiment.

Referring to FIGS. 6-7, a bottom perspective view of motorized laser level mount 10 is shown. Housing 16 further includes a lower or bottom surface 44. Bottom surface 44 includes a recess, shown as battery compartment 74. Battery compartment 74 is configured to receive a power source, shown as batteries 76. In a specific embodiment, battery compartment 74 is configured to receive three AA batteries. In other embodiments, batteries 76 are a rechargeable power tool battery, such as a lithium ion power tool battery. A battery compartment door 46 is configured to rotate open and closed. Battery compartment door 46 includes an outer surface 68 with an opening 70 to receive a fastener 54 (e.g., screw) when battery compartment door 46 is in a sealed or closed position. When fastener 54 is removed, cylindrical elements 72 can be rotated within loops or knuckles 52 to open battery compartment door 46. Bottom surface 44 further includes an opening or bore 48 that includes a threaded insert 50. Threaded insert 50 is configured for easy connection to another device like a stand or tripod.

Each of the legs 18 include a recess 56 with a projection, shown as a cylinder 58. A bore 64 extends at least part way through each cylinder 58 and each bore 64 includes a threaded insert 66. The feet 20 each include an opening 60 configured to receive a foot spike 42. Foot spike 42 is positioned on one end of a threaded connector 62 that has a threaded section 43 on the opposing end. When a user turns foot 20 in a first direction the distance between the foot 20 and leg 18 increases. When a user turns foot 20 in a second direction, opposite the first direction, the distance between foot 20 and leg 18 decreases allowing for the height of the laser level mount and an individual foot to be adjusted as necessary (e.g., for uneven surface). Foot spike 42 is capable of being planted securely into a soft ground surface (e.g., soil) to provide stability for use of motorized laser level mount 10 outdoors.

Referring to FIGS. 8-11, various aspects of the rotational coupling between rotating laser platform 12 and housing cover 14 are shown. Housing cover 14 further includes an upper surface 80 that laser platform 12 rotates or pivots on. Housing cover 14 includes a plurality of bores 82 configured to receive a plurality of fasteners 84 (e.g., screws) that couple housing cover 14 to housing 16. Housing cover 14 further includes a slot 86 opening into housing 16. Slot 86 guides the movement of the platform adjustment mechanism 130 and the laser platform 12 during rotation, helping to control the arc laser platform 12 travels in. An upper gear section 90 of the platform adjustment mechanism 130 extends upward through slot 86.

Housing cover 14 includes a front rib 92 extending upward from upper surface 80. Front rib 92 is positioned in a generally centered position relative to front legs 18 and is between front channel 29 and slot 86. Front rib 92 includes a surface 93 that acts as a bearing surface for laser platform 12. Housing cover 14 further includes a rear rib 94 positioned between slot 86 and rear leg 18. Rear rib 94 has a dovetail shape with an angled surface 95 extending from upper surface 80 toward laser platform 12 at an angle and defining a space 96 between rear rib 94 and upper surface 80. Rear rib 94 also acts as a bearing surface for laser platform 12. The front rib 92 and rear rib 94 are designed to interface with corresponding surfaces on laser platform 12. In a specific embodiment, front rib 92 and rear rib 94 are lubricated. In other embodiments, ball bearings are used to interface with corresponding surfaces on the laser platform and housing cover.

Figure 9:
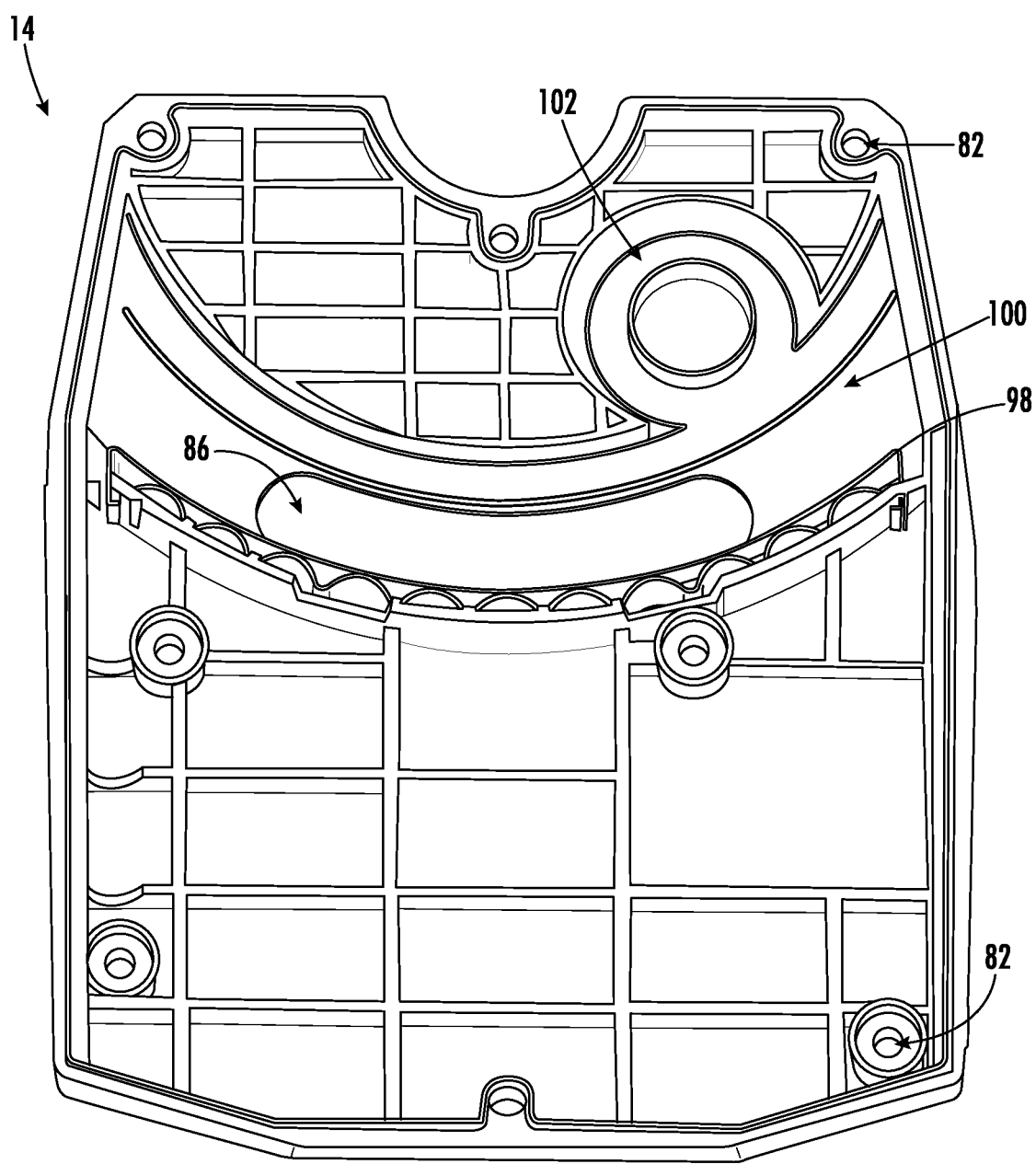
FIG. 9 is a detailed perspective view of the inward facing portion of a housing cover of the motorized laser level mount of FIG. 1, according to an exemplary embodiment.

Referring to FIG. 9, a perspective view of the inward facing portion of the housing cover 14 is shown. Housing cover 14 includes a recess 100 extending at least partially around slot 86. Recess 100 is configured and/or shaped to receive upper gear section 90. Housing cover contains a spring, shown as leaf spring 98 positioned along the rear portion of slot 86 and recess 100. Leaf spring 98 forces upper gear section 90 against the face of slot 86 limiting the rocking and/or jerking of laser platform 12 during rotation. Housing cover includes a generally circular recess 102 shaped to receive a spur gear 136 (see e.g., FIGS. 12 and 15-16).

Figure 10:
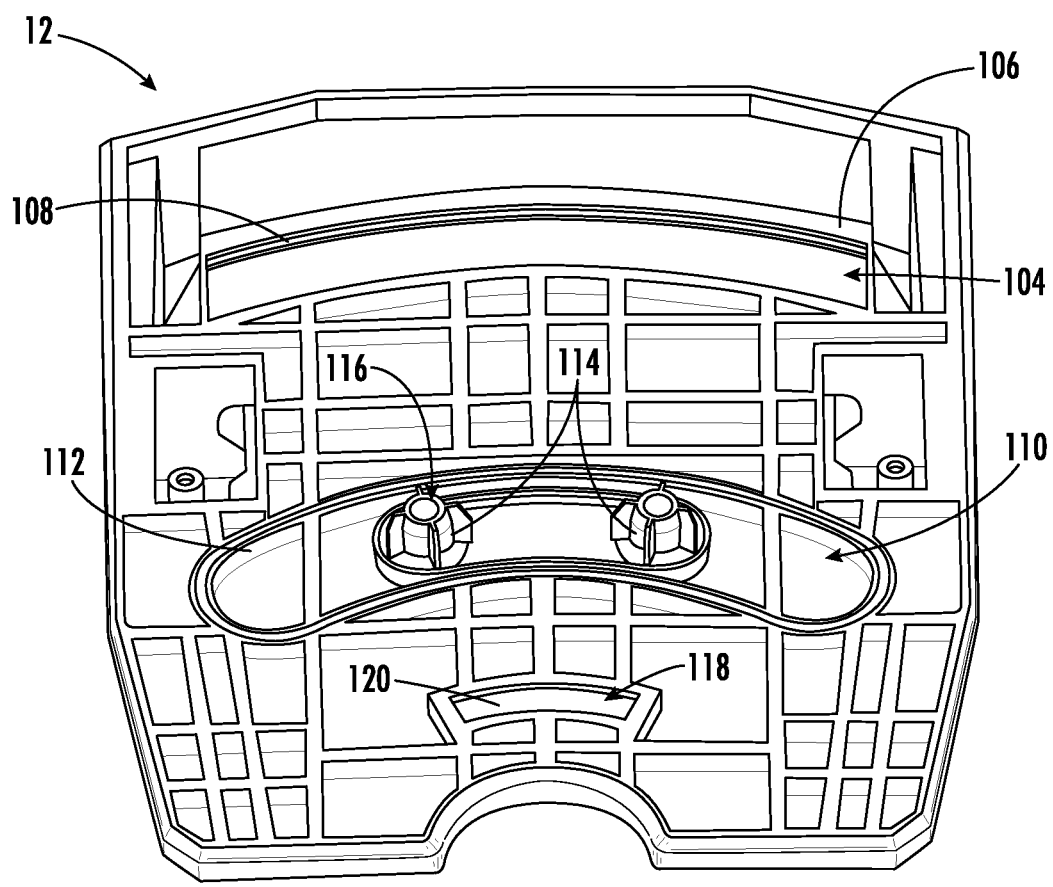
FIG. 10 is a detailed perspective view of the inward facing portion of the laser platform of the motorized laser level mount of FIG. 1, according to an exemplary embodiment.

Referring to FIG. 10, a perspective view of the inward or downward facing surface of laser platform 12 is shown. Laser platform 12 includes a rear recess 104 with a wall 106 configured to cooperate with rear rib 94 of housing cover 14. Wall 106 includes an angled surface 108 extending downward toward housing cover 14 in a manner that opposes angled surface 95 of rear rib 94 (see e.g., FIG. 11). Laser platform 12 further includes a middle recess 110 shaped to surround slot 86 and curved component 88 (see e.g., FIG. 8) that supports laser platform 12 and helps to limit any rocking movement during rotation of laser platform 12. A wall 112 defines middle recess 110 and is positioned to surround slot 86 and curved component 88. Within middle recess 110 a pair of bosses or protrusions 114 extend downward toward housing cover 14. Each protrusion 114 includes a bore 116 to receive the fasteners that extend through and connect laser platform 12 to upper gear section 90. Laser platform 12 further includes a front recess 118 with an inner surface 120. Front recess 118 is shaped to receive and cooperate with front rib 92 of housing cover 14.

Figure 11:
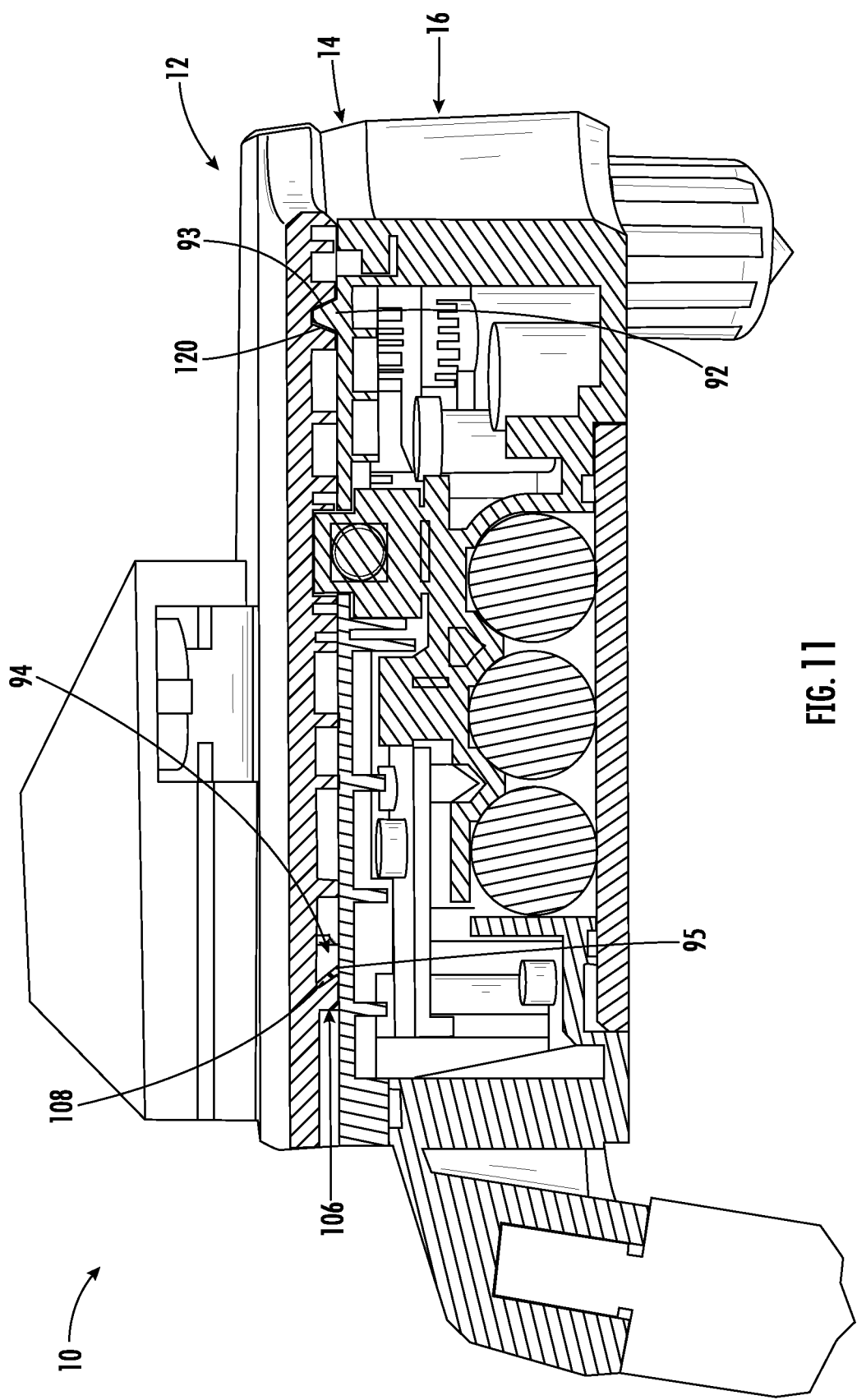
FIG. 11 is a cross-sectional, view of the rotational coupling mechanism of the motorized laser level mount of FIG. 1, according to an exemplary embodiment.

Referring to FIG. 11, the interaction between laser platform 12 and housing cover 14 that allows for the rotation of laser platform 12 is shown. The surface 93 of front rib 92 is positioned within front recess 118 such that the inner surface 120 cooperates with surface 93 of front rib 92 during rotation of laser platform 12. Similarly, the angled surface 95 of rear rib 94 opposes and interfaces with angled surface 108 of wall 106 of laser platform 12. The dovetail shape of rear rib 94 allows for the rotation of laser platform 12 while securing laser platform 12 so that it is not pulled away from housing cover 14 during movement of laser platform 12.

Figure 12:
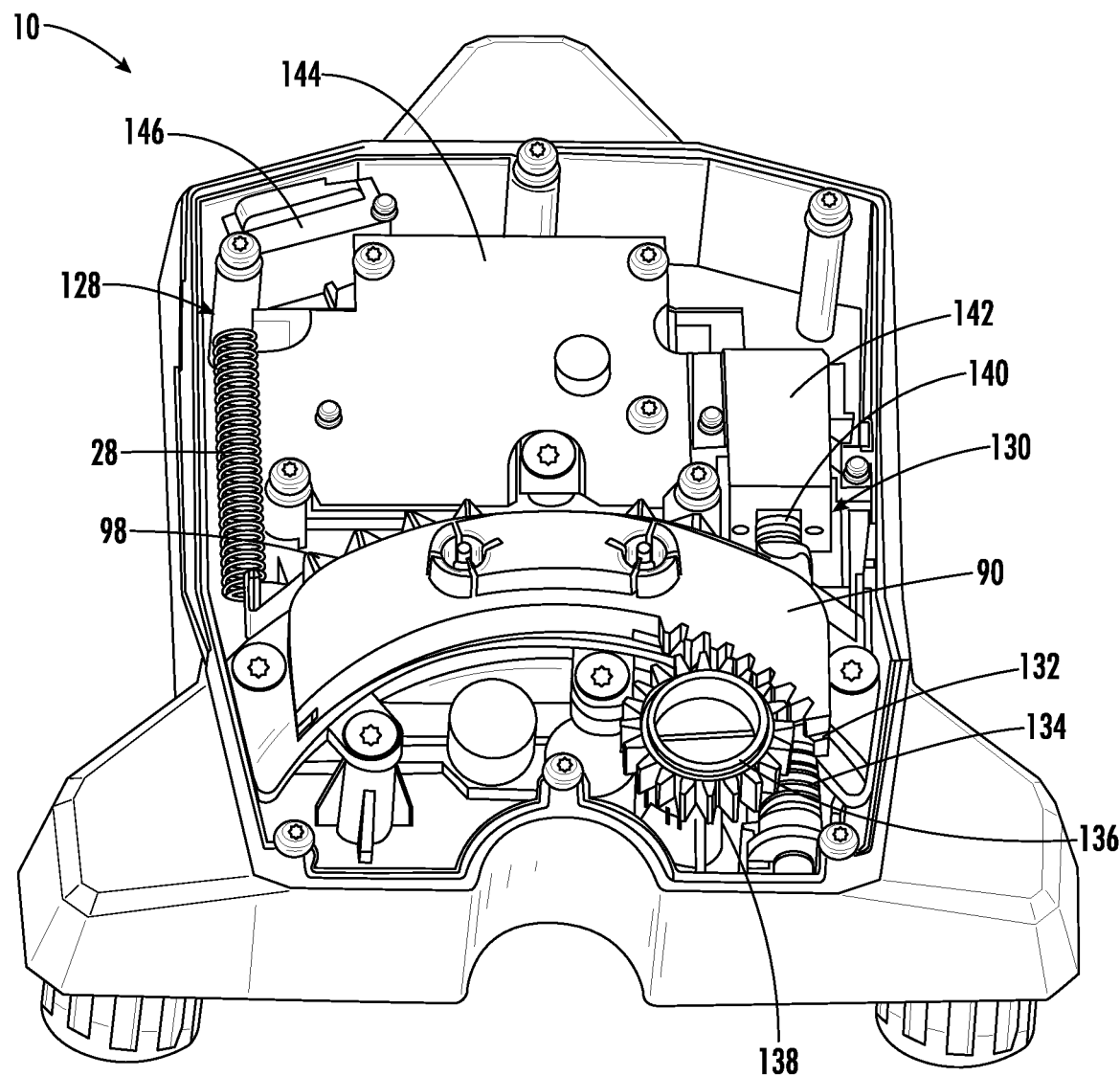
FIG. 12 is a front perspective view of the motorized laser level of FIG. 1 with the laser platform and housing cover removed, according to an exemplary embodiment.

Referring to FIG. 12, a perspective view of the platform adjustment mechanism 130 positioned within a recess 128 of housing 16 is shown. Platform adjustment mechanism 130 includes upper gear section 90, lower gear section 132, worm 134, spur gear 136, worm wheel 138 and a motor 140. Motor 140 is at least partially surrounded by and coupled to a motor plate 142 and coupled to the antennas 28. In a specific embodiment motor 140 is a stepper motor that moves in steps and or discrete segments. In another embodiment, motor 140 is a direct current (DC) motor and in such an embodiment, an optical encoder tracks the rotations of motor 140 during rotation of laser platform 12. In a specific embodiment, an output shaft of motor 140 is directly coupled to the worm 134. In another embodiment, motor 140 is coupled to a gear box with an output that is coupled to worm 134.

A main circuit board, shown as printed circuit board assembly (PCBA) 144 is positioned and fastened within recess 128 of housing 16 between upper gear section 90 and a button housing 146 and adjacent to motor 140. In a specific embodiment, button housing 146 includes another small PCBA positioned within button housing 146.

Figure 13:
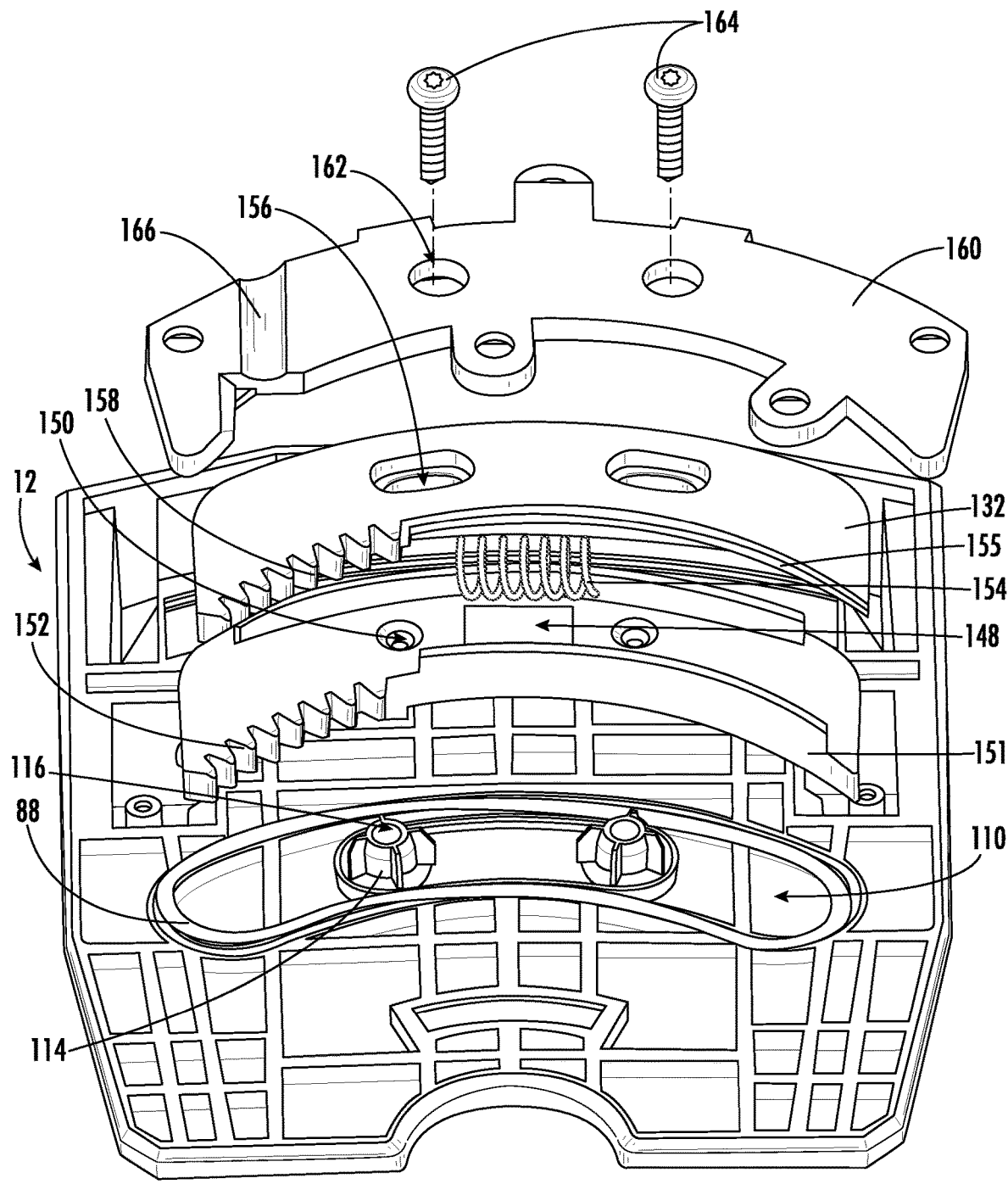
FIG. 13 is a partially exploded perspective view of the inward facing portion of the laser platform and a portion of the gear section of the motorized laser level mount of FIG. 1, according to an exemplary embodiment.

Referring to FIG. 13, a partially exploded perspective view of the inward facing portion of the laser platform 12 and a portion of platform adjustment mechanism 130 with the housing cover 14 removed. The portion of the platform adjustment mechanism 130 shown is designed to mitigate the backlash within the system. Upper gear section 90 includes a cavity 148 to hold a spring, shown as compression spring 154. Upper gear section 90 further includes a pair of bores 150 positioned on opposing sides of cavity 148 and aligned with the bores 116 of protrusions 114 positioned on laser platform 12. Upper gear section 90 is pressed onto the protrusions 114 and is positioned between lower gear section 132 and laser platform 12. One end of a front facing, curved side 151 of upper gear section 90 includes a plurality of gear teeth 152 to engage with the teeth 137 of spur gear 136 (see e.g., FIG. 14).

Lower gear section 132 similarly includes a front facing, curved side 155 and at one end includes gear teeth 158. Gear teeth 158 of lower gear section and gear teeth 152 of upper gear section 90 are positioned on the same end. Lower gear section 132 further includes a pair of elongated openings 156 that align with bores 150 of upper gear section 90 and bores 116 of laser platform 12. A support plate 160 is positioned underneath (opposite frame of reference to FIG. 13) lower gear section 132 and includes bores 162 that are aligned with elongated openings 156 of lower gear section 132. Support plate 160 further includes a groove extending in a direction of the major axis of laser platform 12. Groove 166 is shaped to receive and engage with a portion of worm 134 (see e.g., FIG. 14).

A pair of fasteners 164 extend through support plate 160, lower gear section 132, upper gear section 90 into bores 116 to fasten this portion of the platform adjustment mechanism 130 to laser platform 12. In a specific embodiment, fasteners 164 are plastite fasteners. In a specific embodiment, wave springs may be positioned around each fastener 164. In that embodiment, the fasteners 164 bottom out in the bores 116 of protrusions 114, slightly compressing the wave springs. This arrangement allows the lower gear section to move along an arc but resists vertical movement. As the upper gear section 90 is rotated, spring 154 is compressed. The rotation range of upper gear section 90 allows for gear teeth 152 to be aligned with teeth 137 of spur gear 136 so the teeth are meshed or engaged. Therefore, the teeth 137 of spur gear 136 are clamped by a spring force, eliminating backlash.

Figure 14:
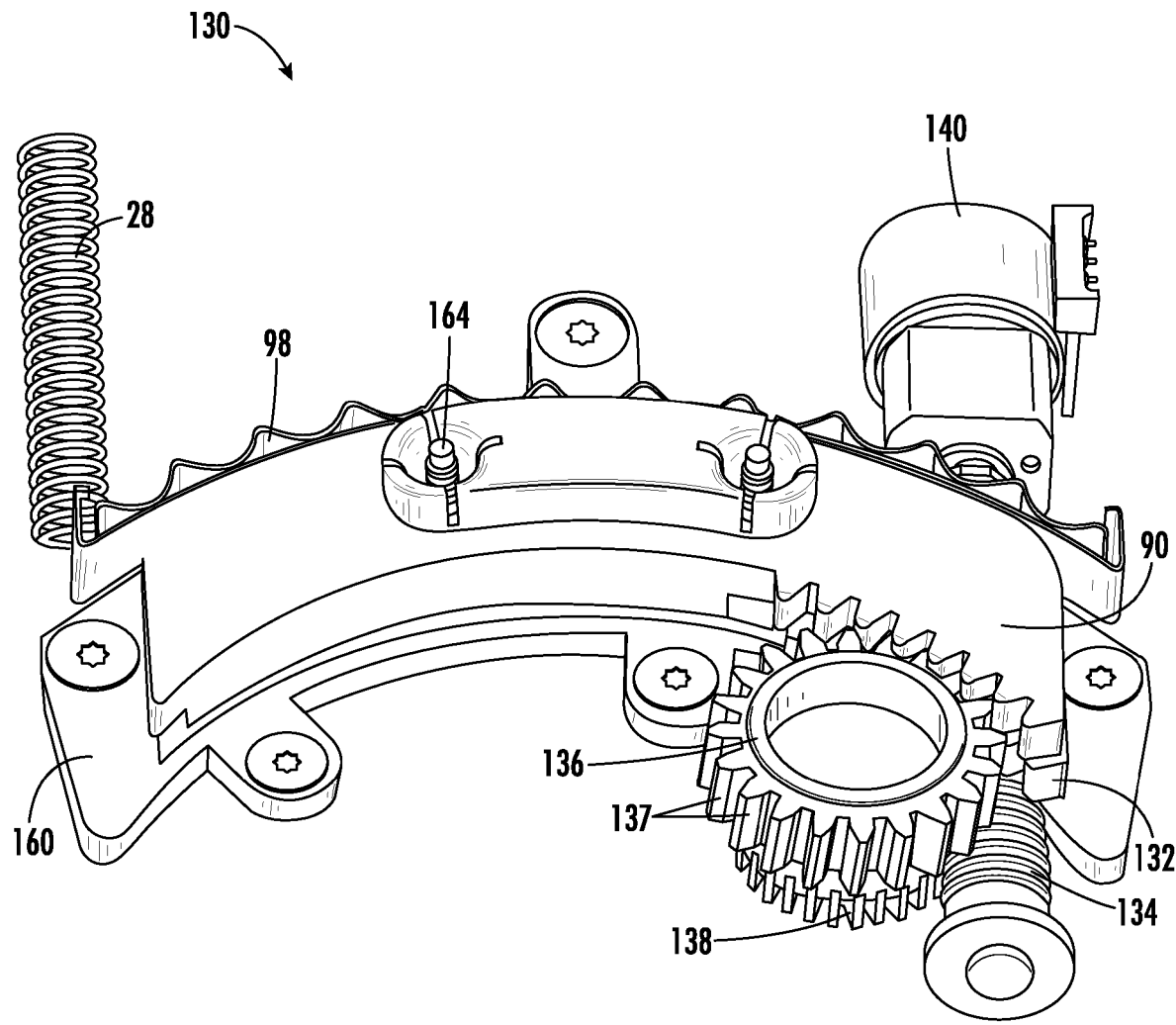
FIG. 14 is a perspective view of the gearing of motorized laser level mount of FIG. 1, according to an exemplary embodiment.

Referring to FIG. 14, a perspective view from above of the motor 140 and the connection to the gearing system that rotates laser platform 12 is shown. Antenna 28 is positioned at one end of leaf spring 98. Leaf spring 98 pushes and/or forces upper gear section 90 against the face of slot 86 to limit the rocking and jerking of laser platform 12 during rotation.

Figure 15:
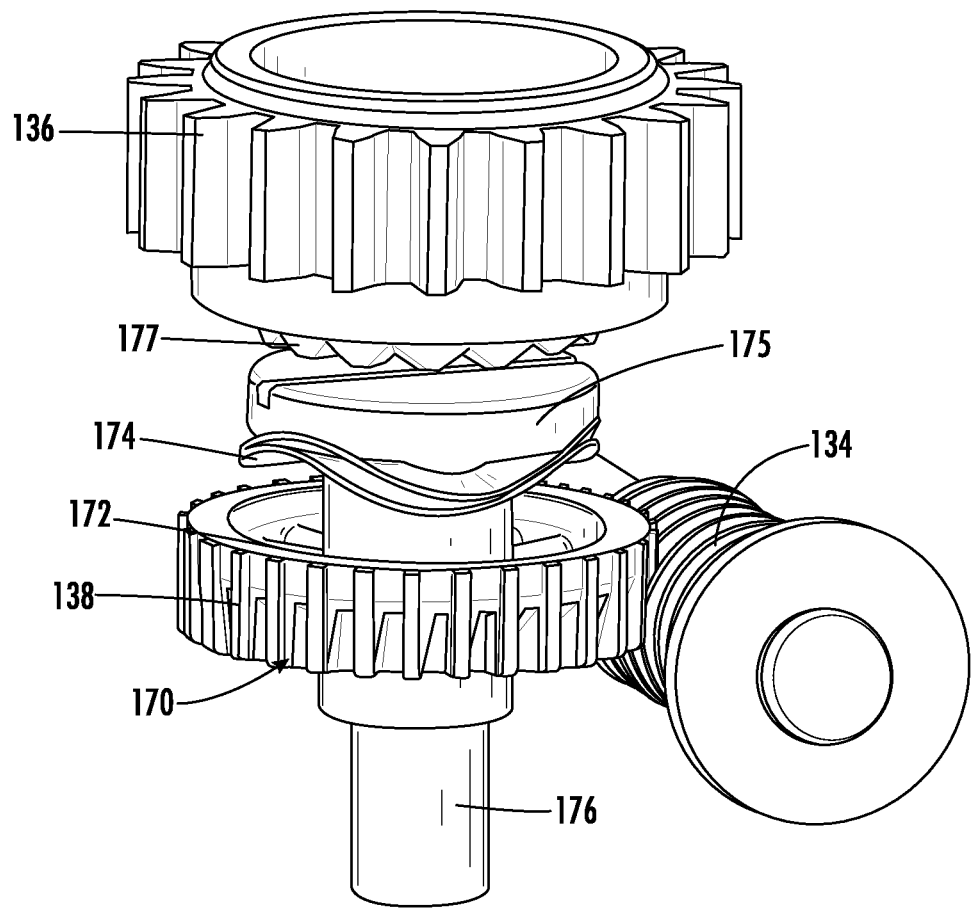
FIG. 15 is a detailed perspective view of a worm drive of the motorized laser level of FIG. 1, according to an exemplary embodiment.
Figure 16:
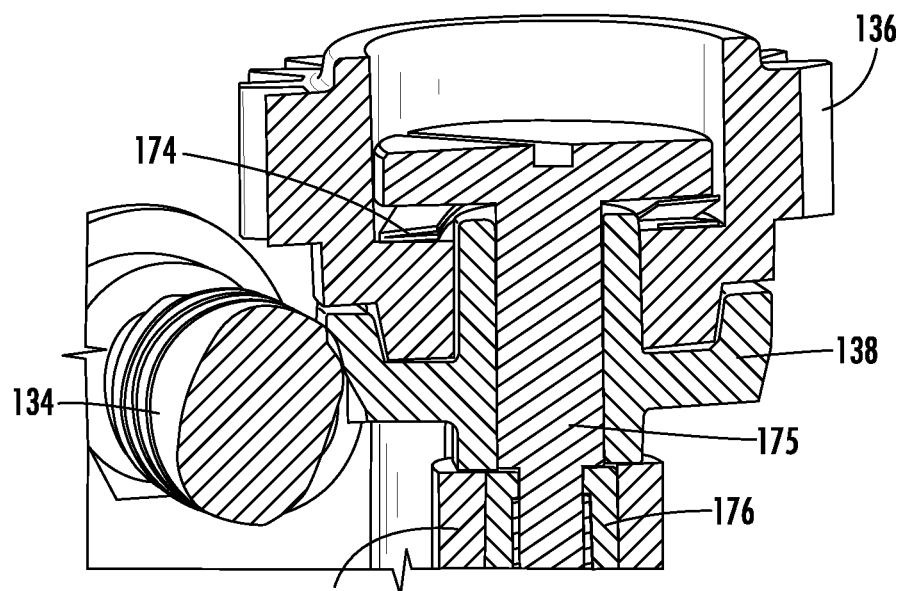
FIG. 16 is a cross-sectional view of the worm drive of FIG. 14, according to an exemplary embodiment.

Referring to FIGS. 15 and 16, a detailed view of the engagement between the worm 134, worm wheel 138 and spur gear 136, are shown. FIG. 15 shows a partially exploded view with spur gear 136 separated from worm wheel 138. In one embodiment, the teeth 137 of spur gear 136 include compression springs that cause the teeth of the mating gear (e.g., upper gear section 90 and/or lower gear section 132) to be compressed, reducing the backlash as the user changes the direction the laser platform 12 is rotated.

As previously mentioned, the worm wheel 138 uses a spur gear design meaning the openings 170 are designed to be forced into worm 134. Worm wheel 138 includes ridges or waves 172 on a surface facing the spur gear 136. Wave springs 174 are positioned within spur gear 136 below a pin 175 and force the worm wheel 138 down and into engagement with worm 134 reducing backlash. The ridges or waves 172 of the worm wheel 138 engage with ridges 177 on spur gear 136. Pin 175 extends through and rotatably couples spur gear 136 and worm wheel 138. A cap 176 is positioned on the shaft of pin 175 and received within a portion 178 of housing 16.

Referring to FIGS. 17-22 various aspects of a motorized rotational device, such as a motorized laser projection mount, shown specifically as motorized laser level mount 210, are shown according to another exemplary embodiment. Motorized laser level mount 210 includes a rotatable component or platform, such as rotatable or pivotable laser platform 212, a housing cover 214, a housing 216, legs 218, adjustable feet 222 and a platform adjustment mechanism 230 (see e.g., FIG. 23).

Figure 17:
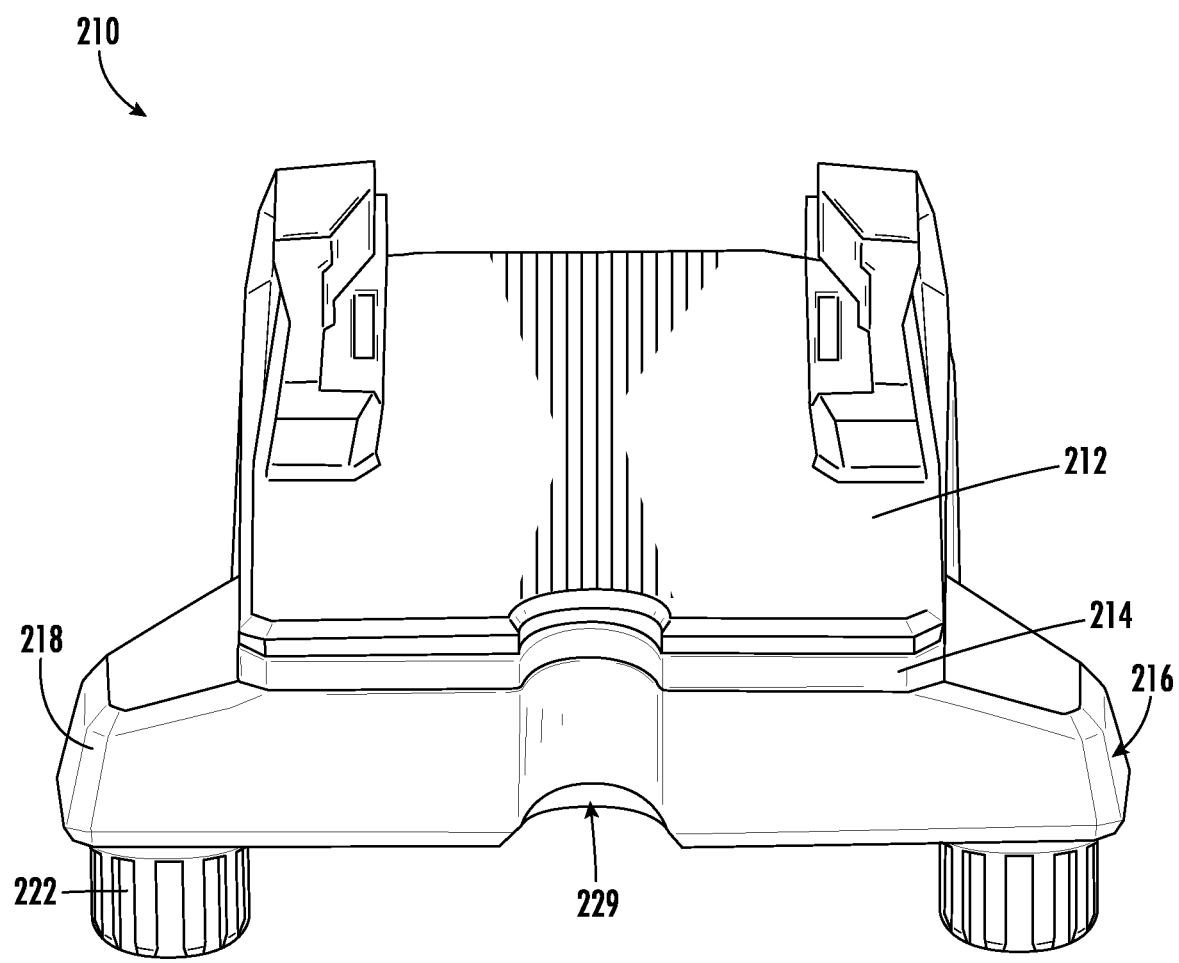
FIG. 17 is a front perspective view of a motorized laser level mount, according to another exemplary embodiment.

Referring to FIG. 17, a perspective of a motorized laser level mount 210 with a backlash detection system 220 (see e.g., FIG. 23) is shown, according to an exemplary embodiment. Backlash detection system 220 can be utilized with a motorized device such as motorized laser level mounts 10 or 210 to increase the precision of the movement of the device as described above. Motorized laser level mount 210 is substantially the same as motorized laser level mount 10 except for differences discussed herein.

Figure 18:
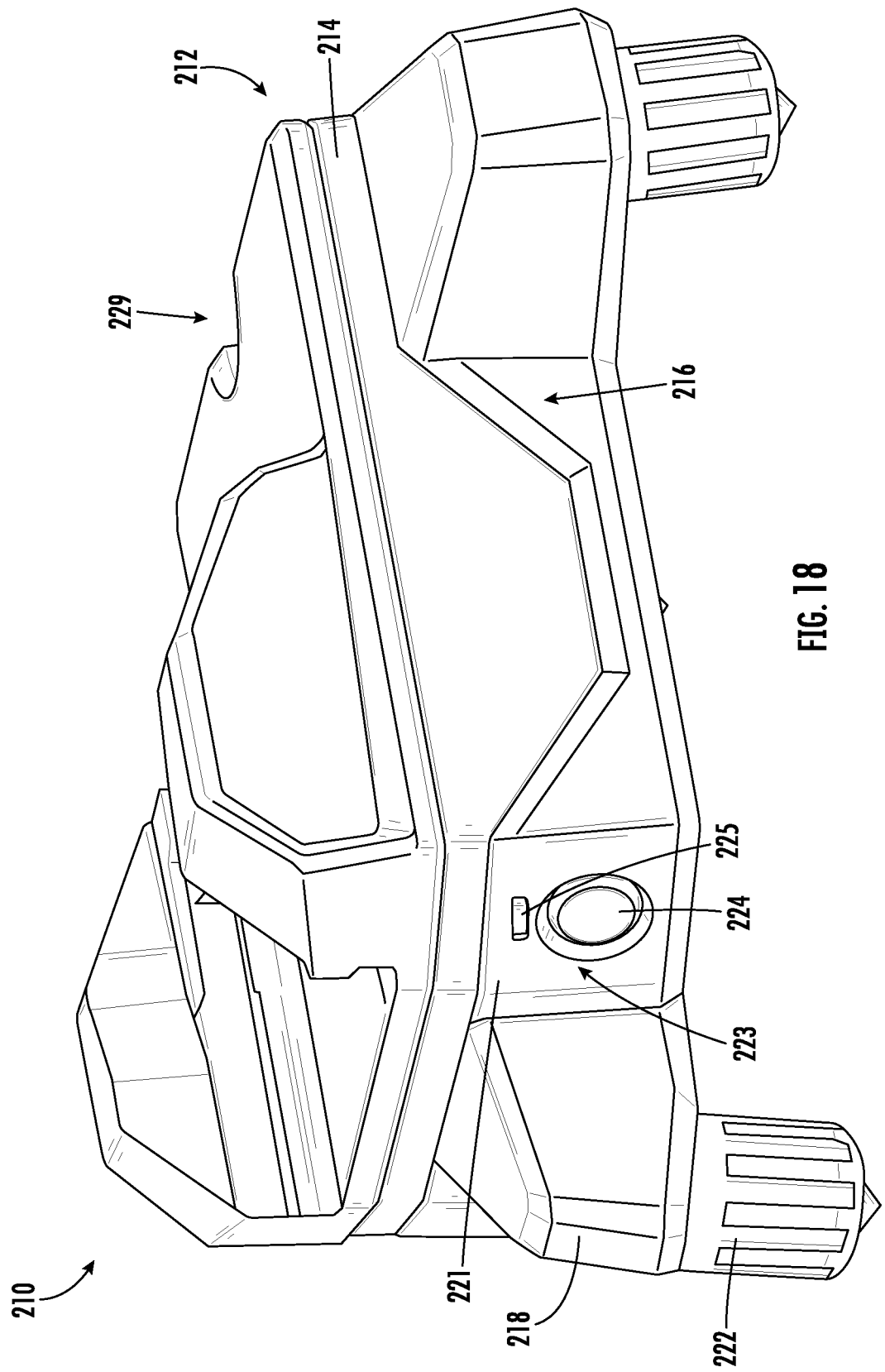
FIG. 18 is a right-side perspective view of the motorized laser level mount of FIG. 17, according to an exemplary embodiment.
Figure 19:
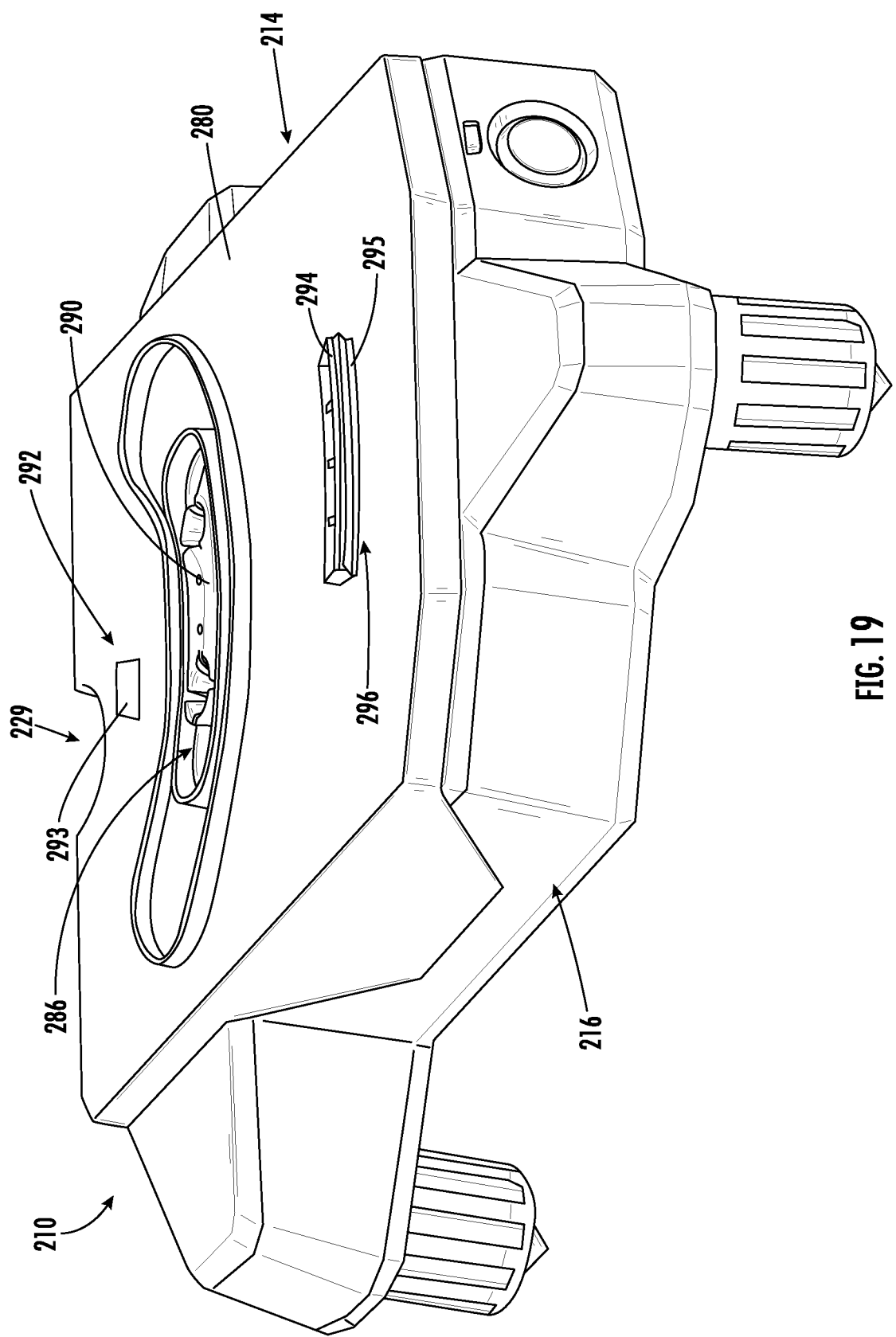
FIG. 19 is a rear perspective view of the motorized laser level mount of FIG. 17 with the laser platform removed, according to an exemplary embodiment.

Referring to FIG. 18, a right-side perspective view of motorized laser level mount 210 is shown. Laser level mount 210 includes a rear surface 221 of housing 216 opposing a front surface 227. A leg 218 is positioned between the sides of housing 216 in a generally central position on rear surface 221. A portion of rear surface 221 includes an interface pad, shown as button pad 223 with a plurality of interface elements, shown as a physical button 224. The physical button 224 may permit a user to turn on motorized laser level mount 210, pair or sync laser level mount 210 with remote control device 600 (see e.g., FIG. 33). As will be discussed in greater detail below, a remote control device can further be used to toggle between fast and slow rotation of laser platform 212. In a specific embodiment, an indicator light 225, may display a power status (i.e., on/off). In a specific embodiment, indicator light 224 displays communication (i.e., flashing, color light, etc.) indicating an error has occurred.

Referring to FIGS. 19-22, various aspects of the rotational coupling or engagement between rotating laser platform 212 and housing cover 214 are shown. In other words, platform 212 is rotationally engaged with the housing cover 214. Housing cover 214 further includes an upper surface 280 that laser platform 212 rotates or pivots on. Housing cover 14 includes a slot 286 opening into housing 216. Slot 286 guides the movement of the platform adjustment mechanism 230 and the laser platform 212 during rotation, helping to control the arc laser platform 212 travels in. An output slider 290 of the platform adjustment mechanism 230 extends upward through slot 286 to engage and/or drive laser platform 212. In other words, platform adjustment mechanism 230 is coupled to laser platform 212 such that the platform adjustment mechanism 230 drives rotation of laser platform 212.

Housing cover 214 includes a front rib 292 extending upward from upper surface 280. Front rib 292 is positioned in a generally centered position relative to front legs 218 and is between front channel 229 and slot 286. Front rib 292 includes a surface 293 that acts as a bearing surface for laser platform 212. Housing cover 214 further includes a rear rib 294 positioned between slot 286 and rear leg 218. Rear rib 294 has a dovetail shape with an angled surface 295 extending from upper surface 280 toward laser platform 212 at an angle and defining a space 296 between rear rib 294 and upper surface 280. Rear rib 294 also acts as a bearing surface for laser platform 212. The front rib 292 and rear rib 294 are designed to interface with corresponding surfaces on laser platform 212. In a specific embodiment, front rib 292 and rear rib 294 are lubricated.

Figure 20:
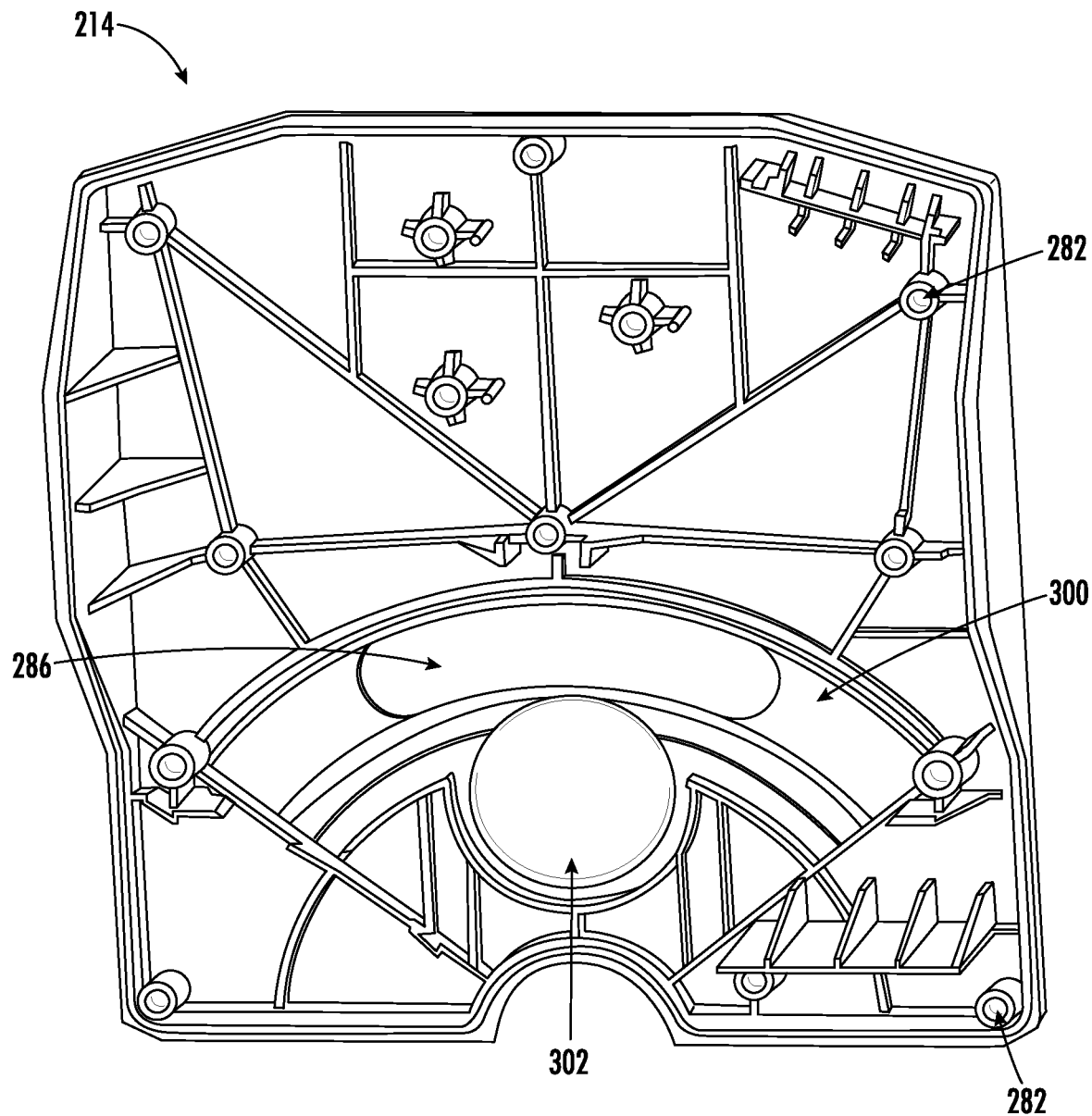
FIG. 20 is a detailed perspective view of the inward facing portion of a housing cover of the motorized laser level mount of FIG. 17, according to an exemplary embodiment.

Referring to FIG. 20, a perspective view of the inward facing portion of the housing cover 214 is shown. Housing cover 214 includes a recess 300 extending at least partially around slot 286. Recess 300 is configured and/or shaped to receive output slider 290. Housing cover 214 includes a generally circular recess 302 shaped to receive an output driver 236 (see e.g., FIGS. 23 and 26-27). Housing cover 214 further includes a plurality of projections includes bores 282. Bores 282 are configured to engage with projections and/or fasteners (e.g., screws) extending upward (in frame of references shown in FIG. 23) to couple housing cover 214 to housing 216.

Figure 21:
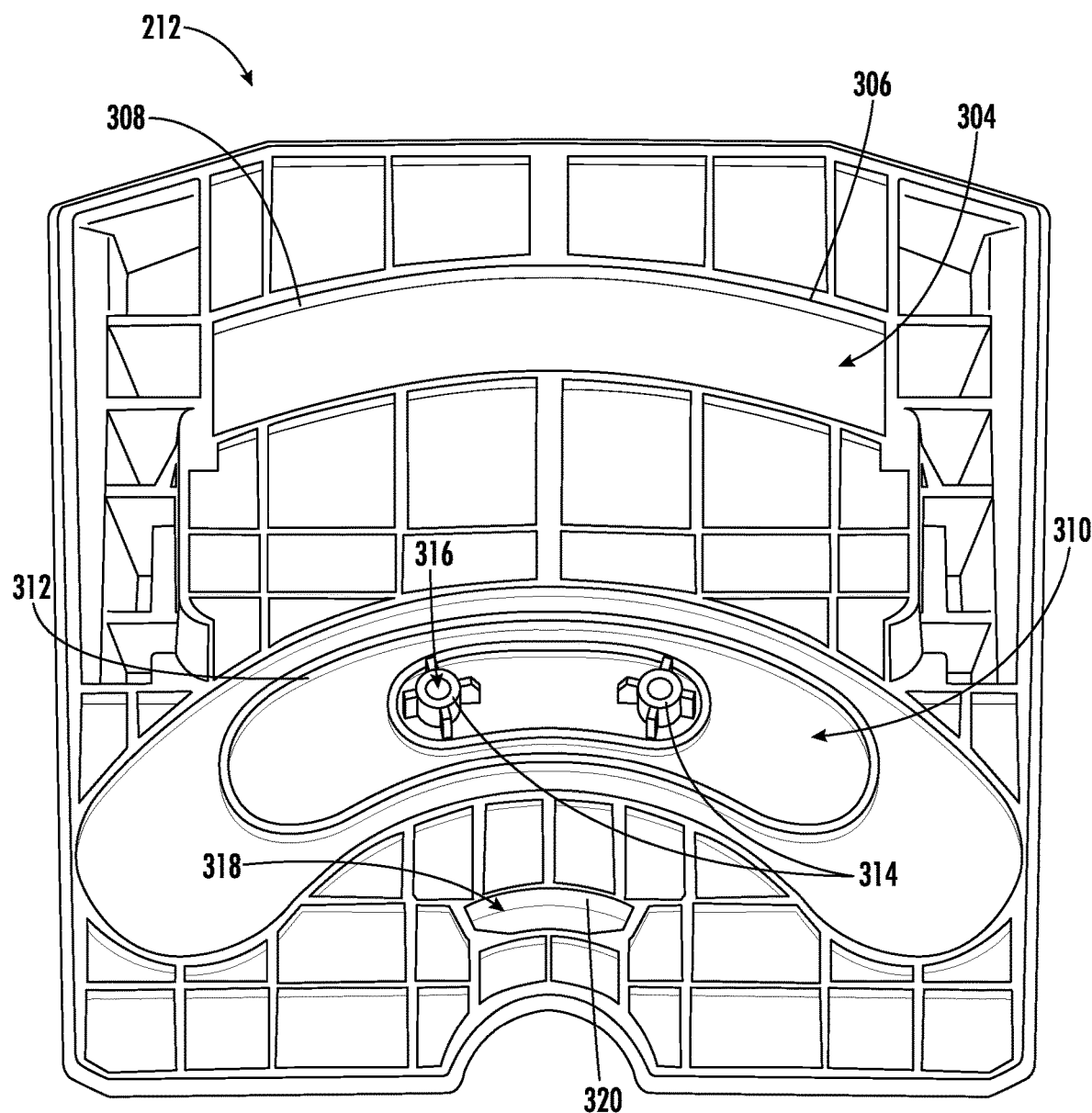
FIG. 21 is a detailed perspective view of the inward facing portion of the laser platform of the motorized laser level mount of FIG. 17, according to an exemplary embodiment.

Referring to FIG. 21, a perspective view of the inward or downward facing surface of laser platform 212 is shown. Laser platform 212 includes a rear recess 304 with a wall 306 configured to cooperate with rear rib 394 of housing cover 214. Wall 306 includes an angled surface 308 extending downward toward housing cover 214 in a manner that opposes angled surface 295 of rear rib 294 (see e.g., FIG. 22). Laser platform 212 further includes a middle recess 310 shaped to surround slot 286. A wall 312 defines middle recess 310 and is positioned to surround slot 286. Within middle recess 310 a pair of bosses or protrusions 314 extend downward toward housing cover 214. Each protrusion 314 includes a bore 316 to receive the fasteners that extend through and connect laser platform 212 to output slider 290. Laser platform 212 further includes a front recess 318 with an inner surface 320. Front recess 318 is shaped to receive and cooperate with front rib 292 of housing cover 214.

Figure 22:
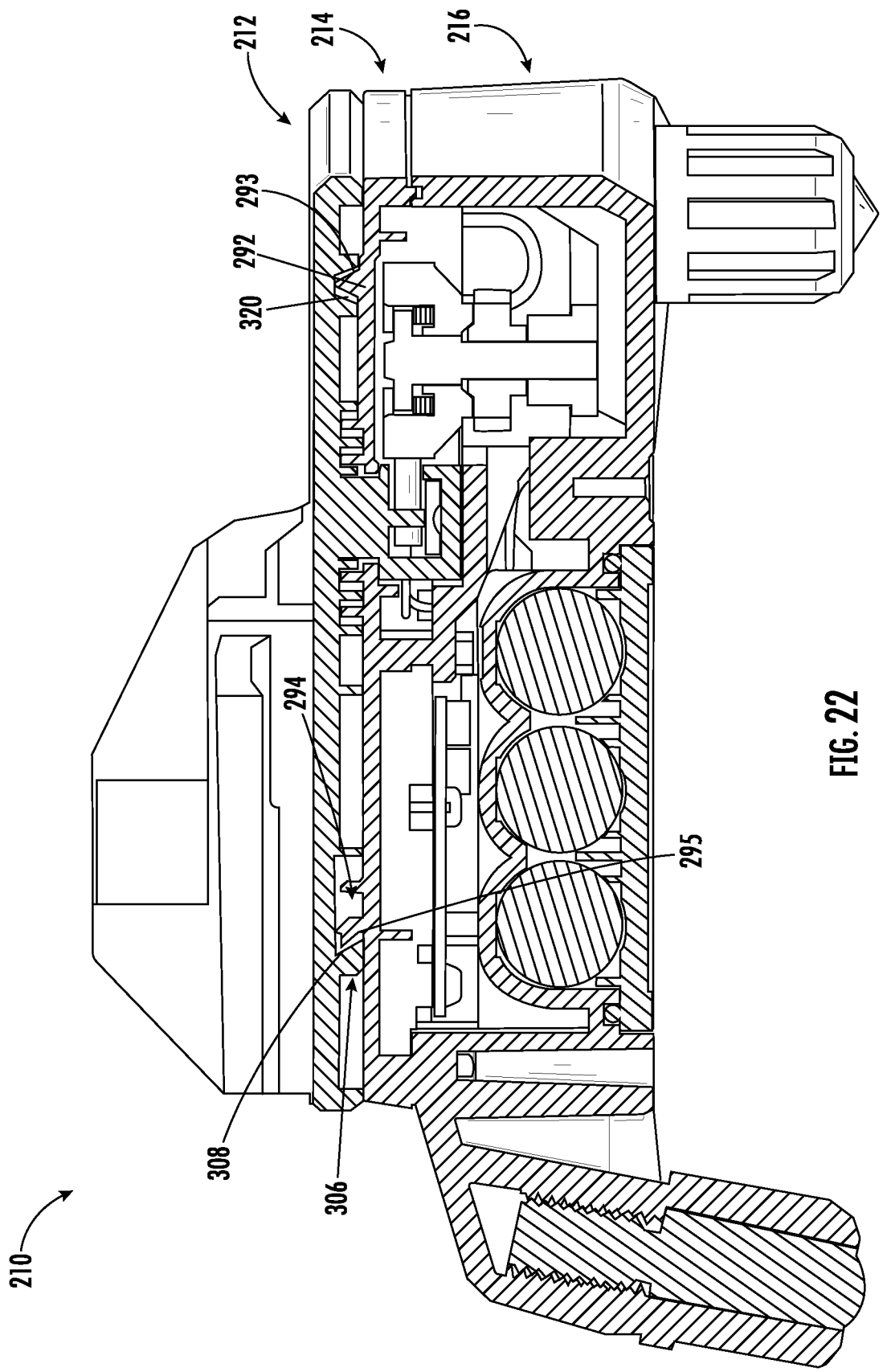
FIG. 22 is a cross-sectional view of the rotational coupling mechanism of the motorized laser level mount of FIG. 17, according to an exemplary embodiment.

Referring to FIG. 22, the interaction between laser platform 212 and housing cover 214 that allows for the rotation of laser platform 212 is shown in a cross-sectional view. The surface 293 of front rib 292 is positioned within front recess 318 such that the inner surface 320 cooperates with surface 293 of front rib 292 during rotation of laser platform 212. Similarly, the angled surface 295 of rear rib 294 opposes and interfaces with angled surface 308 of wall 306 of laser platform 212. The dovetail shape of rear rib 294 allows for the rotation of laser platform 212 while securing laser platform 212 so that it is not pulled away from housing cover 214 during movement of laser platform 212.

Figure 23:
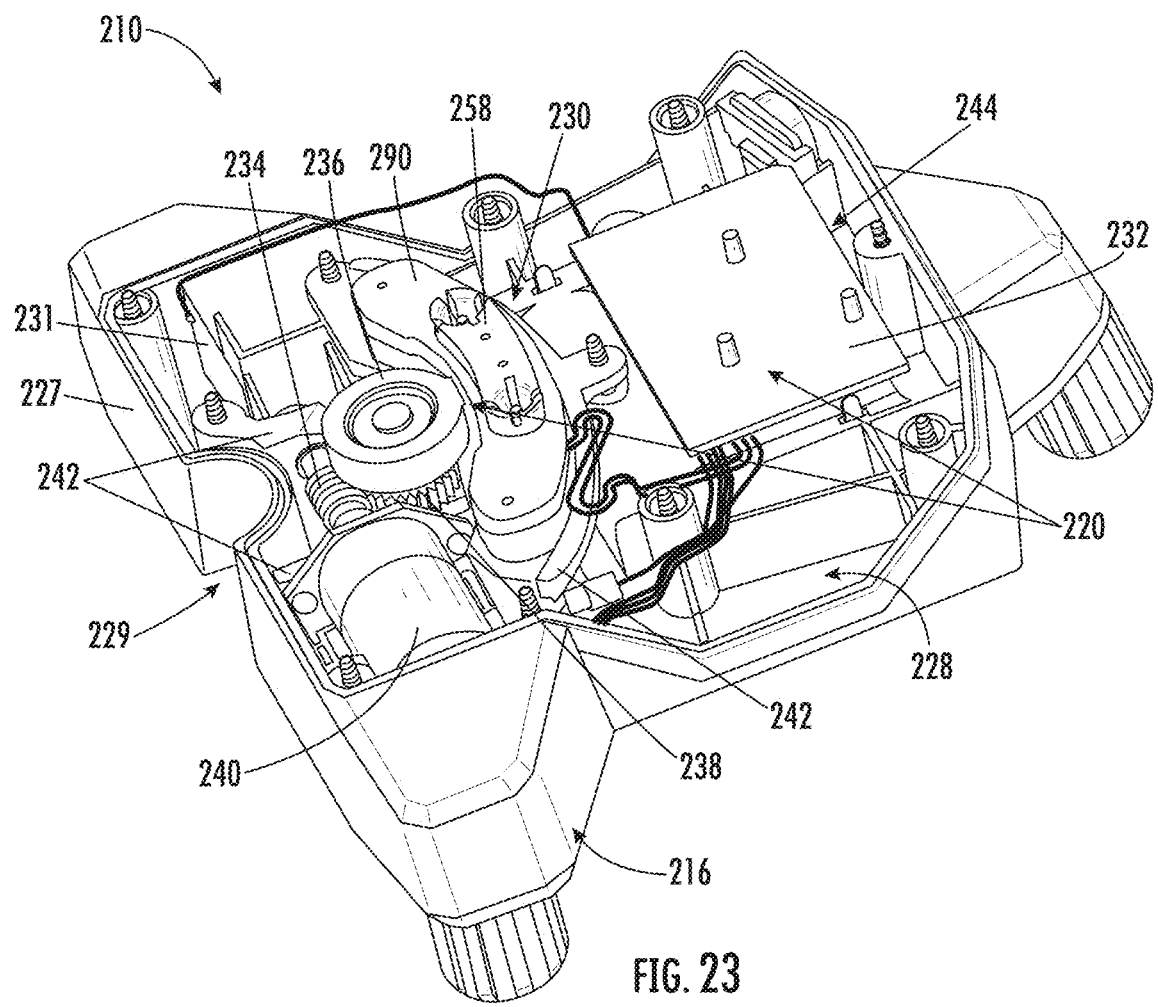
FIG. 23 is a perspective of the motorized laser level mount of FIG. 17 with a backlash detection system and the laser platform and housing cover removed, according to an exemplary embodiment.

Referring to FIG. 23, platform adjustment mechanism 230 is positioned within a recess 228 of housing 216 and attached to housing cover 214. Platform adjustment mechanism 230 includes the output slider 290, a worm 234, output driver 236, worm wheel 238 and a motor 240. Motor 240 is positioned within housing 216 and coupled to a gear train holder 242 and the gear train. In a specific embodiment motor 240 is a stepper motor that moves in steps or segments. In another embodiment, motor 240 is a direct current (DC) motor and in such an embodiment, a device, such as an optical encoder tracks the rotations of motor 240 during rotation of laser platform 212. In a specific embodiment, an output shaft of motor 240 is directly coupled to the worm 234. In another embodiment, motor 240 is coupled to a gear box with an output that is coupled to worm 234. A main circuit board, shown as printed circuit board assembly (PCBA) 244 is positioned within recess 228 of housing 216 and coupled to housing cover 214. Antenna 231 is configured to receive a signal from a remote control device (e.g., a remote control, phone, etc.) such as remote control device 600. Antenna 231 is in communication with platform adjustment mechanism 230.

Figure 24:
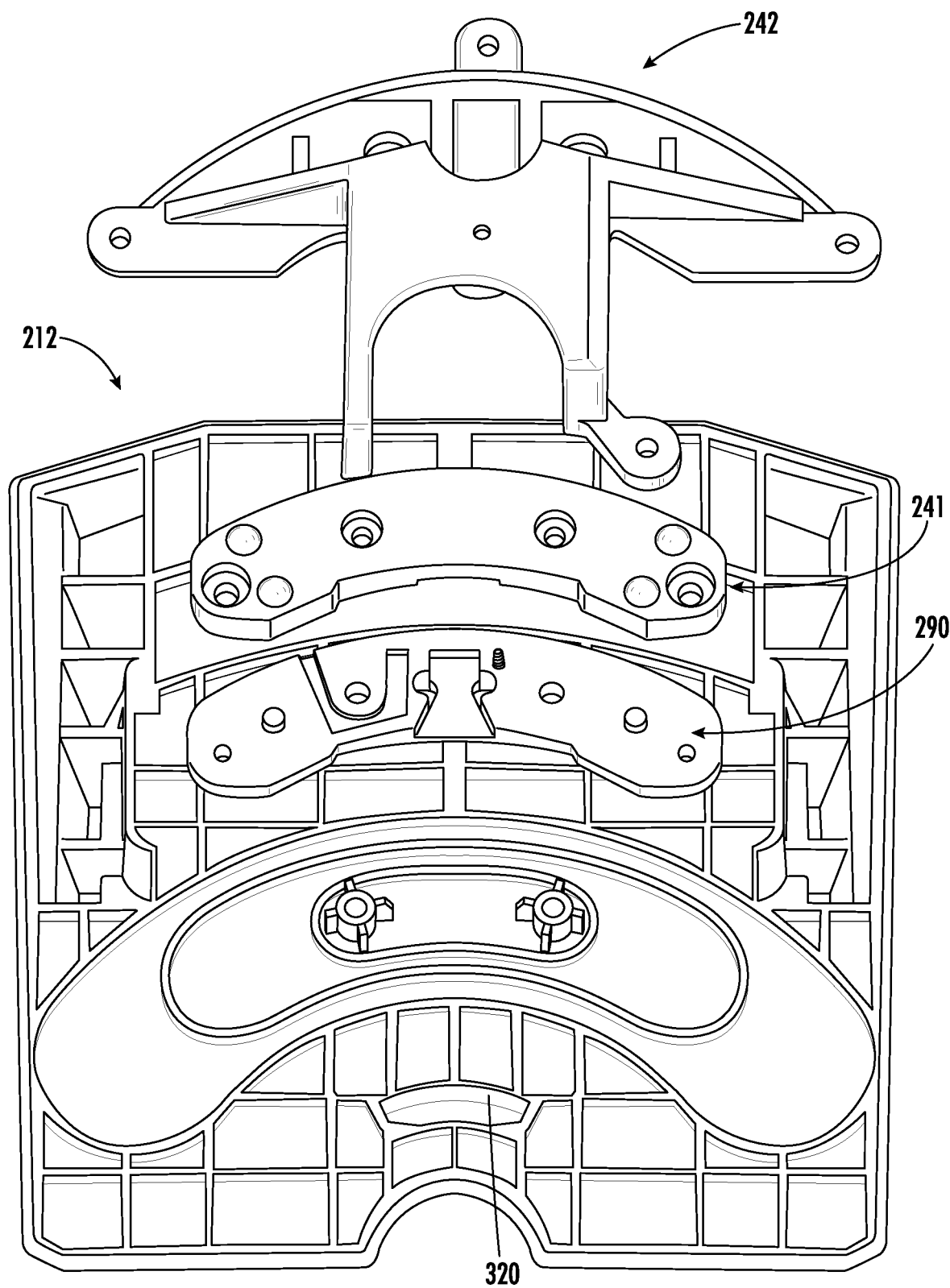
FIG. 24 is a partially exploded perspective view of the inward facing portion of the laser platform and various internal components of the motorized laser level mount of FIG. 17, according to an exemplary embodiment.

Referring to FIG. 24, a partially exploded perspective view of the inward facing portion of the laser platform 212 and a portion of platform adjustment mechanism 230 with the housing cover 214 removed. Output slider 290 includes a cavity sized and/or configured to hold a portion of output driver 236 and/or backlash detection system 220. In other words, output slider 290, is engaged with the backlash detection system 220 and coupled to platform 212. Output slider 290 further includes a plurality of corresponding features (i.e., projections and or bores) configured to engage with corresponding features on the lower output slider 241. The support plate or gear train holder 242 is positioned underneath (opposite frame of reference to FIG. 24) lower output slider 241, output slider 290 and/or output driver 236.

Figure 25:
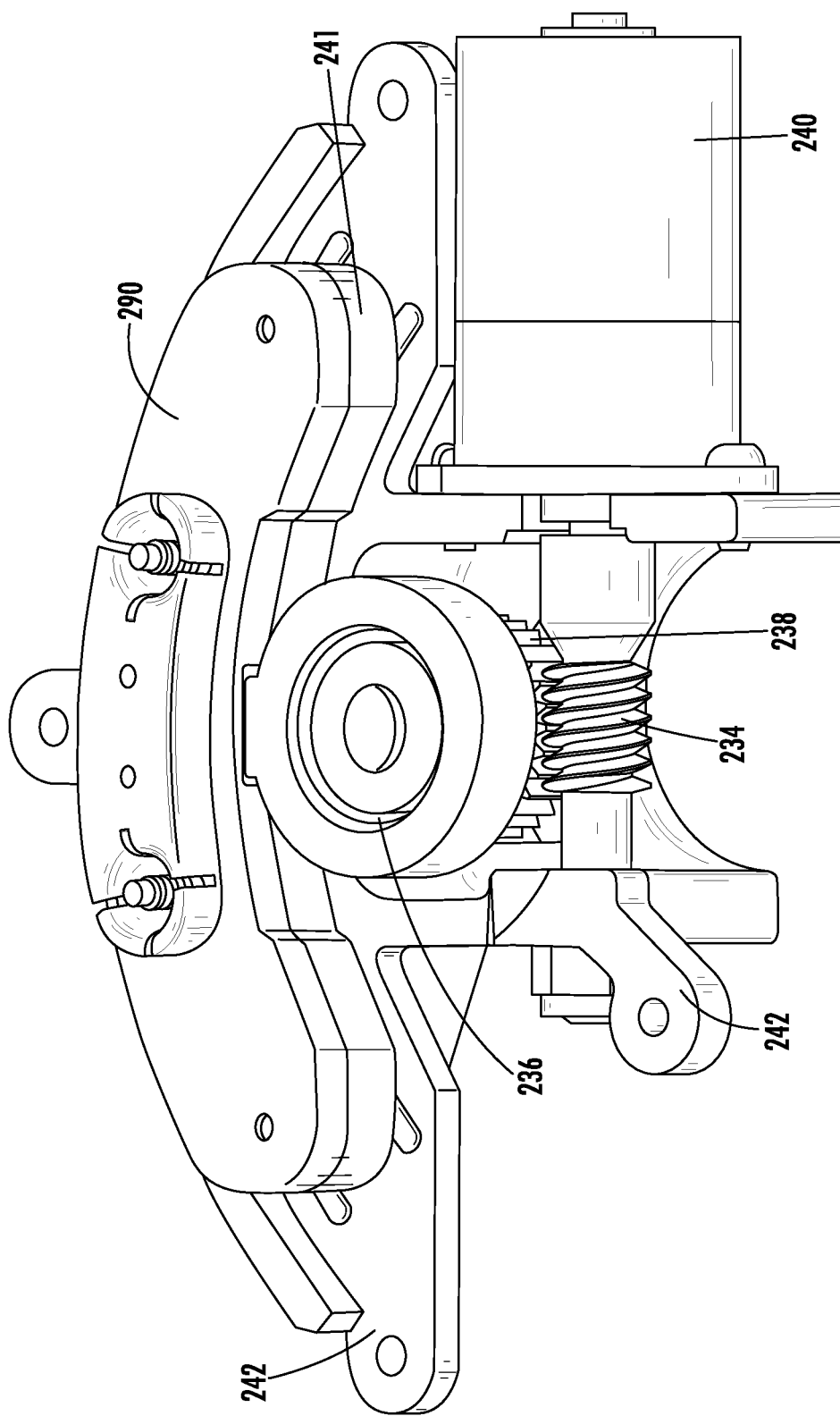
FIG. 25 is a perspective view of the gearing of motorized laser level mount of FIG. 17, according to an exemplary embodiment.

Referring to FIG. 25, a perspective view from above of the motor 240 and the connection to the output system that rotates laser platform 212 is shown. Output driver 236 is positioned in front of output slider 290 and lower output slider 241 when laser level mount 210 is assembled. Output driver 236 is positioned above worm wheel 238 which engages with worm 234. In other words, output driver 236 is coupled to the gear train (i.e., worm 234, worm wheel 238, etc.).

Figure 26:
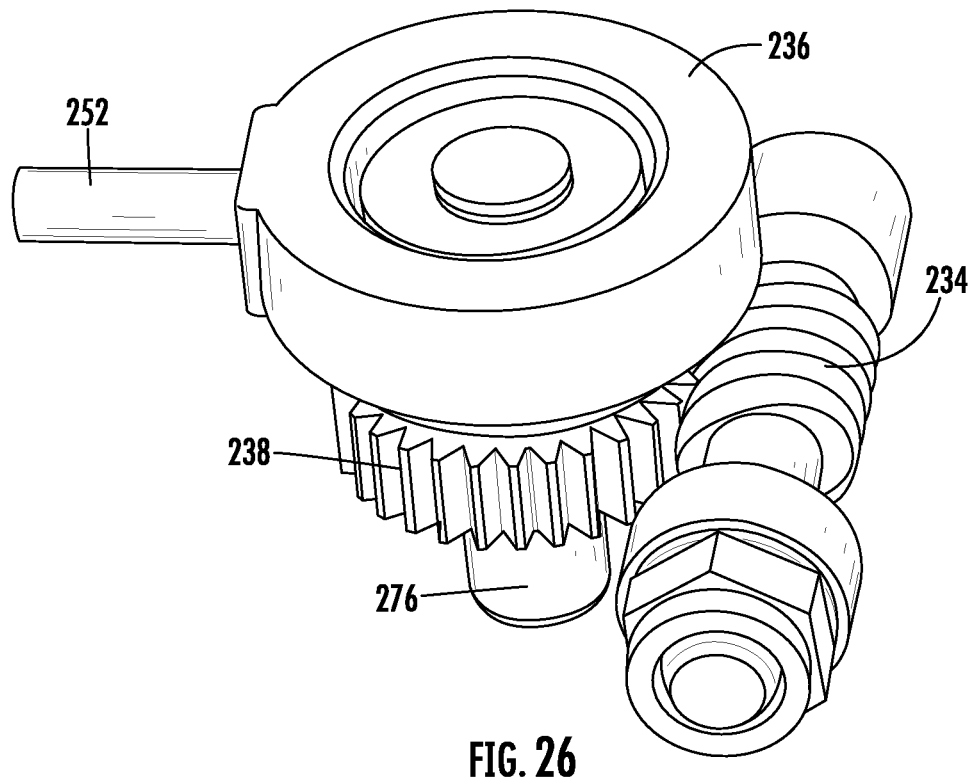
FIG. 26 is a detailed perspective view of a worm drive of the motorized laser level of FIG. 17, according to an exemplary embodiment.
Figure 27:
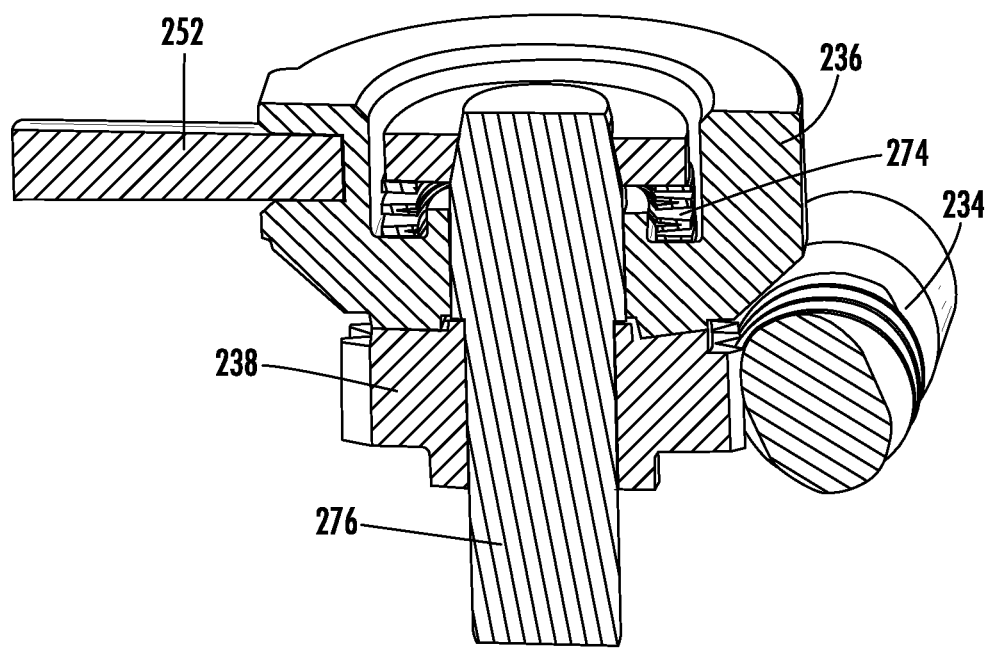
FIG. 27 is a cross-sectional view of the worm drive of FIG. 26, according to an exemplary embodiment.

Referring to FIGS. 26-27, a detailed view of the engagement between the worm 234, worm wheel 238 and output driver 236, are shown. FIG. 26 shows a perspective view with worm wheel 238 coupled to and/or positioned around shaft 276, FIG. 27 shows a cross-sectional view of a portion of the output system. Wave springs 274 are positioned within output driver 236 below an uppermost portion of shaft 276 and force the output driver 236 down and into engagement with worm wheel 238 and/or worm 234 reducing backlash. Wave springs 274 allow for worm wheel 238 and output driver 236 to slip with respect to each other, creating a slip clutch. This slip clutch arrangement protects the gear train from abuse and/or misuse while also allowing a user to manually shift position. Shaft 276 extends through and rotatably couples output driver 236 and worm wheel 238. Output driver 236 is coupled to a post 252. When laser level mount 210 is assembled, post 252 extends through output slider 290 and lower output slider 241.

As will be generally understood, backlash is a clearance or loss of motion in a mechanism caused by a gap or spacing. In this instance, backlash is defined as a gap and/or spacing between opposing mating teeth in the gear train, specifically, a space and/or gap between gear teeth on worm wheel 238 and the teeth on worm 234. For example, a space and/or gap between a tooth on worm 234 that is positioned between gear teeth of worm wheel 238 is backlash. The tooth on worm 234 moves within the gap and/or space until the tooth of worm 234 abuts or is engaged with the gear tooth of worm wheel 238 at which point backlash has been removed because the gap and/or space between gear teeth of worm wheel 238 and the teeth of worm 234 is gone or has been removed. When the gap and/or space no longer exists, there is no longer clearance or loss of motion between worm wheel 238 and worm 234.

In other words, when the gear train includes a first gear (i.e., worm 234) having teeth and a second gear (i.e., worm wheel 238) having teeth, the MCU 232 detects when the teeth of the first gear are directly contacting the teeth of the second gear to determine backlash has been removed from the system. Specifically, monitoring unit or MCU 232 detects when at least one tooth of worm 234 is in direct contact and/or engagement with at least one tooth of worm wheel 238 such that further rotation of worm 234 and/or worm wheel 238 results in movement of platform 212 (i.e., no lost motion). When there is a space between the teeth of the first gear and the teeth of the second gear MCU 232 detects that there is backlash within the system (i.e., will be lost motion). Specifically, monitoring unit or MCU 232 detects when at least one tooth of worm 234 is spaced and/or not directly engaged with at least one tooth of worm wheel 238 such that further rotation of worm 234 and/or worm wheel 238 does not result in movement of platform 212 (i.e., lost motion) until the space between the teeth has been removed. As will be discussed in greater detail below, the backlash within the gear train may be removed for one specific direction (i.e., clockwise or counterclockwise rotation) while the backlash remains in the opposing direction.

Figure 28:
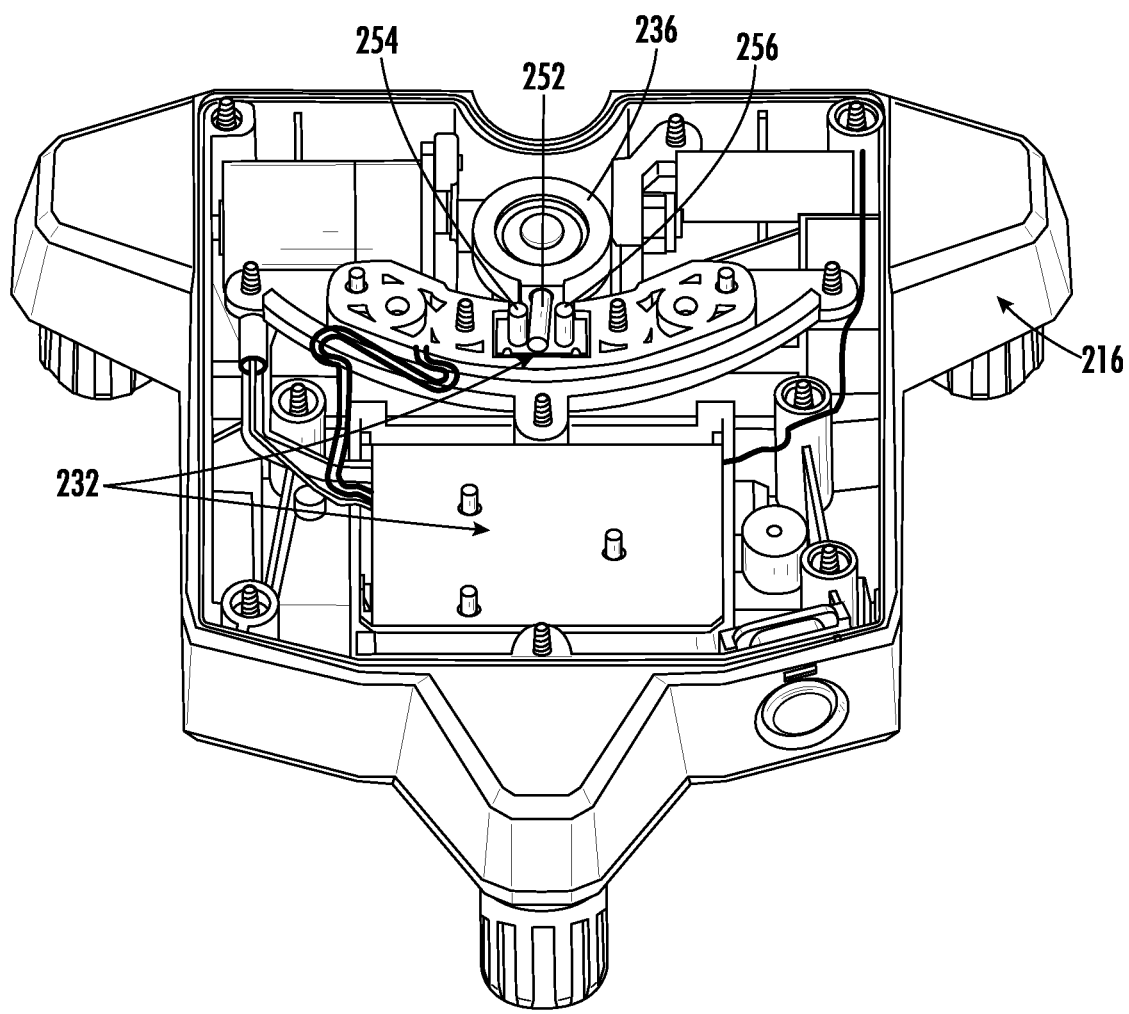
FIG. 28 is a rear perspective of a motorized laser level mount of FIG. 17 with a portion of the output slider removed, when the backlash detection system is in a first rotation position, according to an exemplary embodiment.
Figure 29:
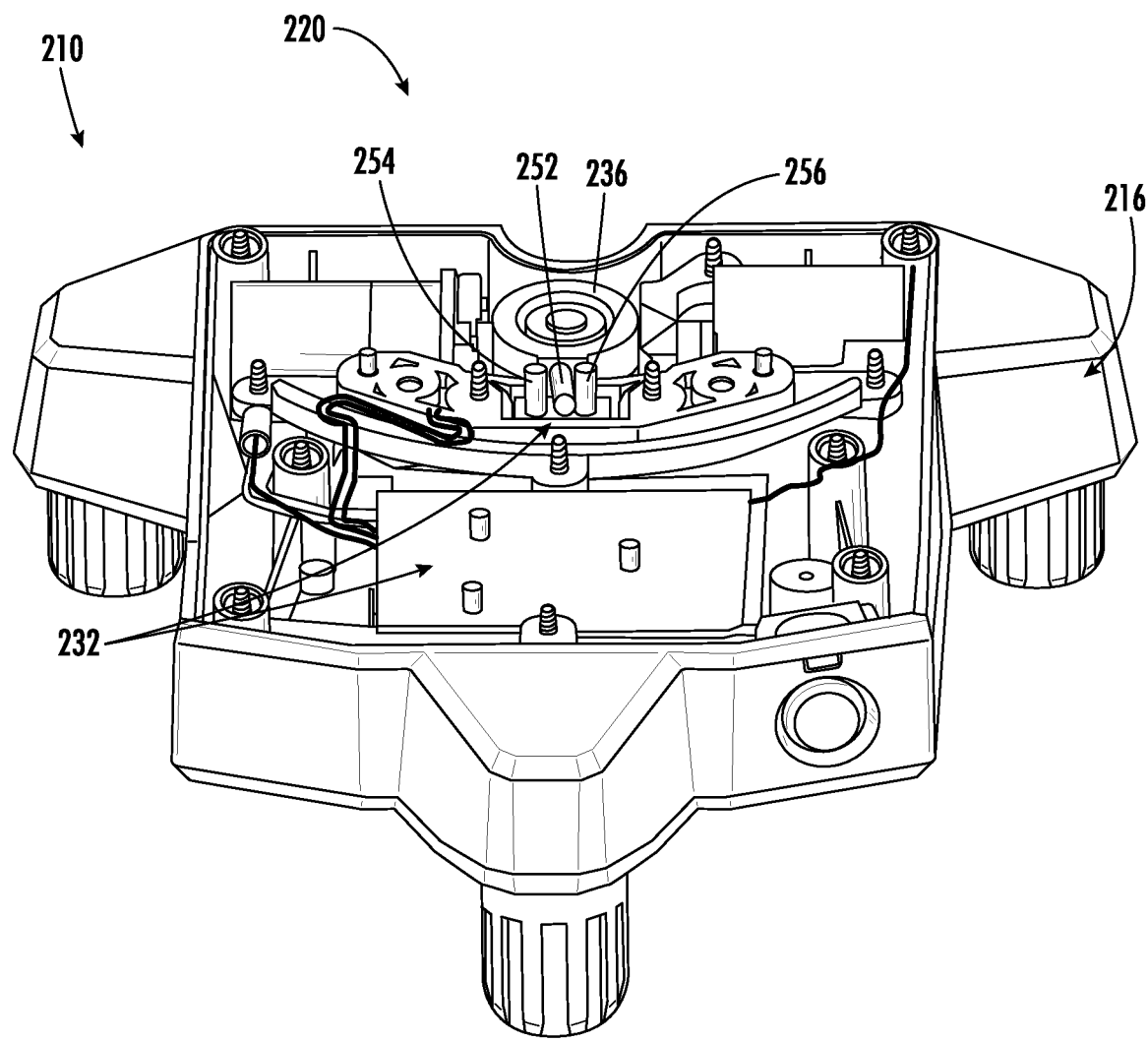
FIG. 29 is a rear perspective of a motorized laser level mount of FIG. 17 with a portion of the output slider removed, when the backlash detection system is in a second rotation position, according to an exemplary embodiment.
Figure 30:
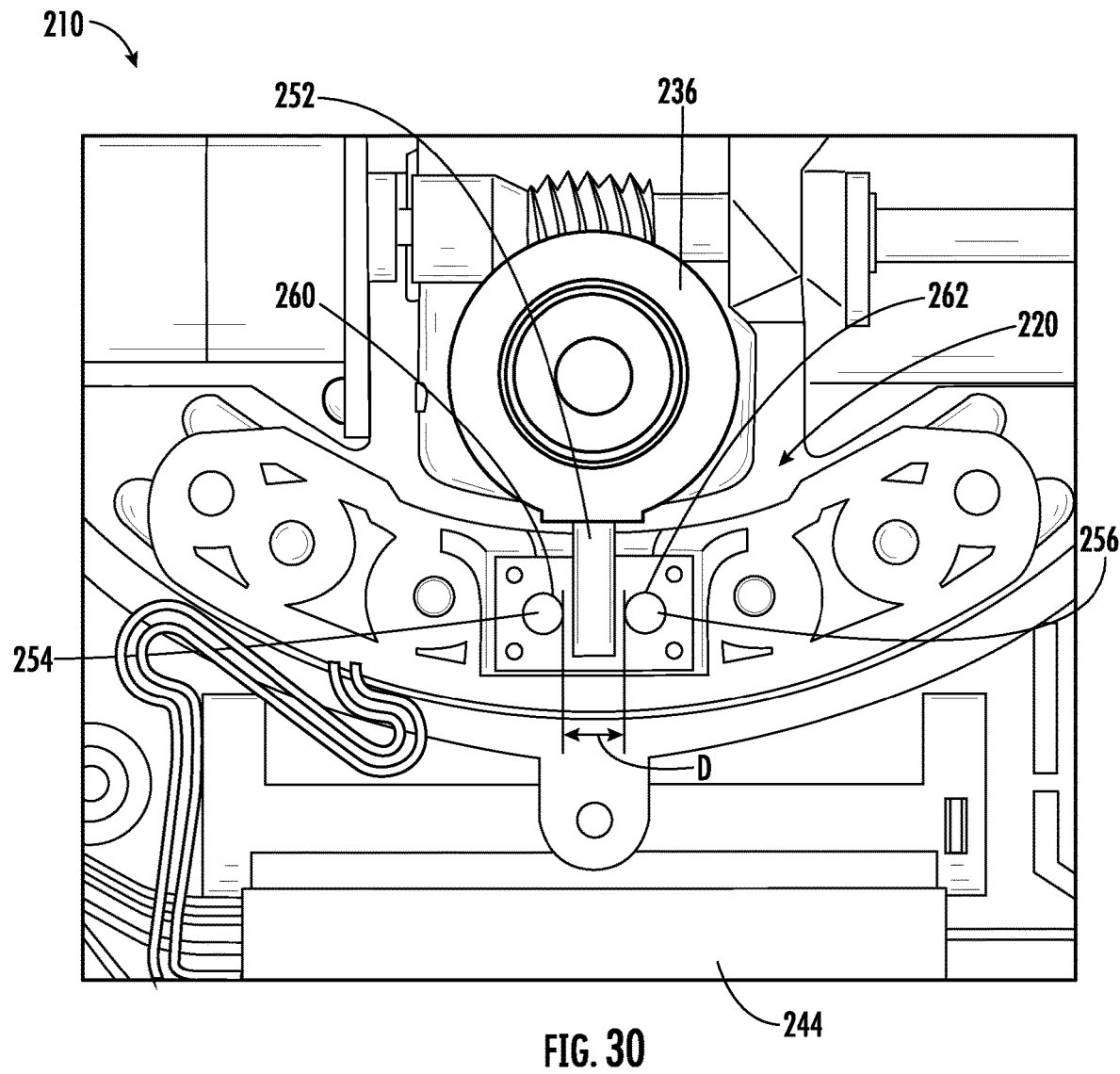
FIG. 30 is a top view of the backlash detection system in a neutral rotation position, according to an exemplary embodiment.

Referring to FIGS. 28-30, various aspects of backlash detection system 220 are shown. In general, backlash detection system 220 includes a monitoring unit, such as a controller. The monitoring unit, shown as a microcontroller unit ("MCU") 232 is part of PCBA 244 and used and/or configured to detect and/or determine whether there is backlash in the platform adjustment mechanism 230 of laser level mount 210 that might impact the movement of the laser platform 212 when a user wants to rotate the laser platform 212 and/or the laser projection device (see e.g., 30 in FIG. 2). In other words, the monitoring unit or MCU 232 is configured to detect when backlash has been removed from the platform adjustment mechanism 230 and/or the gear train. In general, MCU 232 includes various components for processing information about the backlash (e.g., central processing unit, memory, supporting circuitry etc.). In a specific embodiment, the MCU 232 communicates the data collected via a communication link that may be wired or wireless (e.g., Wi-fi, Bluetooth, etc.). In a specific embodiment, the communication link is a 433 MHz RF system.

As shown in FIGS. 28-29, the backlash detection system 220 includes output driver 236 coupled to stepper motor 240 through worm gear 234 and a clutch assembly such that the stepper motor 240 will cause output driver 236 to move and/or rotate. A rotating post 252 is grounded and coupled to output driver 236. Rotating post 252 is rigidly fixed to output driver 236. Output driver 236 is grounded through gear train holder 242. The MCU 232 further includes a general-purpose input/output ("GPIO") with a pull up resistor, shown as first pin 254 and another GPIO with a pull up resistor, shown as second pin 256. Second pin 256 is spaced a distance from first pin 254 such that the first pin 254 does not contact the second pin 256. First pin 254 and second pin 256 are coupled to an insulated follower 258 (see e.g., FIG. 23) and/or output slider 290. Insulated follower 258 is coupled to the laser platform 212. In other words, backlash detection system 220 includes an output driver 236 with a rotating post 252, a first pin 254, and a second pin 256.

Rotating post 252 is positioned to extend between first pin 254 and second pin 256 of the MCU 232. When rotating post 252 is spaced from not engaged, and/or not contacting (i.e., circuit is open) either first pin 254 or second pin 256, the MCU 232 measures at least one of the voltage and/or resistance as being in a first condition or state (i.e., "high" logic state) and determine there is backlash in the platform adjustment mechanism 230 and/or within the gear train. When there is backlash within the gear train, rotating post 252 will move until rotating post 252 contacts a pin (either first pin 254 or second pin 256) to remove the backlash. In a specific embodiment, when rotating post 252 is centered between first pin 254 and second pin 256, there will be a similar and/or equal amount of backlash in the right or left direction if a user wants to rotate the laser platform. In other words, an amount of backlash for rotation of platform 212 in a clockwise direction is the same as an amount of backlash for rotation of the platform 212 in a counterclockwise direction.

In a specific embodiment, when rotating post 252 is centered between first pin 254 and second pin 256 and rotating post 252 was rotated away from second pin 256 toward first pin 254 to reach the center position, there is a smaller amount and/or less backlash toward the first pin 254 because the rotating post 252 was already moving that direction. Similarly, in a specific embodiment where rotating post 252 is centered between first pin 254 and second pin 256 when rotating post was rotated away from first pin 254 toward second pin 256 to reach the center position, there is a smaller amount and/or less backlash toward the second pin 256 because rotating post 252 was already moving that direction.

Referring to FIGS. 28-29, perspective views of motorized laser level mount 210 and specifically backlash detection system 220 are shown with a portion of output slider 290 removed, according to an exemplary embodiment. FIG. 28 shows the backlash detection system 220 in first or right rotation position. When rotating post 252 that begins positioned between first pin 254 and second pin 256 and a user sends a signal to motorized laser level mount 210 to move or rotate the laser platform 212 to the right and/or rotate the laser platform in a clockwise direction (see e.g., arrow 34 in FIG. 4), rotating post 252 moves until rotating post 252 engages or contacts first pin 254 as shown in FIG. 28. Contact between grounded rotating post 252 and first pin 254 causes the MCU 232 to measure at least one of the voltage and/or resistance as being in a second condition or state (i.e., "low" logic state) that is different from the first condition or state (i.e., touching the ground pulls down the pin) to determine backlash in the platform adjustment mechanism 230 has been removed. The rotating post 252 pushes against the first pin 254 to physically rotate the laser platform 212 and/or the laser projection device (see e.g., 30 in FIG. 2). This engagement or connection between grounded rotating post 252 and first pin 254 allows the MCU 232 to determine that the backlash has been removed from platform adjustment mechanism 230 in the right direction and the counting of steps from the motor 240 can begin so that the laser platform 212 will travel and/or move the desired distance in the clockwise direction.

Referring to FIG. 29, the backlash detection system 220 is shown in a second or left rotation position. When rotating post 252 that begins positioned between first pin 254 and second pin 256 and a user a user sends a signal to motorized laser level mount 210 to move or rotated the laser platform 212 to the left and/or rotate the laser platform 212 in a counterclockwise direction (see e.g., arrow 33 in FIG. 3), rotating post 252 t moves until rotating post 252 engages or contacts second pin 256. Contact between grounded rotating post 252 and second pin 256 causes the MCU 232 to measure at least one of the voltage and/or resistance as being in the second condition or state (i.e., "low" logic state) that is different from the first condition or state (i.e., pulls down the pin) to determine backlash in the platform adjustment mechanism 230 has been removed. The rotating post 252 pushes against the second pin 256 to physically rotate the laser platform 212 and/or the laser projection device (see e.g., 30 s in FIG. 2). This engagement or connection between grounded rotating post 252 and second pin 256 allows the MCU 232 to determine that the backlash has been removed from platform adjustment mechanism 230 in the left direction and the counting of steps from the motor 240 can begin so that the laser platform 212 will travel and/or move the desired distance in the counterclockwise direction. In other words, when the backlash has been removed from the platform adjustment mechanism 230, the steps of motor 240 are counted such that the platform 212 will move a distance during clockwise rotation that is the same as a distance moved during counterclockwise rotation of the platform 212.

Similarly, if rotating post 252 begins in an engaged position with and/or contacting first pin 254 and a user inputs a command to move the laser platform 212 to the left and/or rotate the laser platform 212 in a counterclockwise direction (see e.g., arrow 33 in FIG. 3), rotating post 252 moves such that contact is removed from first pin 254 and continues to move until contact is made with second pin 256. Once this engagement or connection between grounded rotating post 252 and second pin 256 happens, the MCU 232 measures at least one of the voltage and/or resistance as being in the second condition or state (i.e., "low" logic state) that is different from the first condition or state (i.e., touching the ground pulls down the pin) to determine that the backlash has been removed from platform adjustment mechanism 230 and/or gear train in the left and/or counterclockwise direction and the counting of steps from the motor 240 can begin so that the laser platform 212 will travel and/or move the desired distance in the counterclockwise direction.

When rotating post 252 begins in an engaged position with and/or contacting second pin 256 and a user inputs a command and/or sends a signal to motorized laser level mount 210 to move the laser platform 212 to the right and/or rotate the laser platform 212 in a clockwise direction (see e.g., arrow 34 in FIG. 4), rotating post 252 moves such that contact is removed from second pin 256 and continues to move until rotating post 252 contacts or is engaged with the first pin 254. Once this engagement or connection between grounded rotating post 252 and first pin 254 happens, the MCU 232 measures at least one of the voltage and/or resistance as being in the second condition or state (i.e., "low" logic state) (i.e., touching the ground pulls down the pin) to determine that the backlash has been removed from platform adjustment mechanism 230 and/or gear train in the right and/or clockwise direction and the counting of steps from the motor 240 can begin so that the laser platform 212 will travel and/or move the desired distance in the clockwise direction.

Referring to FIG. 30, a pin spacing distance D between the first pin 254 and the second pin 256 is defined between a point on an outer surface 260 of first pin 254 and an opposing point on an outer surface 262 of second pin 256. In a specific embodiment, distance D is between 1-10 mm and more specifically between 1-5 mm. In such an embodiment, D is about 3.825 mm (e.g., 3.825 mm±0.5 mm). When D is a relatively short distance, Applicant believes the efficiency of the backlash detection system is improved because it takes less time for rotating post 252 to move between engaging with first pin 254 to engaging with second pin 256. However, D must be large enough that rotating post 252 cannot contact both first pin 254 and second pin 256 simultaneously.

Applicant believes the backlash detection system described herein improves precision of the movement of the motorized laser level mount 210 because the method of detection allows for counting of the steps to begin once the backlash has been taken up or removed from the platform adjustment mechanism. Applicant further believes use of a backlash detection system allows for improved precision of movement without the greater costs of designing a gear train that attempts to remove most and/or all backlash from the gear train (i.e., zero backlash).

Figure 31:
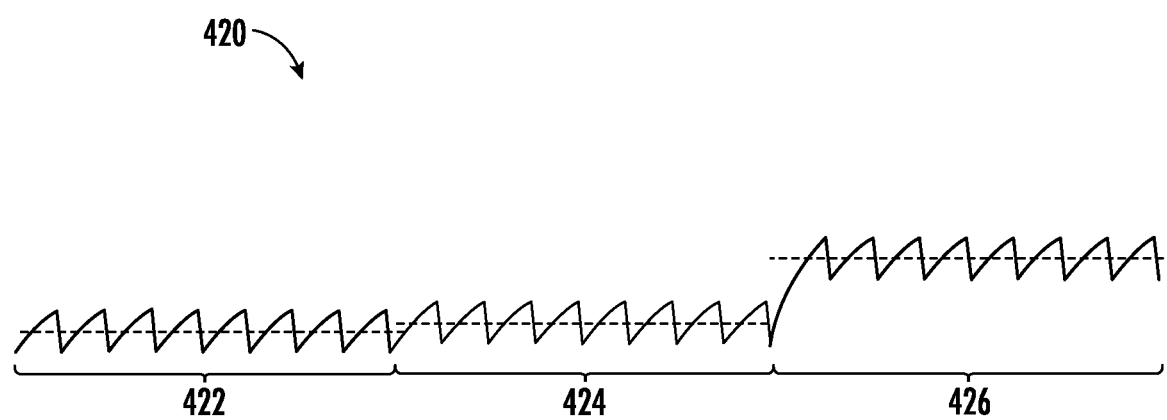
FIG. 31 is a diagram of the motor current of a motorized laser level mount with a backlash detection system, according to another exemplary embodiment.

Referring to FIG. 31, a diagram of the motor current of a motorized laser level mount with a backlash detection system 420 is shown, according to another exemplary embodiment. Backlash detection system 420 uses the change in motor current to determine when the backlash has been removed from platform adjustment mechanism and specifically the gear train. When there is backlash within the system, the motor will be at its lowest relative load condition as shown by portion 422 of the diagram. Once the backlash has been removed, the motor current will operate at a relatively normal level as shown by portion 424 of the diagram. As can be seen in FIG. 31, the average current level (indicated by the dotted line) of the normal operating motor 424 is greater than the average current when there is backlash within the system in portion 422.

When the motor has rotated the laser platform to the furthest point in either the clockwise or counterclockwise direction (i.e., end of travel point), the motor current increases as shown by portion 426 and is greater than both the current level of the normal operating motor 424 and the backlash current level 422. In a specific embodiment, the current level under normal operating conditions 424 is amplified to further distinguish from the backlash current level 422. Applicant further believes this current detection backlash system can be used to reduce current consumption and/or wear on the motorized laser level components by turning off or stopping the motor once the current levels reach the end of travel levels indicated by portion 426 of the diagram.

Figure 32:
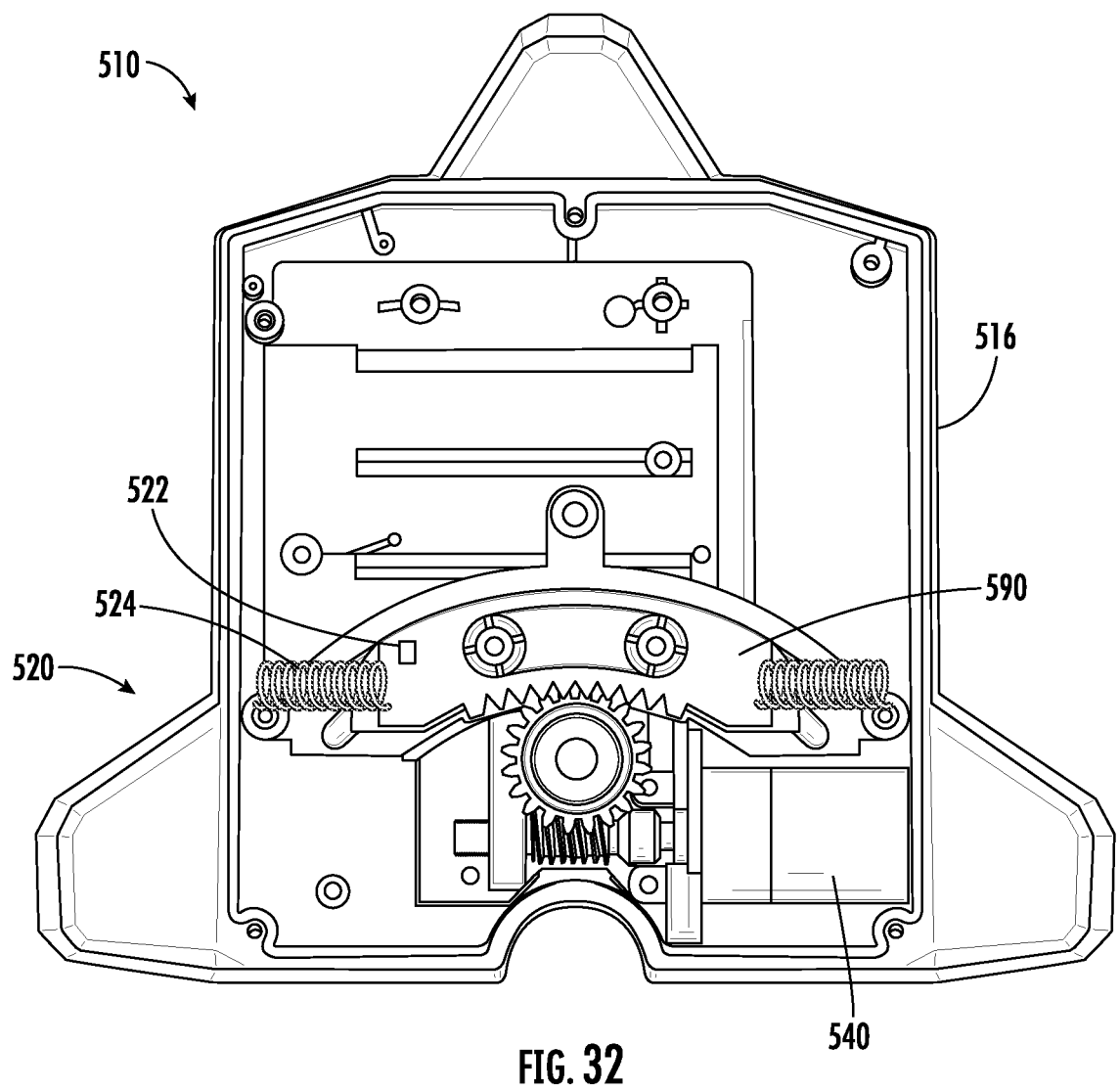
FIG. 32 is a top plan view of a motorized laser level mount with a backlash detection system, according to another exemplary embodiment.

Referring to FIG. 32, a top plan view of a motorized laser level mount 510 with a backlash detection system 520 is shown, according to an exemplary embodiment. Backlash detection system 520 can be utilized with a motorized device such as motorized laser level mount 10 to increase the precision of the movement of the device as described above. Housing 516, upper gear section 590 and motor 540 are substantially the same as housing 16, upper gear section 90 and motor 140 except for differences discussed herein.

Backlash detection system 520 includes one or more biasing elements, shown as springs 524 are coupled to upper gear section 590. Backlash detection system 520 further includes one or more strain gauges 522, shown schematically are coupled to upper gear section 590. In a specific embodiment, one spring 524 is coupled to upper gear section 590 and one strain gauge 522 is used to monitor the movement of the upper gear section 590 (i.e., use change in strain to indicate movement). In such an embodiment, the spring 524 would also bias the gear train in one direction and/or remove the backlash from the gear train.

In another specific embodiment, two springs 524 are coupled to upper gear section 590 and two strain gauges 522 can be used to determine the position of the upper gear section 590. Applicant believes use of two springs 524 would prevent and/or reduce the amount of bias in the gear train such that the motor would not have to work harder in one direction of rotation relative to the other direction of rotation. Each strain gauge 522 would be required to have a high level of sensitivity (e.g., sense 0.008 cm of movement±0.002).

While the illustrated embodiment is disclosed in a laser projection mount, in other embodiments, other devices or systems that include precise rotational components incorporate the backlash detection and mitigation system discussed herein. For example, in other embodiments, motorized adjustable devices (i.e., system can be used with devices that rotate and/or translate), such as various robots, motorized stands, turn tables include the backlash detection system(s) discussed herein.

Figure 33:
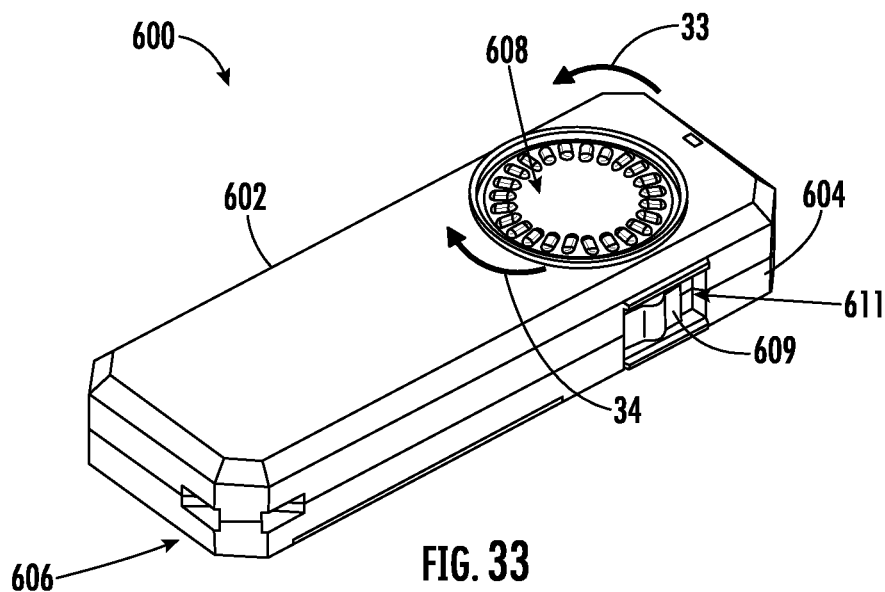
FIG. 33 is a perspective view of a remote control that can be used with the motorized laser level mount of FIG. 1 or FIG. 17, according to an exemplary embodiment.
Figure 34:
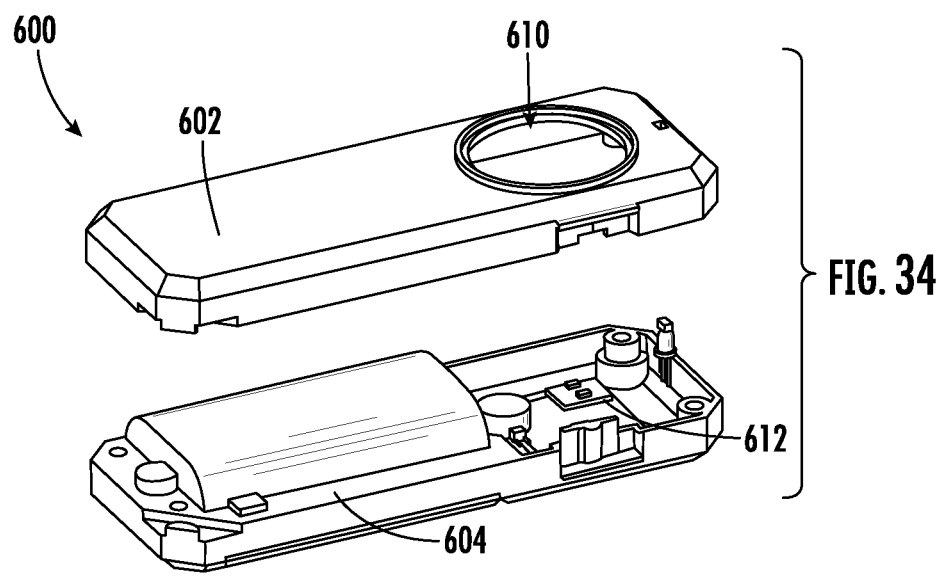
FIG. 34 is an exploded perspective view of the remote control of FIG. 33 with a dial removed, according to an exemplary embodiment.

Referring to FIGS. 33-34, a perspective view of a remote control device, shown as a remote control 600 is shown. Remote control 600 is configured to interact with motorized laser level mounts 10 and/or 210 from a distance. For example, a user selects a command on remote control 600, and in response remote control 600 emits a signal to laser level mount 10 and/or 210 providing a command to laser level mount 10 and/or 210 (e.g., rotate in a specific direction, at a fast or slow speed etc.). In a specific embodiment, remote control 600 uses radiofrequency (RF) to communicate with the antenna 28 of motorized laser level mount 10 or antenna 231 of motorized laser level mount 210. Remote control 600 can communicate with laser level mount 10 and/or 210 over a range of about 200 feet (e.g., 200 feet plus or minus 10 feet).

Remote control 600 includes an upper housing 602 and a lower housing 604 that can be fastened together. Remote control 600 further includes a lanyard attachment or wrist strap 606 positioned at one corner of the housing for ease of carrying remote during use of motorized laser level mount 10. Remote control 600 includes one or more physical interfacing components, shown as a dial 608 extending up through a bore 610 in upper housing 602. Dial 608 receives input from the user indicating the selection of one of more commands (e.g., direction of movement following arrow 33 or 34, speed of rotation etc.). In a specific embodiment, remote control 600 may include separate buttons to change between a fast and slow mode of rotation for motorized laser level mount 10 and/or 210.

Dial 608 allows a user to quickly and accurately adjust the motorized laser level mount 10 and/or 210 because the rotation of the dial 608 matches the rotation of the mount regardless of the direction the user is facing. When the dial 608 is rotated in a clockwise direction, the laser platform 12 and/or 212 rotates in a clockwise direction and when the dial 608 is rotated in a counterclockwise direction, laser platform 12 and/or 212 is rotated in a counterclockwise direction. Because the clockwise and counterclockwise rotation are independent from the positional relationship of the user, remote control 600, and laser platform 12 and/or 212 (unlike traditional left or right arrows), control of the movement of laser platform 12 and/or 212 is intuitive for a user no matter where a user is positioned in relation to the laser.

Remote control 600 further includes a button 609 to toggle the power of remote control 600 on and off. Button 609 is in a recess 611 that extends across at least a portion of upper housing 602 and lower housing 604. Placing button 609 in a recess helps to prevent any accidental adjustments of laser level mount 10 and/or 210 after alignment is complete when a user may pocket or put remote control 600 down.

Figure 35:
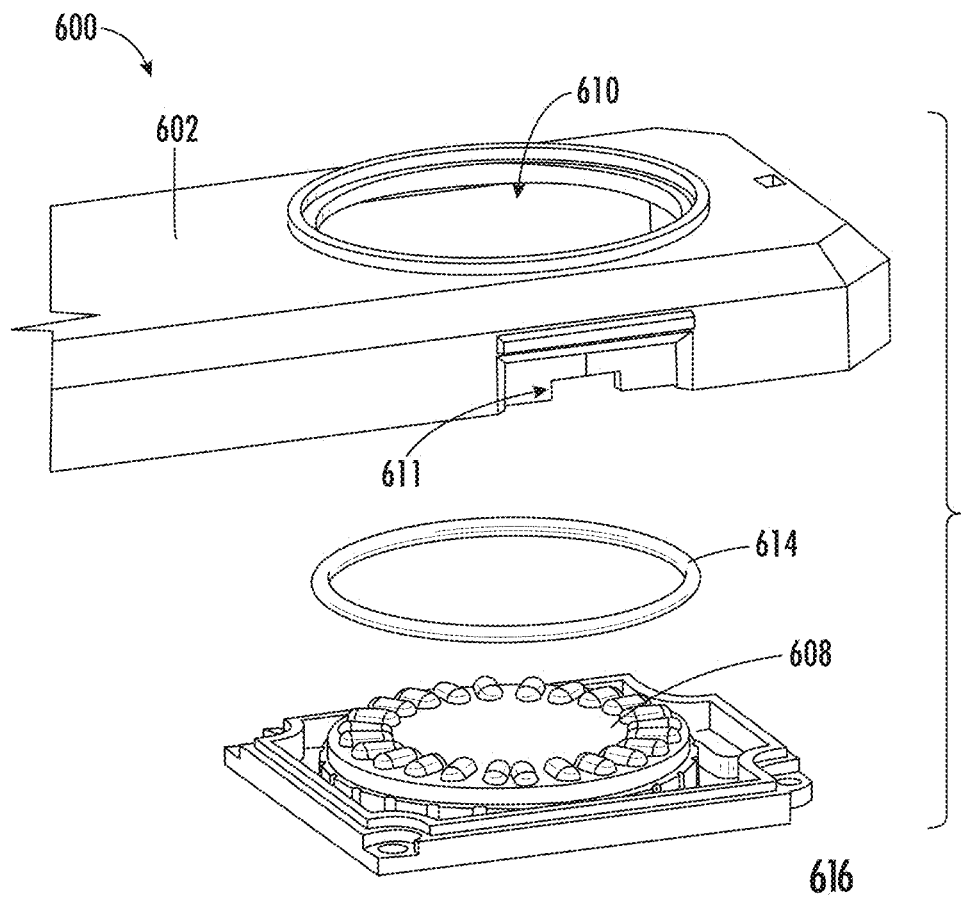
FIG. 35 is an exploded perspective view of a portion of the housing and the dial mechanism of the remote control of FIG. 33, according to an exemplary embodiment.
Figure 36:
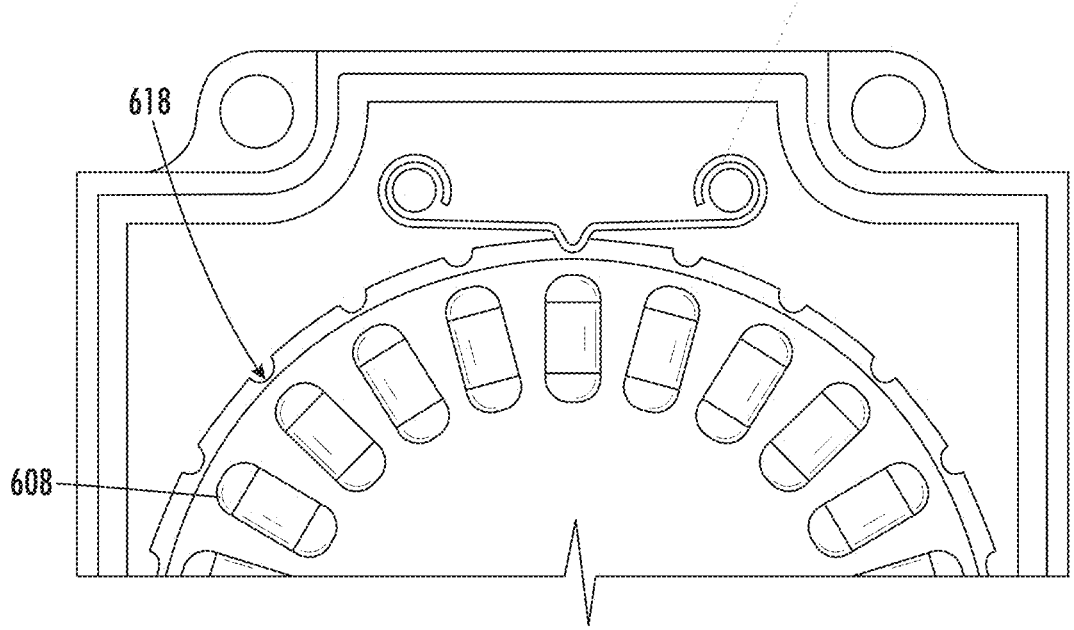
FIG. 36 is a plan view of a portion of the dial mechanism of FIG. 35, according to an exemplary embodiment.

Referring to FIGS. 34-36 remote control 600 includes a circuit board, shown as PCBA 612 positioned within and fastened to lower housing 604. In a specific embodiment, an optical encoder is enclosed within upper housing 602 and lower housing 604 and positioned such that a shaft of the encoder extends from the dial 608 to track the movement of the dial 608. An O-ring 614 seals the face of dial 608 preventing ingress of particles (e.g., dust, dirt etc.) into remote control 600. In a specific embodiment, lubrication is applied to O-ring 614 to reduce friction and aid in the sealing of remote control 600. A biasing element, shown as spring member 616 provides feedback for every notch 618 on dial 608 that is passed as dial 608 is rotated by the user.

Figure 37:
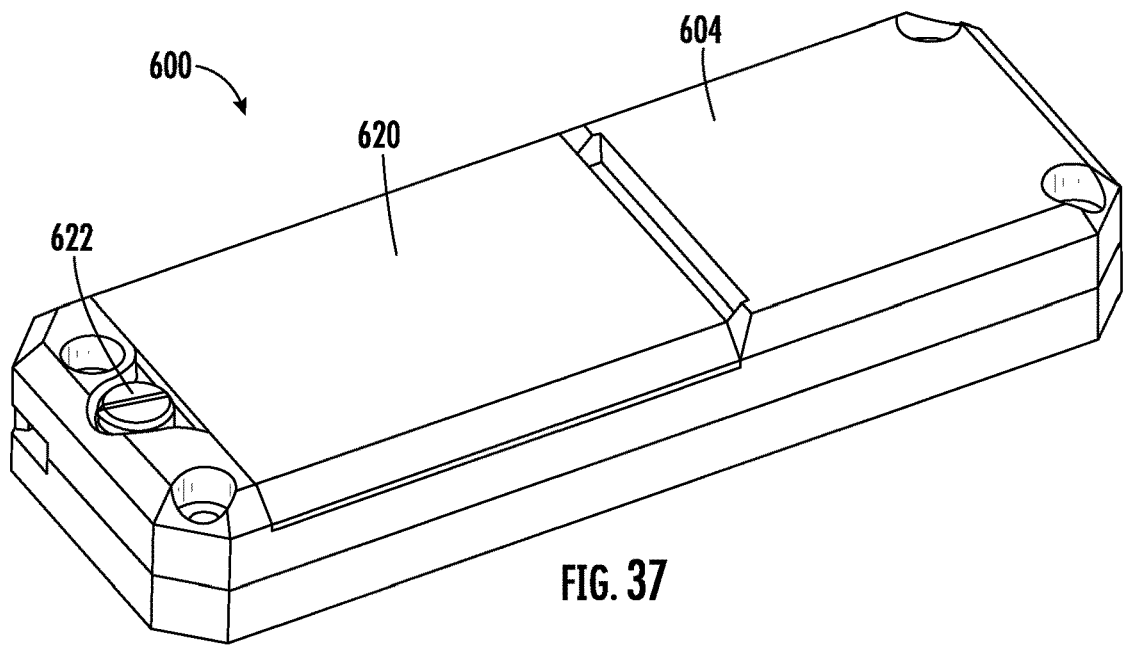
FIG. 37 is a bottom perspective view of the remote control of FIG. 33, according to an exemplary embodiment.
Figure 38:
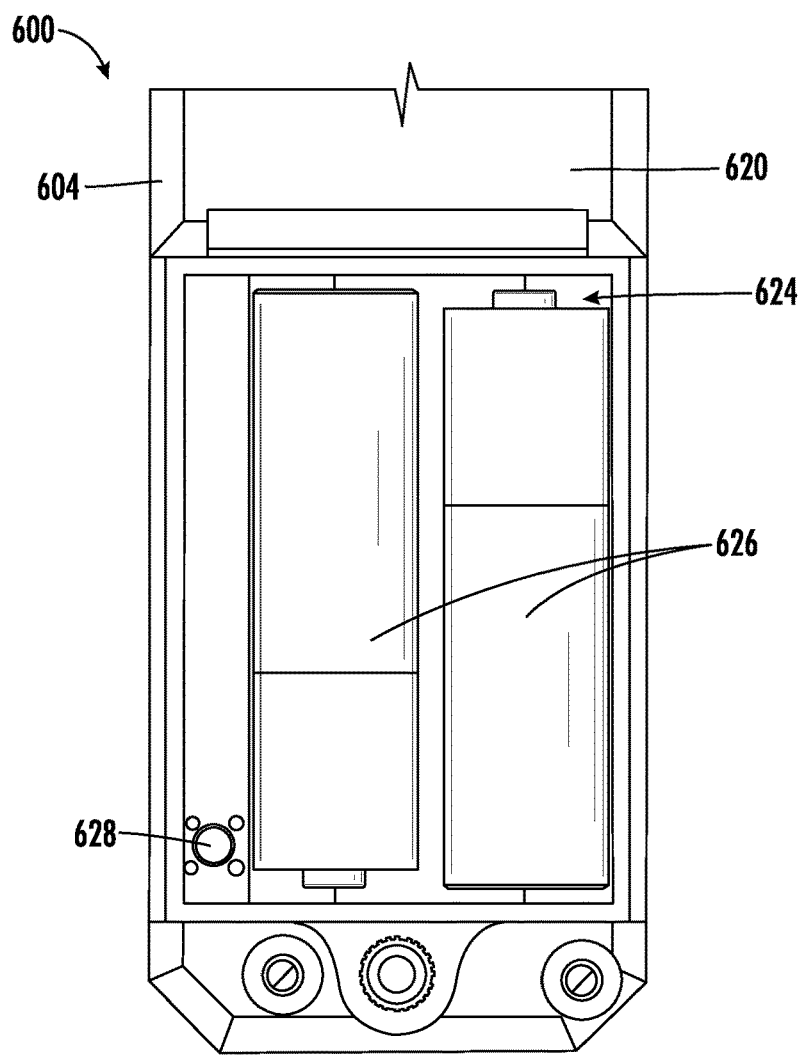
FIG. 38 is a bottom view of the remote control of FIG. 33 with a battery compartment cover in an open position, according to an exemplary embodiment.

Referring to FIGS. 37-38, a rear perspective view of remote control 600. Lower housing 604 includes a battery compartment door 620 that seals one or more batteries 626 in a recessed battery compartment 624. In a specific embodiment, battery compartment 624 is configured to hold two AA batteries 626. A fastener, shown as a screw 622 can be tightened to prevent battery compartment door 620 from opening unintentionally. Within battery compartment 624 a synchronizing button 628 is located next to batteries 626. Synchronizing button 628 can be used to pair a remote control 600 with the laser level mount 10 and/or 210.

Figure 39:
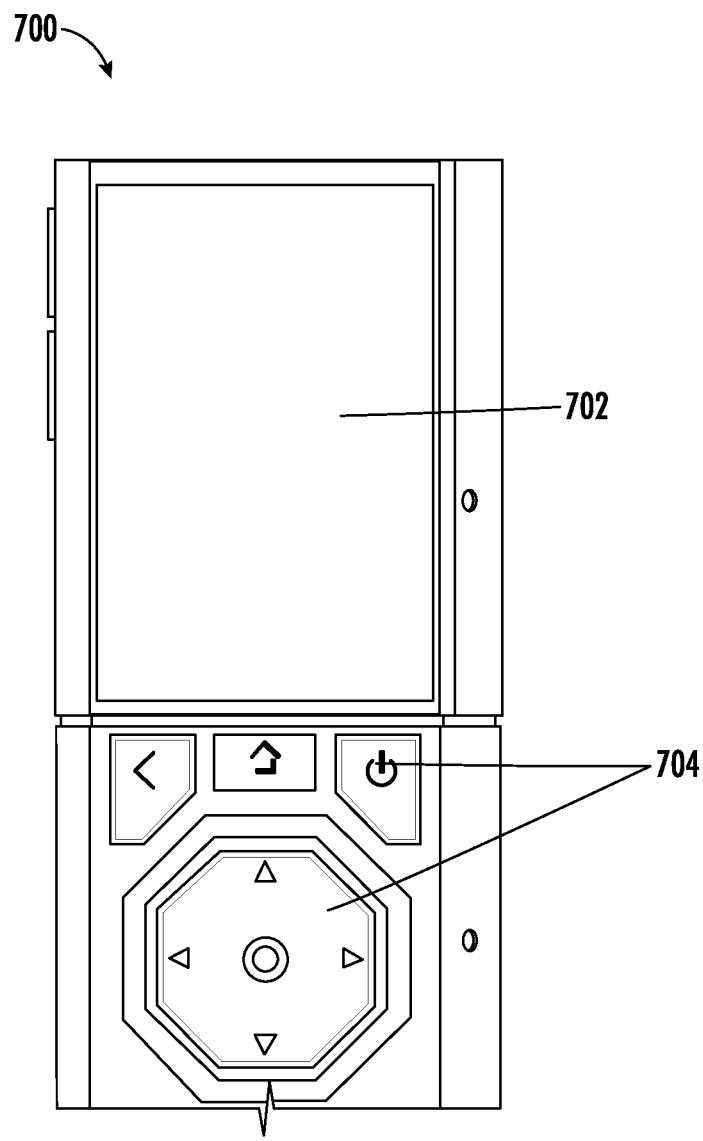
FIG. 39 is a perspective view of a remote control that can be used with the motorized laser level mount of FIG. 1 or FIG. 17, according to another exemplary embodiment.

Referring to FIG. 39, a remote control 700 is shown according to another exemplary embodiment. In general, remote control 700 is substantially the same as remote control 600 except for the differences discussed herein. Remote control 700 includes an upper housing portion 702. Remote control 700 includes one or more physical interfacing components, shown as buttons 704. Buttons 704 can be actuated by the user to receive input indicating the selection of one of more commands (e.g., direction of desired rotation for laser platform 12 and/or 212, speed of rotation etc.). In a specific embodiment, remote control 700 may include separate buttons to change between a fast and slow mode of rotation for motorized laser level mount 10 and/or 210.

Figure 40:
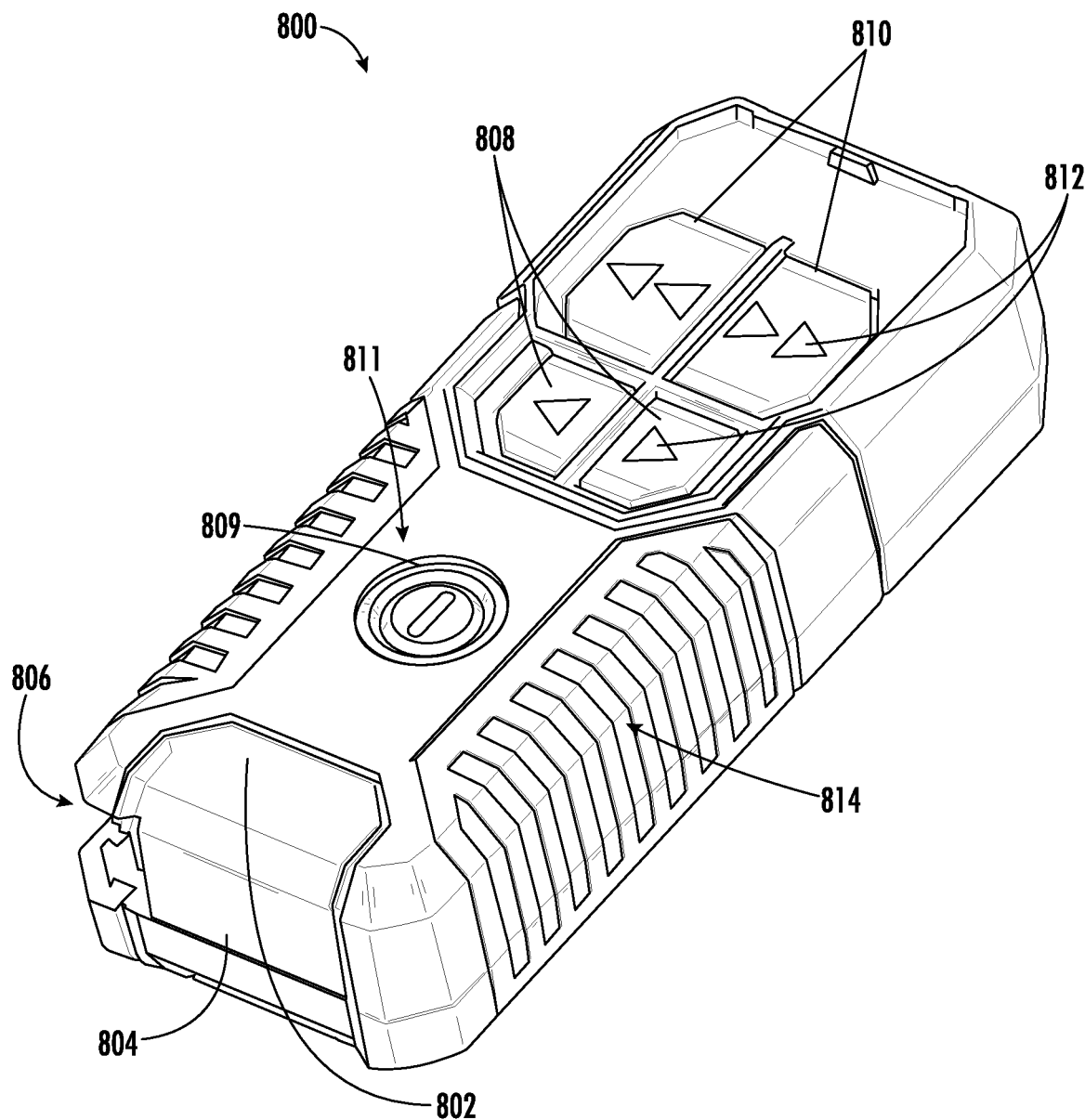
FIG. 40 is a perspective view of a remote control that can be used with the motorized laser level mount of FIG. 1 or FIG. 17, according to another exemplary embodiment.
Figure 41:
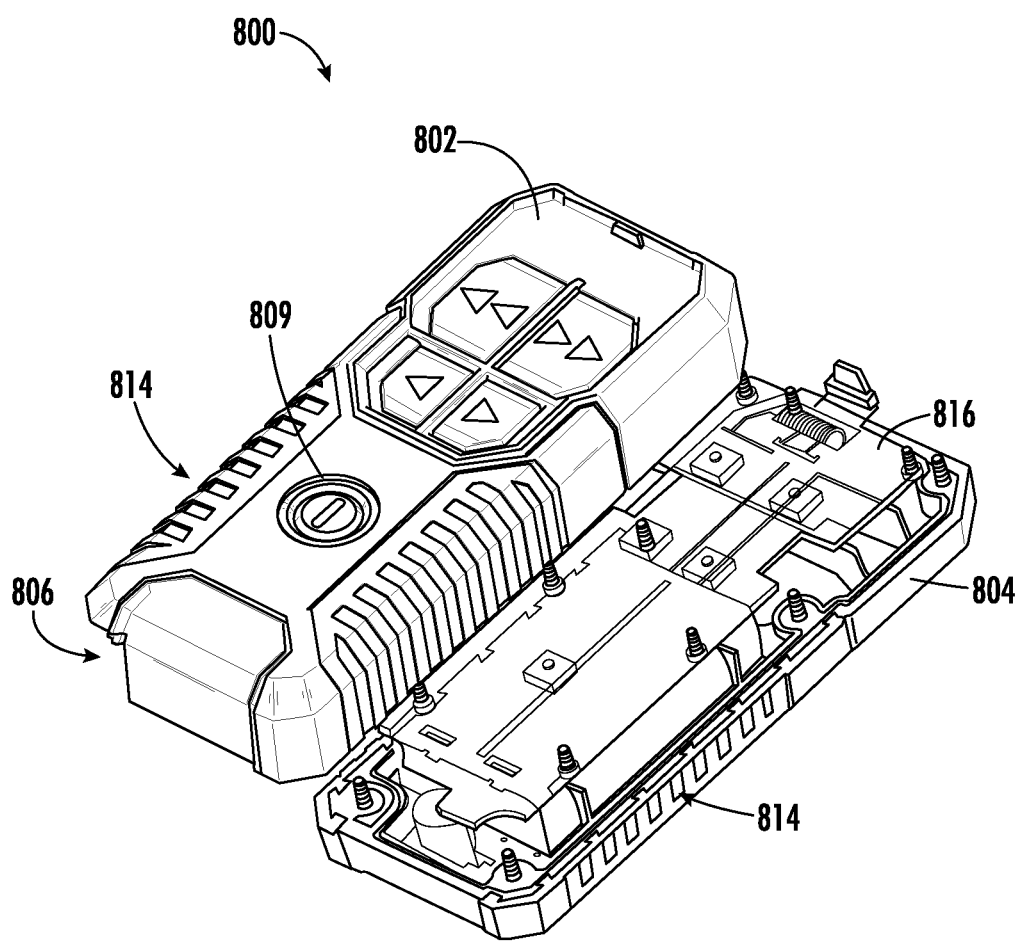
FIG. 41 is an exploded perspective view of the remote control of FIG. 40, according to an exemplary embodiment.
Figure 42:
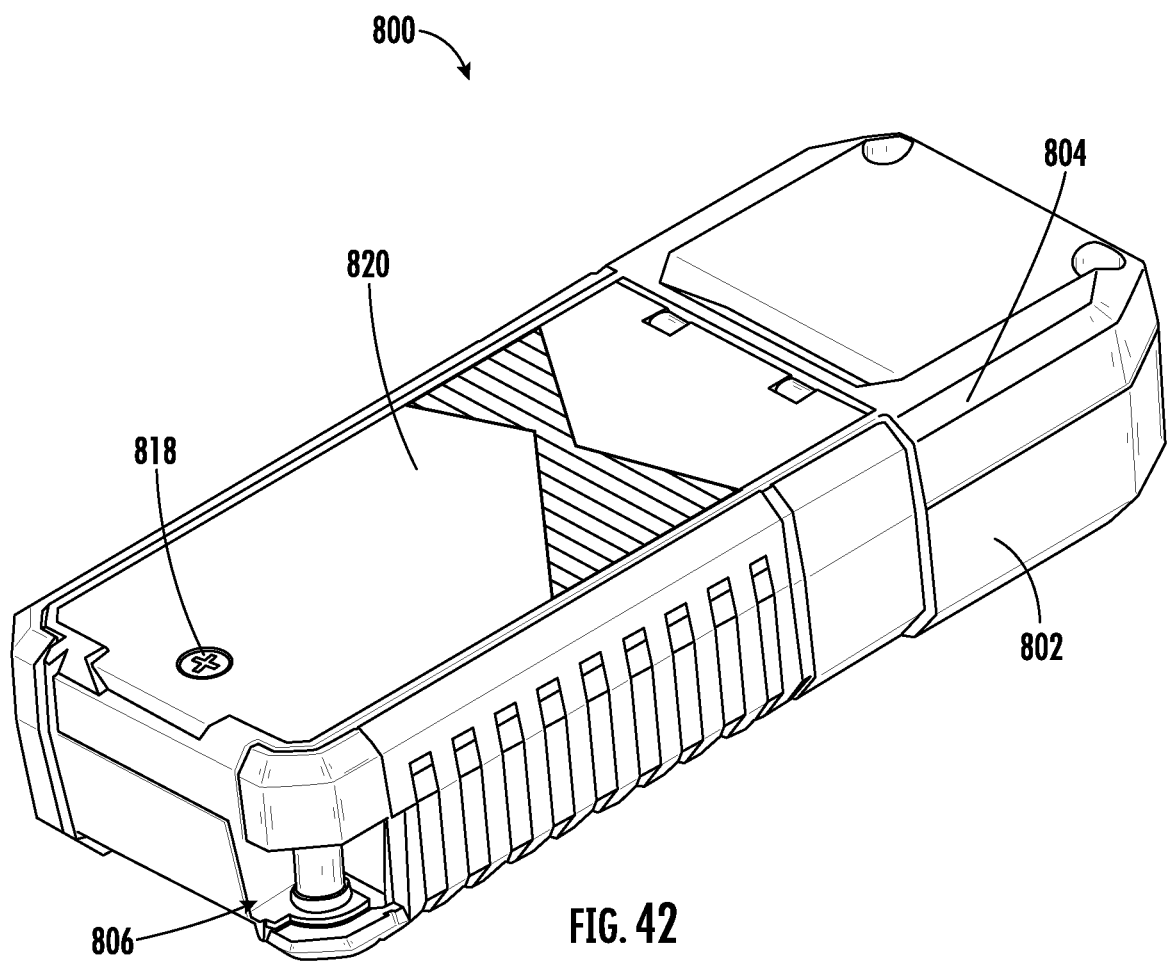
FIG. 42 is a bottom perspective view of the remote control of FIG. 40, according to an exemplary embodiment.

Referring to FIGS. 40-42, a perspective view of a remote control device, shown as a remote control 800 is shown. Remote control 800 is configured to interact with motorized laser level mounts 10 and/or 210 from a distance. For example, a user selects a command on remote control 800, and in response remote control 800 emits a signal to laser level mount 10 and/or 210 providing a command to laser level mount 10 and/or 210 (e.g., rotate in a specific direction, at a fast or slow speed etc.). In a specific embodiment, remote control 800 uses radiofrequency (RF) to communicate with the antenna 28 of motorized laser level mount 10 or antenna 231 of motorized laser level mount 210. In a specific embodiment, remote control 800 can communicate with laser level mount 10 and/or 210 over a range of about 200 feet (e.g., 200 feet plus or minus 10 feet).

Remote control 800 includes an upper housing 802 and a lower housing 804 that can be fastened together. Remote control 800 further includes a lanyard attachment or wrist strap 806 positioned at one corner of the housing for ease of carrying remote during use of motorized laser level mount. Remote control 800 includes one or more physical interfacing components, shown as buttons 808, 809, 810. Buttons 808, 809, 810 can be actuated by the user to receive input indicating the selection of one of more commands (e.g., direction of desired rotation for laser platform 12 and/or 212, speed of rotation etc.). In a specific embodiment, remote control 800 may include separate buttons to change between a fast and slow mode of rotation for motorized laser level mount 10 and/or 210. For example, buttons 810 are used for a faster mode of rotation relative to buttons 808. In a specific embodiment, each of the buttons 808, 810 include an indicator 812 for direction and/or speed.

In a specific embodiment, the indicator is triangle. In other embodiments, the indicator may have a different shape or be a number (i.e., rectangular or 2×, etc.). In a specific embodiment, the indicator on the fast mode will be double the indicator on the relatively slower mode (i.e., one triangle for slow, two triangles for fast). Specifically, when a right button relative to the longitudinal axis of the remote control 800 with the indicator pointing in a right direction is actuated, the motorized device will rotate to the right. Similarly, a left button relative to the longitudinal axis of remote control 800 with the indicator point pointing in a left direction is actuated, the motorized device will rotate to the left. In a specific embodiment, remote control 800 includes a right fast mode of rotation button 810, a left fast mode of rotation button, a right slow mode of rotation button, and a left slow mode of rotation button.

Remote control 800 includes a power button 809 to toggle the power of the remote control 800 on and/or off. Power button 809 is positioned within a recess 811 to help prevent any accidental adjustments of laser level mount 10 and/or 210 after alignment is complete when a user may pocket or put remote control 800 down. In a specific embodiment, remote control 800 includes a grip structure 814 that has a plurality of projections and/or channels. Grip structure 814 extends across at least a portion of upper housing 802 and/or lower housing 804.

Referring to FIG. 41, a partially exploded view of remote control 800 is shown according to an exemplary embodiment. Remote control 800 includes a circuit board, shown as PCBA 816 positioned within and fastened to lower housing 804. PCBA 816 is electrically coupled to power button 809, fast mode of rotation buttons 810 and slow mode of rotation buttons 808.

Figure 43:
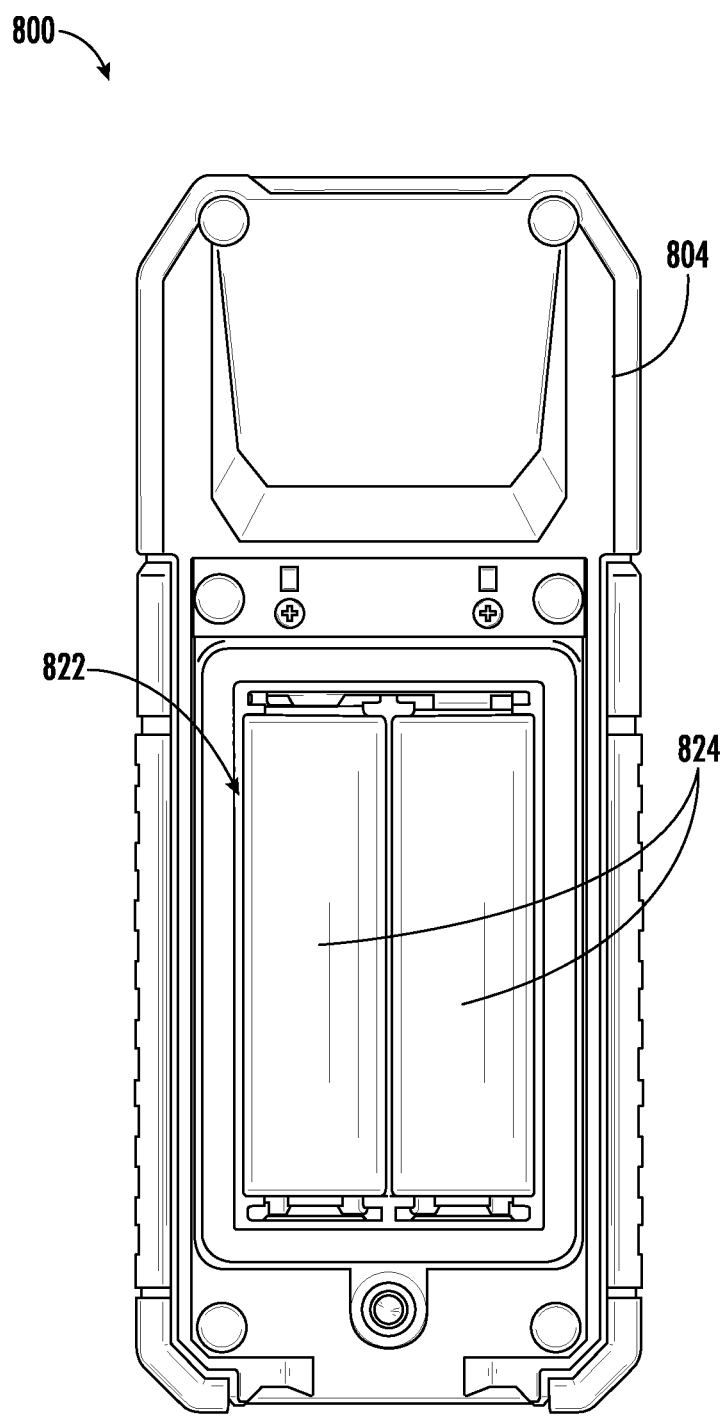
FIG. 43 is a bottom view of the remote control of FIG. 40 with a battery compartment cover removed, according to an exemplary embodiment.

Referring to FIGS. 42-43, a rear perspective view of remote control 800 is shown according to an exemplary embodiment. Lower housing 804 includes a battery compartment door 820 that seals one or more batteries 826 in a recessed battery compartment 822. In a specific embodiment, battery compartment 822 is configured to hold two AA batteries 824. In other embodiments, battery compartment 822 is configured to hold a different battery type (i.e., AAA batteries). A fastener, shown as a screw 818 can be tightened to prevent battery compartment door 820 from opening unintentionally.

Figure 44:
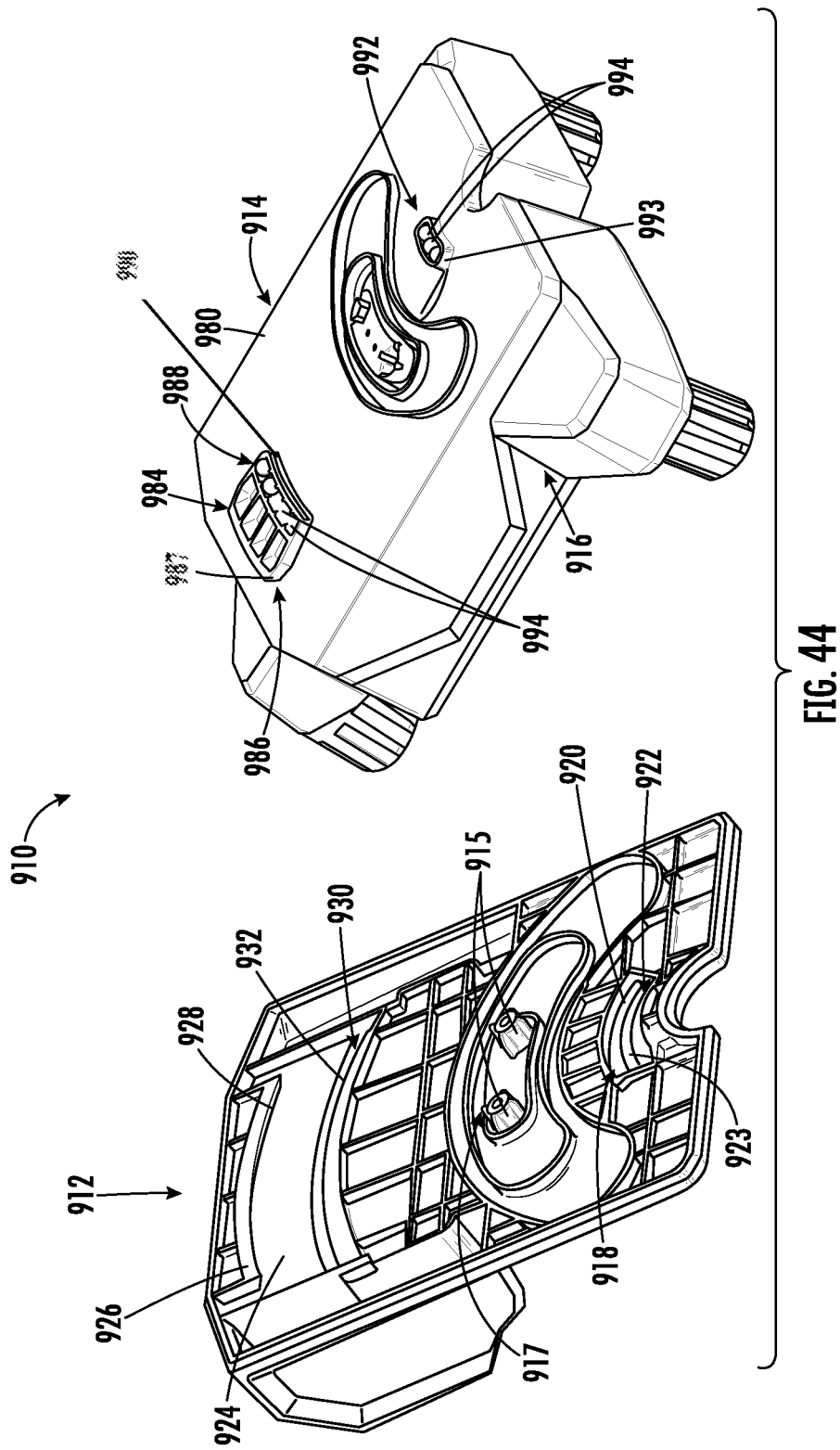
FIG. 44 is a partially exploded view of a motorized laser level mount, according to another exemplary embodiment.

Referring to FIG. 44, a partially exploded perspective of a motorized laser level mount 910 with a backlash detection system (see e.g., 220 in FIG. 23) is shown, according to an exemplary embodiment. Laser level mount can be utilized with a remote control device such as remote control 600, 700 and/or 800. Motorized laser level mount 910 is substantially the same as motorized laser level mount 10 and/or 210 except for differences discussed herein. Various aspects of the rotational coupling or engagement between a rotating laser platform 912 and housing cover 914 are shown. In other words, platform 912 is rotationally engaged with the housing cover 914. Unlike the previously described embodiments, that include ribs to act as a bearing surface, housing cover 914 includes ribs or walls and/or bearing elements, shown as ball bearings 994. Housing cover 914 includes an upper surface 980 that laser platform 912 rotates or pivots on.

Housing cover 914 includes a front recess 992 defined within a wall 993 extending upward from upper surface 980. Front recess 992 is positioned in a generally centered position relative to front legs and is between front channel and a slot (see e.g., element 286 in FIG. 19). Front recess 992 is configured to receive one or more bearing elements, shown as ball bearings 994 that acts as a bearing surface for laser platform 912. Housing cover 914 further includes a rear rib 984 positioned between the slot and a rear leg. Rear rib 984 includes at least a portion that has a dovetail shape with an angled surface 987 extending from upper surface 980 toward laser platform 912 (when laser mount 910 is assembled) at an angle and defining a space 986 between rear rib 984 and upper surface 980. Rear rib 984 also acts as a bearing surface for laser platform 912. Rear rib 984 further includes a recess 988 defined by a wall 990. Recess 988 is configured to receive one or more bearing elements, shown as ball bearings 994.

The front recess 992, rear rib 984 and rear recess 988 are designed to interface with corresponding surfaces on laser platform 912. Applicant believes the use of ball bearings instead of ribs alone provides reduced friction, vibration and/or noise and therefore reduces wear and/or tear on motorized laser level mount 910.

A perspective view of the inward or downward facing surface of laser platform 912 is also shown. Laser platform 912 includes an inward facing surface 924 with a wall 926 extending inwards toward housing cover 914. Wall 926 and specifically an engagement surface 928 is configured to cooperate with rear rib 984 of housing cover 914. Wall 926 includes an angled surface engagement surface 928 extending downward toward housing cover 914 in a manner that opposes angled surface 987 of rear rib 984. Laser platform 912 further includes a pair of bosses or protrusions 915 that extend downward toward housing cover 914. Each protrusion 915 includes a bore 917 configured to receive the fasteners that extend through and connect laser platform 912 to an output slider (e.g., 290). Inward facing surface 924 includes a bearing channel 930 with a bearing channel surface 932. Bearing channel surface 932 interfaces against ball bearings 994 that are positioned within rear recess 988 as laser platform 912 rotates. In a specific embodiment, bearing channel 930 has a curved shape.

Laser platform 912 further includes a front recess 918 with an inner surface 920. Front recess 918 is configured to engage with wall 993 and/or ball bearings 994 positioned within front recess 992. Front recess 918 and specifically a bearing channel 922 is configured to receive and cooperate with front recess 992 and/or ball bearings 994 of housing cover 214. Inner surface 920 of front recess 918 includes a bearing channel surface 923. Bearing channel surface 923 interfaces against ball bearings 994 that are positioned within front recess 992 as laser platform 912 rotates. In a specific embodiment, bearing channel 922 has a curved shape.

Figure 45:
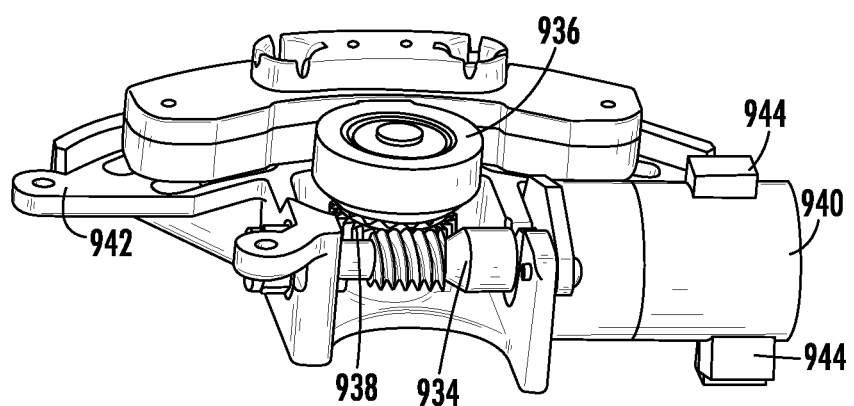
FIG. 45 is a perspective view of the gearing of motorized laser level mount of FIG. 44, according to an exemplary embodiment.

Referring to FIG. 45, a perspective view from above of a motor 940 and the connection to the output system that rotates laser platform 912 is shown. Motor 940 and the gear train are substantially the same as the motors and gear trains of motorized laser level mount 10 and/or 210 except for differences discussed herein. Motor 940 is coupled to a gear train holder 942. An output driver 936 is positioned in front of an output slider (see e.g., 290 in FIG. 25) and lower output slider (see e.g., 241 in FIG. 25) when laser level mount 910 is assembled. Output driver 936 is positioned above worm wheel 938 which engages with worm 934. In other words, output driver 936 is coupled to the gear train (i.e., worm 934, worm wheel 938, etc.). Backlash is defined within the gear train of motorized laser level mount 910 in the same manner previously described. One or more shims or support pieces 944 and positioned around motor 940 to provide stability within housing 916.

Referring to FIGS. 26-27, a detailed view of the engagement between the worm 234, worm wheel 238 and output driver 236, are shown. FIG. 26 shows a perspective view with worm wheel 238 coupled to and/or positioned around shaft 276, FIG. 27 shows a cross-sectional view of a portion of the output system. Wave springs 274 are positioned within output driver 236 below an uppermost portion of shaft 276 and force the output driver 236 down and into engagement with worm wheel 238 and/or worm 234 reducing backlash. Wave springs 274 allow for worm wheel 238 and output driver 236 to slip with respect to each other, creating a slip clutch. This slip clutch arrangement protects the gear train from abuse and/or misuse while also allowing a user to manually shift position. Shaft 276 extends through and rotatably couples output driver 236 and worm wheel 238. Output driver 236 is coupled to a post 252. When laser level mount 210 is assembled, post 252 extends through output slider 290 and lower output slider 241.

Figure 46:
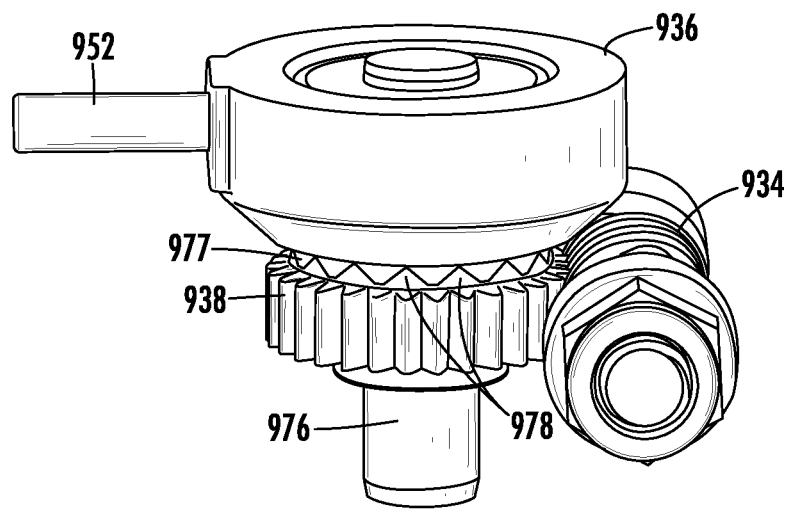
FIG. 46 is a detailed perspective view of a worm drive of the motorized laser level of FIG. 44, according to an exemplary embodiment.
Figure 47:
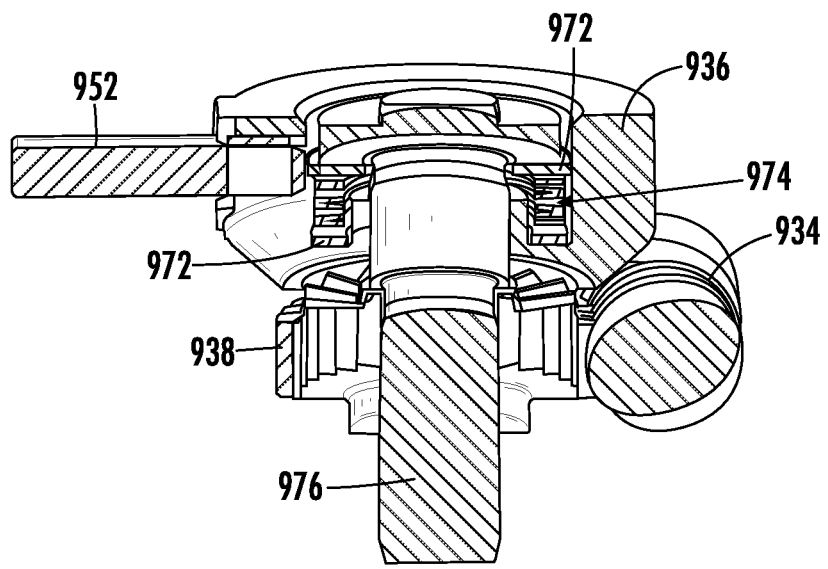
FIG. 47 is a cross-sectional view of the worm drive of FIG. 46, according to an exemplary embodiment.

Referring to FIGS. 46-47, a detailed view of the engagement between the worm 934, worm wheel 938 and output driver 936, are shown. FIG. 46 shows a perspective view with worm wheel 938 coupled to and/or positioned around a shaft 976. FIG. 47 shows a cross-sectional view of a portion of the output system. Wave spring 974 are positioned within output driver 936 below an uppermost portion of shaft 976 and force the output driver 936 down and into engagement with worm wheel 938 and/or worm 934 reducing backlash. Wave spring 974 allows for worm wheel 938 and output driver 936 to slip with respect to each other, creating a slip clutch. This slip clutch arrangement protects the gear train from abuse and/or misuse while also allowing a user to manually shift position. Shaft 976 extends through and rotatably couples output driver 936 and worm wheel 938. Output driver 936 is coupled to a post 952. When laser level mount 910 is assembled, post 52 extends through the output slider and lower output slider.

Worm wheel 938 includes ridges or waves 978 on a surface facing the output driver 936. The ridges or waves 978 of the worm wheel 938 engage with ridges 977 on output driver 936. One or more supports, shown as shims 972 are positioned within output driver 936. In a specific embodiment, at least one shim 972 is positioned on each side of wave spring 974.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed:

1. A motorized mount for a laser level device comprising:
   a housing;
   a platform rotationally engaged with the housing, the platform including a laser level device engagement structure;
   a platform adjustment mechanism coupled to the platform, such that the platform adjustment mechanism drives rotation of the platform, the platform adjustment mechanism comprising:
   a stepper motor positioned within the housing, the stepper motor moving in steps; and
   a gear train coupled to the stepper motor;
   an output slider coupled to the platform; and
   a backlash detection system coupled to the stepper motor and the platform, the backlash detection system includes:
   a monitoring unit configured to detect when backlash has been removed from within the platform adjustment mechanism; and
   an output driver with a rotating post extending toward the output slider;
   wherein, when the backlash has been removed from the platform adjustment mechanism, the steps of the stepper motor are counted by the monitoring unit such that the platform will move a distance during clockwise rotation of the platform that is the same as a distance moved during counterclockwise rotation of the platform.

2. The motorized mount of claim 1, the backlash detection system further comprising:
a first pin; and
a second pin;
wherein the rotating post extends between the first pin and the second pin.

3. The motorized mount of claim 2, wherein, when the rotating post is not contacting either the first pin or the second pin, the monitoring unit of the backlash detection system measures at least one of a voltage and a resistance as being in a first state to determine there is backlash in the platform adjustment mechanism.

4. The motorized mount of claim 3, wherein, when a user sends a signal to the motorized mount to rotate the platform in a clockwise direction, the rotating post moves until the rotating post contacts the first pin and wherein, when the rotating post contacts the first pin, the monitoring unit of the backlash detection system measures at least one of the voltage and resistance as being in a second state different from the first state to determine the backlash in the platform adjustment mechanism in the clockwise direction has been removed.

5. The motorized mount of claim 3, wherein, when a user sends a signal to the motorized mount to rotate the platform in a counterclockwise direction, the rotating post moves until the rotating post contacts the second pin and wherein, when the rotating post contacts the second pin, the monitoring unit of the backlash detection system measures at least one of the voltage and resistance as being in a second state different from the first state to determine the backlash in the platform adjustment mechanism in the counterclockwise direction has been removed.

6. The motorized mount of claim 2, wherein, when the rotating post is contacting the second pin and a user sends a signal to the motorized mount to rotate the platform in a clockwise direction, the rotating post moves until the rotating post contacts the first pin and wherein, when the rotating post contacts the first pin, the monitoring unit of the backlash detection system measures at least one of a voltage and a resistance as being in a second state to determine the backlash in the platform adjustment mechanism in the clockwise direction has been removed.

7. The motorized mount of claim 2, wherein, when the rotating post is centered between the first pin and the second pin, an amount of backlash for rotation of the platform in a clockwise direction is the same as an amount of backlash for rotation of the platform in a counterclockwise direction.

8. The motorized mount of claim 2, wherein a pin spacing distance between the first pin and the second pin is defined between a point on an outer surface of the first pin and an opposing point on an outer surface of the second pin.

9. The motorized mount of claim 8, wherein the pin spacing distance is between 1 mm and 10 mm.

10. A motorized device comprising:
a housing comprising an opening;
a platform rotationally engaged with the housing;
a platform adjustment mechanism coupled to the platform, such that the platform adjustment mechanism drives rotation of the platform, the platform adjustment mechanism comprising:
a motor positioned within the housing; and
a gear train coupled to the motor, the gear train including a first gear having teeth and a second gear having teeth;
a backlash detection system coupled to the gear train, the backlash detection system comprising:
a monitoring unit configured to detect when the teeth of the first gear are directly contacting the teeth of the second gear;
an output driver coupled to the gear train; and
an output slider engaged with the output driver and coupled to the platform, wherein the output slider extends through the opening of the housing to engage the platform.

11. The motorized device of claim 10, wherein the motor is a stepper motor that moves in steps and wherein, when the monitoring unit determines the teeth of the first gear are directly contacting the teeth of the second gear, the monitoring unit counts the steps of the stepper motor such that the platform will move a distance during a clockwise rotation of the platform that is the same as a distance moved during a counterclockwise rotation of the platform.

12. The motorized device of claim 10, the monitoring unit of the backlash detection system further comprising:
a first pin; and
a second pin, spaced a distance from the first pin such that the first pin does not contact the second pin.

13. The motorized device of claim 12, wherein the backlash detection system further comprises a rotating post coupled to the output driver and wherein the rotating post extends between the first pin and the second pin.

14. The motorized device of claim 13, wherein, when the rotating post is not engaged with either the first pin or the second pin, the monitoring unit of the backlash detection system measures at least one of a voltage and a resistance as being in a first state to determine there is a space between the teeth of the first gear and the teeth of the second gear.

15. The motorized device of claim 13, wherein, when the rotating post is engaged with the first pin, the monitoring unit of the backlash detection system measures at least one of a voltage and a resistance as being in a second state to determine the teeth of the first gear are directly contacting the teeth of the second gear for movement of the platform in a clockwise direction.

16. The motorized device of claim 13, wherein, when the rotating post is engaged with the second pin, the monitoring unit of the backlash detection system measures at least one of a voltage and a resistance as being in a second state to determine the teeth of the first gear are directly contacting the teeth of the second gear for movement of the platform in a counterclockwise direction.

17. An adjustable motorized device comprising:
a housing comprising a slot;
a platform rotationally engaged with the housing by one or more ribs extending upward from the housing;
a platform adjustment mechanism coupled to the platform, the platform adjustment mechanism comprising:
a motor positioned within the housing;
a gear train coupled to the motor; and
an output slider coupled to the platform, the output slider extending out of the housing and through the slot;
a backlash detection system coupled to the gear train, the backlash detection system comprising:
a microcontroller configured to detect when backlash has been removed from within the gear train;
an output driver coupled to the gear train, the output driver including a rotating post;

a first pin coupled to the output slider; and a second pin spaced a distance from the first pin and coupled to the output slider.

18. The adjustable motorized device of claim 17, wherein, when the microcontroller determines the gear train contains backlash, the rotating post moves until contact is made with one of the first pin or the second pin.

19. The adjustable motorized device of claim 18, wherein the motor is a stepper motor that moves in segments.

20. The adjustable motorized device of claim 19, wherein, when the microcontroller determines there is no backlash within the gear train, the segments of the stepper motor are counted such that the platform travels a distance during clockwise rotation of the platform that is the same as a distance travelled during counterclockwise rotation of the platform.

* * * * *